US012566997B2

(12) United States Patent
Mauser et al.

(10) Patent No.: US 12,566,997 B2
(45) Date of Patent: Mar. 3, 2026

(54) PROCESSING OF MACHINE LEARNING MODELING DATA TO IMPROVE ACCURACY OF CATEGORIZATION

(71) Applicant: Google LLC, Mountain View, CA (US)

(72) Inventors: Arne Mauser, Los Altos Hills, CA (US); Gang Wang, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 791 days.

(21) Appl. No.: 17/798,152

(22) PCT Filed: Apr. 9, 2021

(86) PCT No.: PCT/US2021/026618
§ 371 (c)(1),
(2) Date: Aug. 8, 2022

(87) PCT Pub. No.: WO2022/216293
PCT Pub. Date: Oct. 13, 2022

(65) Prior Publication Data
US 2023/0274183 A1 Aug. 31, 2023

(51) Int. Cl.
*G06N 20/00* (2019.01)
(52) U.S. Cl.
CPC ................................... *G06N 20/00* (2019.01)
(58) Field of Classification Search
None
See application file for complete search history.

(56) References Cited

U.S. PATENT DOCUMENTS

| | | | | |
|---|---|---|---|---|
| 10,546,340 | B1 * | 1/2020 | Ross | ...................... G06Q 40/08 |
| 2008/0021899 | A1 | 1/2008 | Avidan et al. | |
| 2016/0156460 | A1 | 6/2016 | Feng et al. | |
| 2017/0132230 | A1 * | 5/2017 | Muralidhar | ......... G06F 16/9535 |
| 2017/0353826 | A1 * | 12/2017 | D'Alberto | ............... H04L 67/52 |

(Continued)

FOREIGN PATENT DOCUMENTS

| | | |
|---|---|---|
| CN | 110011784 | 7/2019 |
| CN | 111062056 | 4/2020 |

(Continued)

OTHER PUBLICATIONS

Github.com [online], "TurtleDove" Jan. 2020, retrieved on Nov. 10, 2022, retrieved from URL <https://github.com/michaelkleber/turtledove>, 2 pages.

(Continued)

*Primary Examiner* — Ryan Barrett
(74) *Attorney, Agent, or Firm* — Fish & Richardson P.C.

(57) ABSTRACT

A first multi-party computation (MPC) system of an MPC cluster can receive, from an application on a client device, an inference request comprising a first share of a given user profile for a user of the application and a performance threshold. A set of nearest neighbors to the user profile can be identified by performing a secure MPC process using a trained machine learning model in collaboration with one or more second MPC systems. One or more nearest neighbors having a performance measure that satisfies the performance threshold can be selected from the set of nearest neighbors. The first MPC system can transmit data derived from the one or more nearest neighbors to the application.

20 Claims, 13 Drawing Sheets

(56) References Cited

U.S. PATENT DOCUMENTS

| | | | | |
|---|---|---|---|---|
| 2018/0285774 A1* | 10/2018 | Soni | .................. | G06Q 50/01 |
| 2020/0126143 A1 | 4/2020 | Chen et al. | | |
| 2020/0286112 A1* | 9/2020 | Zhou | .................. | G06N 3/045 |
| 2023/0034384 A1* | 2/2023 | Mao | .................. | H04L 9/3213 |
| 2023/0205915 A1* | 6/2023 | Wang | .................. | G06Q 30/0631 |
| | | | | 726/26 |
| 2023/0214684 A1* | 7/2023 | Wang | .................. | G06F 21/602 |
| | | | | 713/189 |
| 2023/0274183 A1* | 8/2023 | Mauser | .................. | H04W 12/02 |
| | | | | 706/12 |

FOREIGN PATENT DOCUMENTS

| | | |
|---|---|---|
| CN | 111543025 | 8/2020 |
| JP | 2012-033088 | 2/2012 |
| JP | 2015-532737 | 11/2015 |
| JP | 2016-510912 | 4/2016 |
| JP | 2017-010351 | 1/2017 |
| JP | 2018-528691 | 9/2018 |
| KR | 10-2019-0096295 | 8/2019 |
| KR | 10-2020-0044103 | 4/2020 |
| WO | WO 2011007631 | 1/2011 |
| WO | WO 2018135334 | 7/2018 |
| WO | WO 2019046651 | 3/2019 |
| WO | WO 2019063503 | 4/2019 |
| WO | WO 2020142110 | 7/2020 |
| WO | WO 2020172683 | 8/2020 |

OTHER PUBLICATIONS

International Search Report and Written Opinion in International Appln. No. PCT/US2021/026618, dated Jan. 14, 2022, 14 pages.

Li et al., "Pistis: A Privacy-Preserving Content Recommender System for Online Social Communities" Web Intelligence and Intelligent Agent Technology 2011 IEEE/WIC/ACM International Conference, Aug. 22, 2011, 79-86.

Rault Antoine: "User privacy in collaborative filtering systems" Jun. 2016, retrieved on Dec. 22, 2021, retrieved from URL <https://tel.archives-ouvertes.fr/tel-01385503/document>, 142 pages.

Notice of Allowance in Korean Appln. No. 10-2022-7029827, mailed on Mar. 8, 2025, 4 pages (with English translation).

Office Action in European Appln. No. 21724827.7, mailed on Jun. 16, 2025, 9 pages.

International Preliminary Report on Patentability in International Appln. No. PCT/US2021/026618, mailed on Oct. 19, 2023, 8 pages.

De Cock et al., Efficient and Private Scoring of Decision Trees, Support Vector Machines and Logistic Regression Models Based on Pre-Computation, IEEE Transactions on Dependable and Secure Computing, vol. 16, No. 2, 2019, 14 pages.

Notice of Allowance in Japanese Appln. No. 2022-553151, mailed on Dec. 18, 2023, 6 pages (with English translation).

Office Action in Indian Appln. No. 202227045730, mailed on Nov. 12, 2024, 6 pages (with English translation).

Office Action in Chinese Appln. No. 202180019134.6, mailed on Jul. 25, 2025, 20 pages (with English translation).

Lifei et al., "Security Issues and Privacy Preserving in Machine Learning" Journal of Computer Research and Development, 2020, 57(10): 2066-2085 (with English abstract).

Notice of Allowance in Chinese Appln. No. 202180019134.6, mailed on Jan. 14, 2026, 6 pages (with English translation).

* cited by examiner

200

400

Obtain table of user profile data for centroid model          402

Enforce user group size threshold          404

Swap rows of tables that meet user group size threshold          406

Calculate user group centroid halves          408

600

700

702 Receive, from a client device, a first request for user group identifiers

704 Identify a set of user groups corresponding to a model identifier

706 Identify, for each user group, a centroid of the user group

708 Determine a user group result

710 Transmit the user group result

800

900

Receive data for events — 902

Store data for an event — 904

Generate profile? — 906

Yes

Generate user profile by aggregating feature vectors — 908

Generate shares of user profile — 910

Encrypt shares of user profile — 912

Transmit encrypted shares — 914

1000

Obtain shares of user profiles                                    1002

Create random projection planes                                   1004

Create m-dimensional vectors                                      1006

Use MPC to create shares of bit flipping patterns                 1008

Project shares of user profiles to the random projection
planes                                                            1010

Reconstruct bit vectors                                           1012

Generate machine learning models                                  1014

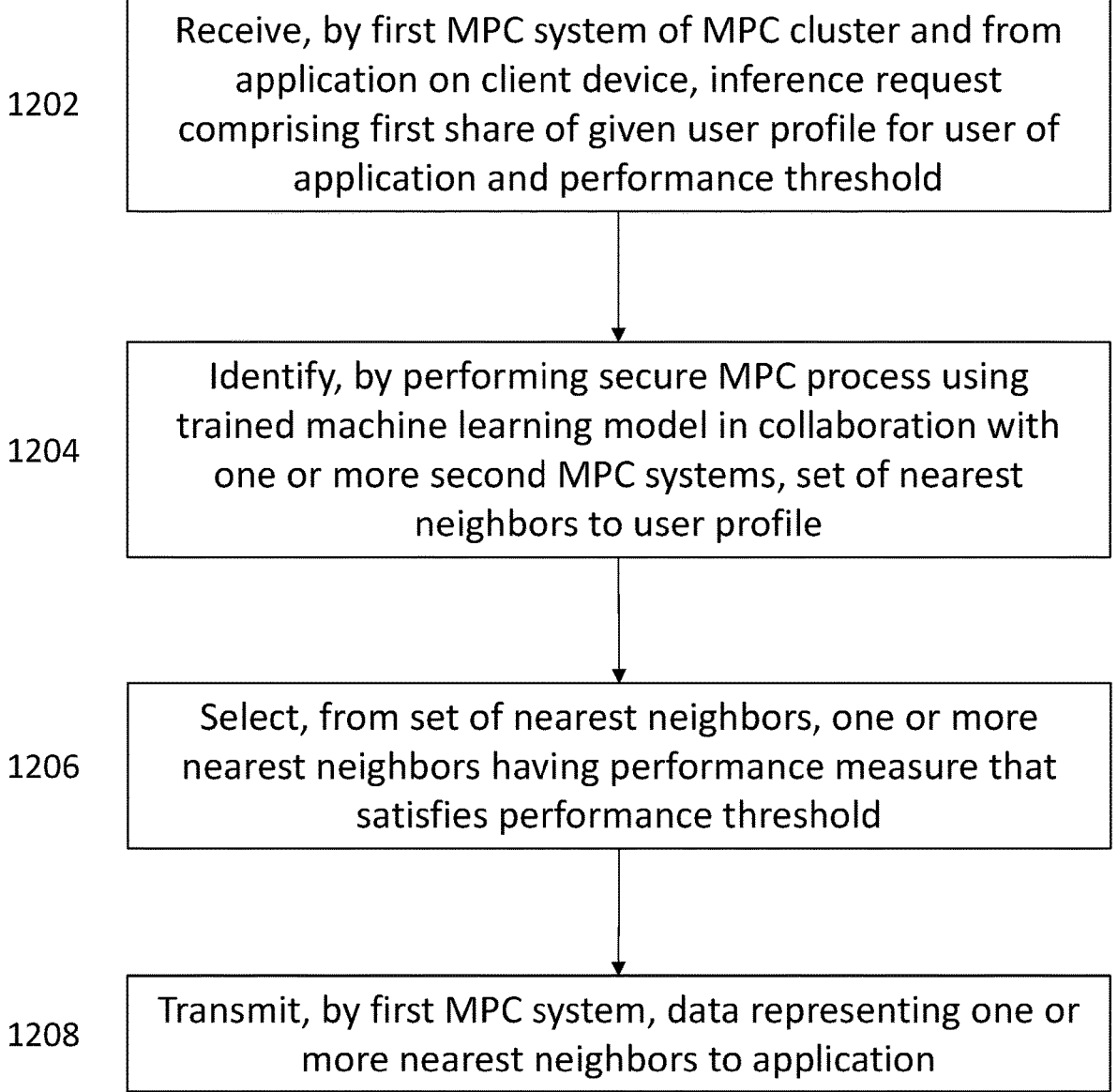

1202 — Receive, by first MPC system of MPC cluster and from application on client device, inference request comprising first share of given user profile for user of application and performance threshold 1204 — Identify, by performing secure MPC process using trained machine learning model in collaboration with one or more second MPC systems, set of nearest neighbors to user profile 1206 — Select, from set of nearest neighbors, one or more nearest neighbors having performance measure that satisfies performance threshold 1208 — Transmit, by first MPC system, data representing one or more nearest neighbors to application

FIG. 12

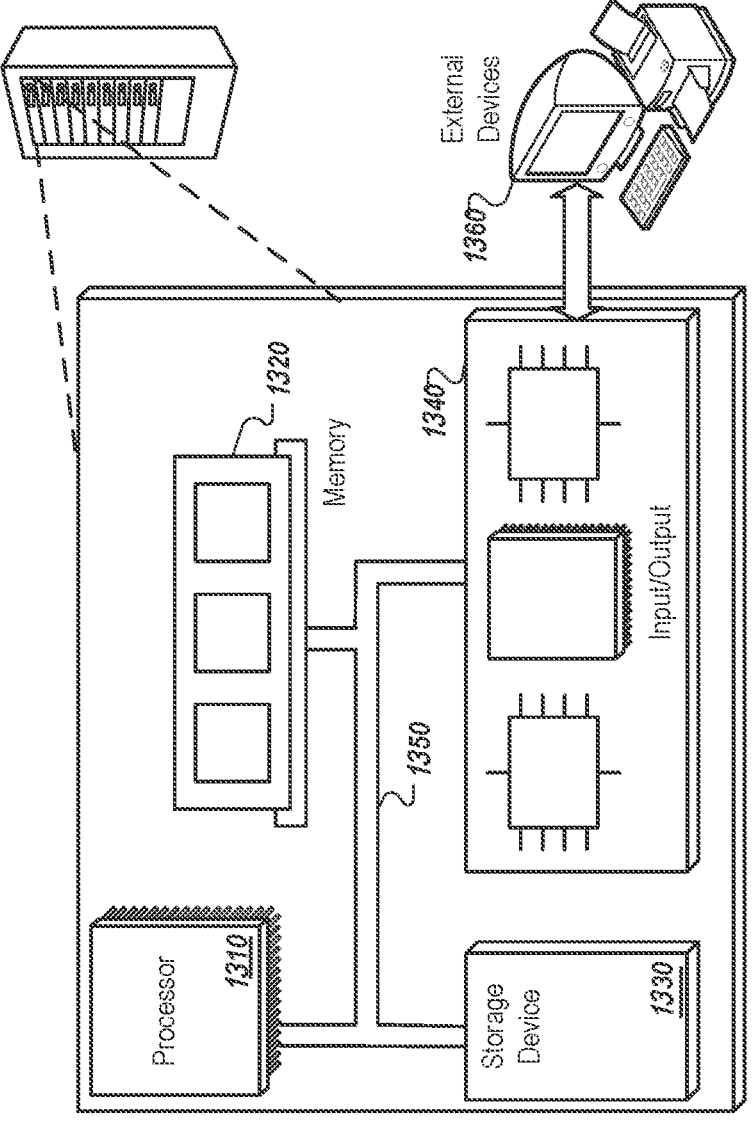
FIG. 13

PROCESSING OF MACHINE LEARNING MODELING DATA TO IMPROVE ACCURACY OF CATEGORIZATION

CROSS-REFERENCE TO RELATED APPLICATIONS

This application is a National Stage Application under 35 U.S.C. § 371 and claims the benefit of International Application No. PCT/US2021/026618, filed Apr. 9, 2021, the entirety of which is incorporated herein by reference.

TECHNICAL FIELD

The subject matter described herein relates to training and using machine learning models in ways that preserve user privacy, ensure data security, and improve accuracy in categorization.

BACKGROUND

Some machine learning models are trained based on data collected from multiple sources, e.g., across multiple websites and/or native applications. However, this data may include private or sensitive data that should not be shared or allowed to leak to other parties.

SUMMARY

This disclosure relates to training and using machine learning models in ways that preserve user privacy and ensures data security. For example, aspects of this disclosure are related to machine learning models, data input to such models, and data output from such models to accurately categorize users into user groups while preserving user privacy and ensuring data security, even in situations where third-party cookies are blocked (e.g., by browsers) or otherwise not used. The modification of data input into the models can be referred to as pre-processing, and the modification of the data output from the models can be referred to as post-processing. The pre-processing of data input into, and/or post-processing of data output from, machine learning models, as described herein, allow a more accurate expansion of user groups so as to more accurately categorize a user into respective one or more user groups.

In one aspect, a first multi-party computation (MPC) system of an MPC cluster can receive, from an application on a client device, an inference request comprising a first share of a given user profile for a user of the application and a performance threshold. A set of nearest neighbors to the user profile can be identified by performing a secure MPC process using a trained machine learning model in collaboration with one or more second MPC systems. One or more nearest neighbors having a performance measure that satisfies the performance threshold can be selected from the set of nearest neighbors. The first MPC system can transmit data derived from the one or more nearest neighbors to the application.

In some implementations, one or more of the following can be additionally be implemented either individually or in any feasible combination. The user profile can be generated by the application. The user profile can include data indicative of interactions between a user of the application and digital content rendered on the application. The interactions can include conversions and lack of conversions. The machine learning model can be a nearest neighbors model. Nearest neighbors of the nearest neighbors model can be represented by respective centroids associated with corresponding user groups. The first MPC system can allocate a weight to each user of the corresponding user groups to compute a respective centroid. The weight can be based on at least one of interactions by the user or user information related to the performance measure. A centroid for each user group can be a center, represented by an average, of user profiles for users that are members of the user group. The machine learning model can be one or more of a centroid model or a nearest neighbors model. The performance measure of each nearest neighbor can include at least one of a user interaction rate with one or more digital components corresponding to the nearest neighbor or a conversion rate for the one or more digital components corresponding to the nearest neighbor. The machine learning model can include a k-nearest neighbors model and each neighbor in the k-nearest neighbors model represents a user profile of a user. The machine learning model can include a k-nearest neighbors model and each neighbor in the k-nearest neighbors model represents a user group for a plurality of users. The performance threshold is a threshold value. The conversion rate for the one or more digital components can be a number of conversions divided by a number of times the one or more digital components were displayed to users in a user group. The inference request can be a request to infer whether the user is to be added to a user group.

Related methods, techniques, systems, and computer program products are also described. For example, in another aspect, a system is described that can include at least one programmable processor, and a machine-readable medium storing instructions that, when executed by the at least one programmable processor, cause the at least one programmable processor to perform operations described herein. In another aspect, one or more computer program products (which in some implementations can be non-transitory computer program products) are described that can store instructions that, when executed by at least one programmable processor, cause the at least one programmable processor to perform operations described herein.

The subject matter described in this specification can be implemented in particular embodiments so as to realize one or more of the following advantages. Cryptographic techniques, such as secure multi-party computation (MPC), can be used to solve the problems that arise when third-party cookies are not able to be used to collect data. For example, cryptographic techniques enable the expansion of user groups based on similarities in user profiles without the use of third-party cookies, which preserves user privacy without negatively impacting the ability to expand the user groups and in some cases provides better user group expansion based on more complete profiles than achievable using third-party cookies. The MPC techniques can ensure that, as long as one of the computing systems in an MPC cluster is honest (e.g., does not reveal its portion of the underlying data in cleartext), no user data can be obtained by any of the computing systems or another party in cleartext. As such, the claimed methods allow the identification, grouping, and transmission of user data, including cross-domain user data, in a secure manner, without requiring the use of third-party cookies to determine any relations between user data. This is a distinct privacy-preserving approach from the use of cleartext user profiles often collected by third-party cookies to determine relationships between data, which can expose user data to entities that receive the third-party cookies. By grouping user data in this manner, the efficiency of transmitting data content to user devices is improved as data content that is not relevant to a particular user need not be transmitted. Particularly, third-party cookies are not required thereby avoiding the storage of third-party cookies, improving memory usage. Exponential decay techniques can be used to build user profiles at client devices to reduce the data size of the raw data needed to build the user profiles, thereby reducing data storage requirements.

Further, the pre-processing and post-processing of modeling data ensure a more accurate categorization of users into one or more respective user groups. In some implementations, k-NN models can be based on such user groups; such modeling can advantageously be less complex than the k-NN models where users form different points in the high-dimensional space, because there are often significantly fewer user groups than users. For example, a content platform could have a few billion users but a few million user groups. In such a case, training the k-NN model with each neighbor being defined as a user group instead of a user can scale down the model by 1000 times. Such scaling down of the model can advantageously require lower data storage requirements to store the data (here, user groups and associated data such as mappings between different elements) and faster processing to determine whether to add a user to a user group.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

FIG. 12 is a flow diagram that illustrates an example process for training and deploying a k-NN model to effectively categorize users into one or more respective user groups.

4

Figure 1:
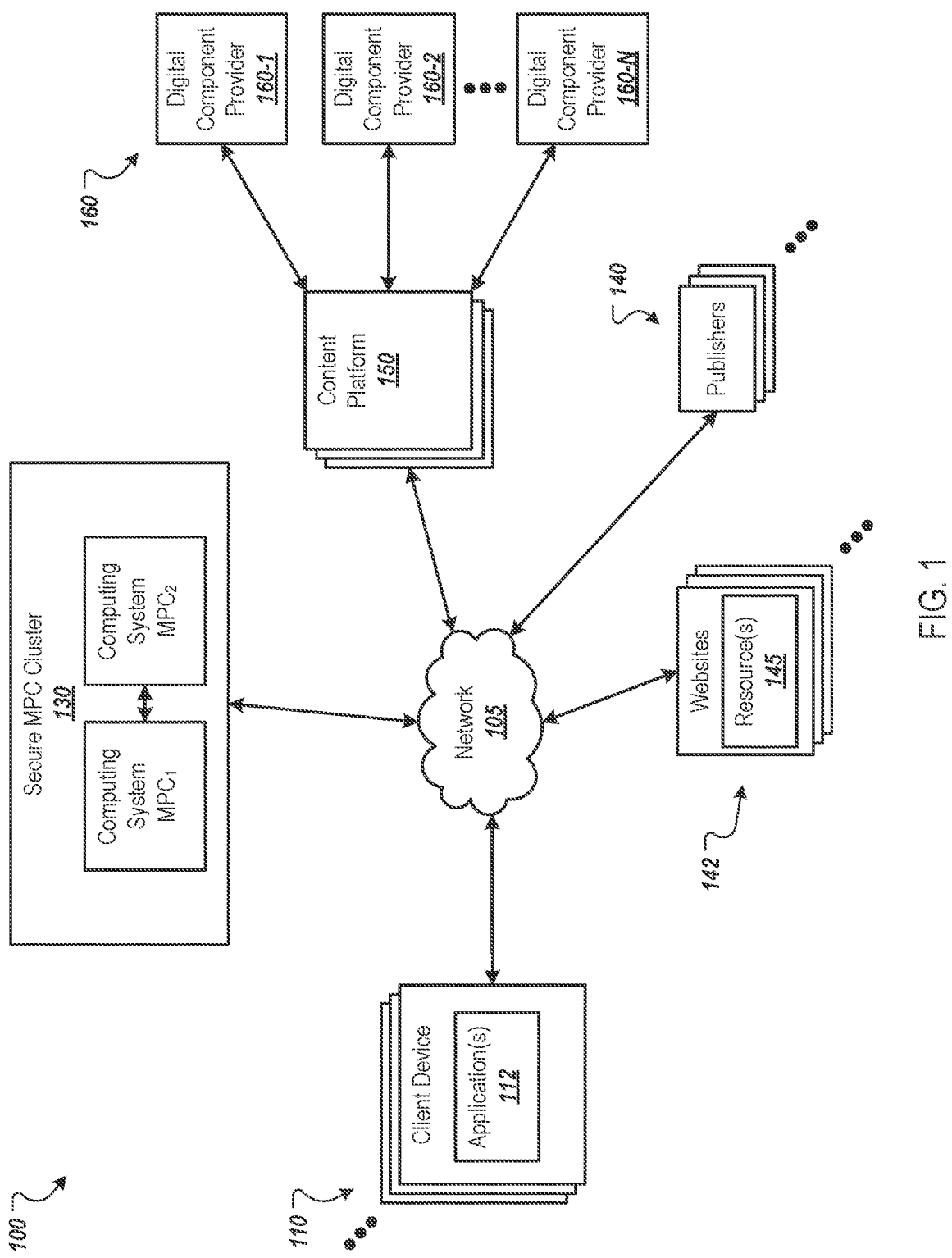
FIG. 1 is a block diagram of an environment in which a secure MPC cluster generates machine learning models and the machine learning models are used to expand user groups.

FIG. 13 is a block diagram of an example computer system.

Like reference symbols in the various drawings indicate like elements.

DETAILED DESCRIPTION

In general, this document describes systems and techniques for training and using machine learning models to expand user group membership while preserving user privacy and ensuring data security, even in situations where third-party cookies are blocked (e.g., by browsers), and/or collection of user profiles is otherwise infeasible. In general, rather than creating and maintaining user profiles at computing systems of other entities, such as content platforms, the user profiles are maintained at the client devices of the users. To train the machine learning models, the client devices of the users can send their encrypted user profiles (e.g., as secret shares of the user profiles) along with other data to multiple computing systems of a secure multi-party computation (MPC) cluster, optionally via a content platform. For example, each client device can generate two or more shares, e.g., secret shares, of the user profile and send a respective secret share to each computing system. In some implementations, the different subsets of the information in each user profile is provided to each computing system such that there is no overlap in the user profile data that is sent to each computing system.

The computing systems of the MPC cluster can use MPC techniques to train machine learning models for suggesting user groups for the users based on their profiles in ways that prevent either any computing system of the MPC cluster (or other party which is not the user itself) from obtaining any user's profile in cleartext, thereby preserving user privacy. Cleartext, which can also be referred to as plaintext, is text that is not computationally tagged, specially formatted, or written in code, or data, including binary files, in a form that can be viewed or used without requiring a key or other decryption device, or other decryption process. The machine learning models can be centroid models and/or k-nearest neighbor (k-NN) models. In centroid models, a centroid model for a user group can represent the center of the user profile, such as a center (e.g. average) of the user profiles for the users that are members of the user group. In k-NN models, the model assumes that similar users exist in close proximity such that similar users can be categorized into same or similar user groups.

After the machine learning models are trained, the machine learning models can be used to suggest one or more user groups for each user based on their profiles. For example, the client device of a user can query the MPC cluster for suggested user groups for that user or to determine whether a user should be added to a particular user group. In the implementations deploying centroid models, the MPC cluster can use the user profile of the user to identify user groups having a centroid that is within a threshold distance of the user profile of the user. In the implementations using k-NN models, various inference techniques can be used, such as binary classification, regression (e.g., using arithmetic mean or root mean square), and/or multiclass classification to identify the user groups. The user group membership of a user can be used in privacy preserving and secure ways to provide content (e.g. digital content) to the user.

The MPC cluster can select user groups for a user based on performance measures for the user groups. For example, the MPC cluster can select user groups having a user interaction rate (e.g., click-through rate (CTR)) or conversion rate that satisfies (e.g., meets or exceeds) a performance threshold. The performance measure for a user group can reflect the performance of one or more digital components corresponding to the user group, e.g., the performance of digital components that are distributed to users based on the users being members of the user group.

Example System for Generating and Using Machine Learning Models

FIG. 1 is a block diagram of an environment 100 in which a secure MPC 130 cluster trains machine learning models and the machine learning models are used to expand user groups. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, and content platforms 150. The example environment 100 may include many different client devices 110, secure MPC clusters 130, publishers 140, websites 142, and content platforms 150.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming console, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110.

The content platforms 150 can include supply-side platforms (SSPs) and demand-side platforms (DSPs). In general, the content platforms 150 manage the selection and distribution of digital components on behalf of publishers 140 and digital component providers 160.

Some publishers 140 use an SSP to manage the process of obtaining digital components for digital component slots of its resources and/or applications. An SSP is a technology platform implemented in hardware and/or software that automates the process of obtaining digital components for the resources and/or applications. Each publisher 140 can have a corresponding SSP or multiple SSPs. Some publishers 140 may use the same SSP.

Digital component providers 160 can create (or otherwise publish) digital components that are presented in digital component slots of publisher's resources and applications. The digital component providers 160 can use a DSP to manage the provisioning of its digital components for presentation in digital component slots. A DSP is a technology platform implemented in hardware and/or software that automates the process of distributing digital components for presentation with the resources and/or applications. A DSP can interact with multiple supply-side platforms SSPs on behalf of digital component providers 160 to provide digital components for presentation with the resources and/or applications of multiple different publishers 140. In general, a DSP can receive requests for digital components (e.g., from an SSP), generate (or select) a selection parameter for one or more digital components created by one or more digital component providers based on the request, and provide data related to the digital component (e.g., the digital component itself) and the selection parameter to an SSP. The SSP can then select a digital component for presentation at a client device 110 and provide, to the client device 110, data that causes the client device 110 to present the digital component.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users, or other group types involving similar user data, when the users visit particular resources, or perform particular actions at the resource—e.g., interact with a particular item presented on a web page, such as (a) click on a link for the particular item, (b) complete a conversion for the particular item by, for example, adding the item to a virtual cart or purchasing the item, and/or (c) view the particular item for more than a preset amount of time. While the model is described as generating or identifying user groups for users in response to interactions, in other implementations the model can generate or identify user groups in response to, and based on, the user performing some interactions but lacking subsequent interactions—e.g. view the digital component, but do not click; click the component, but do not convert, and/or the like. To make such distributions, the models are first trained on such data (i.e. signals) that indicates the specific types of interactions by the user. Training the model based on a signal where the user performs a particular interaction but lacks a subsequent interaction (e.g. user is displayed a digital component but does not click on it, or user clicks on a digital component but does not convert it) can be advantageous over models that do not account for such signal because it can allow a more accurate training of models as well as subsequent deployment of those trained models.

The user groups can be generated by the digital component providers 160 or content platforms 150, or publishers 140. That is, each digital component provider 160 can assign users to their user groups when the users visit electronic resources of the digital component providers 160. In another example, a content platform 150 can create user groups for digital component providers 160. In another example, a publisher 140 can create user groups for users visiting its website(s).

To protect user privacy, a user's group membership can be maintained at the user's client device 110, e.g., by one of the applications 112, or the operating system of the client device 110, rather than by a digital component provider, content platform, or other party. In a particular example, a trusted program (e.g., a web browser or the operating system can maintain a list of user group identifiers ("user group list") for a user using the web browser or another application. The user group list can include a group identifier for each user group to which the user has been added. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the group.

When the application 112 presents a resource or application content related to a digital component provider 160, or a web page on a website 142, the resource can request that the application 112 add one or more user group identifiers to the user group list. In response, the application 112 can add the one or more user group identifiers to the user group list and store the user group list securely.

The content platforms 150 can use the user group membership of a user to select digital components or other content that may be of interest to the user or may be beneficial to the user/user device in another way. For example, such digital components or other content may include data that improves a user experience, improves the running of a user device or benefits the user or user device in some other way. However, the user group identifiers of the user group list of a user can be provided in ways that prevent the content platforms 150 from correlating user group identifiers with particular users, or otherwise access user group identifiers in cleartext, thereby preserving user privacy when using user group membership data to select digital components.

The application 112 can provide user group identifiers from the user group list to a trusted computing system that interacts with the content platforms 150 to select digital components for presentation at the client device 110 based on the user group membership in ways that prevent the content platforms 150 or any other entities which are not the user itself from knowing a user's complete user group membership.

In some cases, it is beneficial to users and to digital component providers to expand user groups to include users that have similar interests or other similar data as the users that are already members of the user group. Usefully, this may be achieved without the use of third-party cookies. For example, a first user may be interested in snow skiing and may be a member of a user group for a particular ski resort. A second user may also be interested in skiing, but unaware of this ski resort and not a member of the ski resort. If the two users have similar interests or data, e.g., similar user profiles, the second user may be added to the user group for the ski resort so that the second user receives content, e.g., digital components, related to the ski resort and that may be of interest or otherwise beneficial to the second user or a user device thereof. In other words, user groups may be expanded to include other users having similar user data.

The secure MPC cluster 130 can train machine learning models that suggest, or can be used to generate suggestions of, user groups to users (or their applications 112) based on the user's profiles. The secure MPC cluster 130 includes two computing systems $MPC_1$ and $MPC_2$ that perform secure MPC techniques to train the machine learning models. Although the example MPC cluster 130 includes two computing systems, more computing systems can also be used to perform the MPC process as long as the MPC cluster 130 includes more than one computing system.

For example, the MPC cluster 130 can include three computing systems, four computing systems, or another appropriate number of computing systems. Using more computing systems in the MPC cluster 130 can provide more security and fault tolerance, but can also increase the complexity of the MPC processes.

The computing systems $MPC_1$ and $MPC_2$, which are within the MPC cluster 130, can be operated by different entities. In this way, each entity may not have access to the complete user profiles in cleartext. For example, one of the computing systems $MPC_1$ or $MPC_2$ can be operated by a trusted party different from the users, the publishers 140, the content platform 150, and the digital component providers 160. For example, an industry group, governmental group, or browser developer may maintain and operate one of the computing systems $MPC_1$ and $MPC_2$. The other computing system may be operated by a different one of these groups, such that a different trusted party operates each computing system $MPC_1$ and $MPC_2$. Preferably, the different parties operating the different computing systems $MPC_1$ and $MPC_2$ have no incentive to collude to endanger user privacy. In some implementations, the computing systems $MPC_1$ and $MPC_2$ are separated architecturally and are monitored to not communicate with each other outside of performing the secure MPC processes described in this document.

In some implementations, the MPC cluster 130 trains one or more machine learning models (e.g., centroid models and/or k-NN models) for each content platform 150 (e.g., each DSP and/or each SSP) and/or for each digital component provider 160. For example, a content platform 150 can have the MPC cluster 130 train a machine learning model (e.g., centroid model or k-NN model) for any subset of one or more user groups managed by the content platform 150 or for which the content platform has at least read access. For example, each content platform 150 can manage the distribution of digital components for one or more digital component providers 160. A content platform 150 can request that the MPC cluster 130 train a machine learning model (e.g., centroid model or k-NN model) for one or more of the digital component providers 160 for which the content platform 150 manages the distribution of digital components. In general, a digital component provider 160 can have the MPC cluster 130 train a centroid model and/or a k-NN model for one or more of the user groups created by and maintained by the digital component provider 160. Each content platform may implement a different machine learning model, which can be uniquely identified by a respective unique model identifier. Example processes for training centroid models and k-NN models are described in greater detail further below.

For the implementations deploying centroid models, a centroid model can embed users into an n-dimensional space. A user in the profile space is represented by a n-dimensional vector, $X=\{x_1, x_2, \ldots x_n\}$. A user group R has m users: $\{X_1, X_2, \ldots X_m\}$. The centroid of user group R in the model can be $$\text{Centroid(model, } R) = \frac{1}{m} \times \sum_{i=1}^{m} X_i.$$

Given a user $X'=\{x_1', x_2', \ldots x_n'\}$, a content platform 150 or digital component provider 160 may want to find all user groups R such that $|X'-\text{Centroid(model,R)}|<d$, where d is a parameter that represents a threshold distance for the centroid model, e.g., specified by the content platform 150. For ease of subsequent description and brevity, the remaining description related to centroid models is largely in terms of training and deploying centroid models for content platforms 150, e.g., DSPs and SSPs. However, the systems and techniques can also be performed for generating centroid models for digital component providers 160, publishers 140, or other entities and querying the centroid models on behalf of the digital component providers 160 or other entities.

After training a machine learning model (e.g., centroid or k-NN model) for a content platform 150, the content platform 150 can query, or have the application 112 of a client device 110 query the machine learning model to identify one or more user groups for a user of the client device 110.

More particularly, in the implementations using centroid models, the content platform 150 can query, or request that the application 112 query, the centroid model of the content platform 150 to determine if the user should join any of the user groups of the content platform 150. In general, the MPC cluster 130 can determine whether the user profile of the user is within a threshold distance of the centroids of the user groups of the content platform 150. If so, the MPC cluster 130 can request that the application 112 add the user to the user groups for which the user profile is within the threshold distance of the centroid. In some implementations, the models may be queried based on a performance measure, e.g., an interaction rate or conversion rate, and the user can be added to a particular user group if the performance measure meets a respective threshold value.

In some implementations using k-NN models, the content platform 150 can query, or request that the application 112 query, a k-NN model to determine whether a threshold number of the "k" user profiles nearest to the user are members of a particular user group. If so, the content platform 150 may add the user to that user group. If a user group is identified for the user, the content platform 150 or the MPC cluster 130 can request that the application 112 add the user to the user group.

In some implementations, the machine learning models can additionally or alternately be queried based on a threshold performance measure. At query time, the MPC cluster 130 can identify the k user profiles nearest to the user profile of the user. For each user group that includes at least one of the k users as a member, the MPC cluster 130 can calculate the performance measure for the group based on interactions or conversions, and lack of interactions and conversions, for the users with respect to the one or more digital components of the user group. The MPC cluster 130 can compare the calculated performance measure to the threshold. For any user group having a performance measure that satisfies the threshold, the MPC cluster 130 can request that the user be added to that user group. For user groups that have a performance measure that does not satisfy the threshold, the MPC cluster 130 may not request that the user be added to the user group.

In some implementations, the MPC cluster 130 trains the machine learning models based on user groups rather than individual users. For example, a k-NN model can be trained based on user groups rather than individual users. In such an example, a performance measure can be calculated for each user group in the k-NN model. The k-NN model can then be queried using a threshold performance measure. In this example, the MPC cluster 130 can identify the k user groups having an aggregated user profile (e.g., based on the centroid of the group) that are nearest to the user profile of the user. For any user group having a performance measure that satisfies the threshold, the MPC cluster 130 can request that the user be added to that user group. For user groups that have a performance measure that does not satisfy the threshold, the MPC cluster 130 may not request that the user be added to the user group.

If approved by the user and/or the application 112, the application 112 can add a user group identifier for the user group to the user group list stored at the client device 110.

In some implementations, an application 112 can provide a user interface that enables a user to manage the user groups to which the user is assigned. For example, the user interface can enable the user to remove user group identifiers, prevent all or particular resources 145, publishers 140, content platforms 150, digital component providers 160, and/or MPC clusters 130 from adding the user to a user group (e.g., prevent the entity from adding user group identifiers to the list of user group identifiers maintained by the application 112). This provides better transparency and control for the user.

Further to the descriptions throughout this document, a user may be provided with controls (e.g., user interface elements with which a user can interact by way of viewing, clicking, or converting) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example Process for Generating and Using Centroid Models

Figure 2:
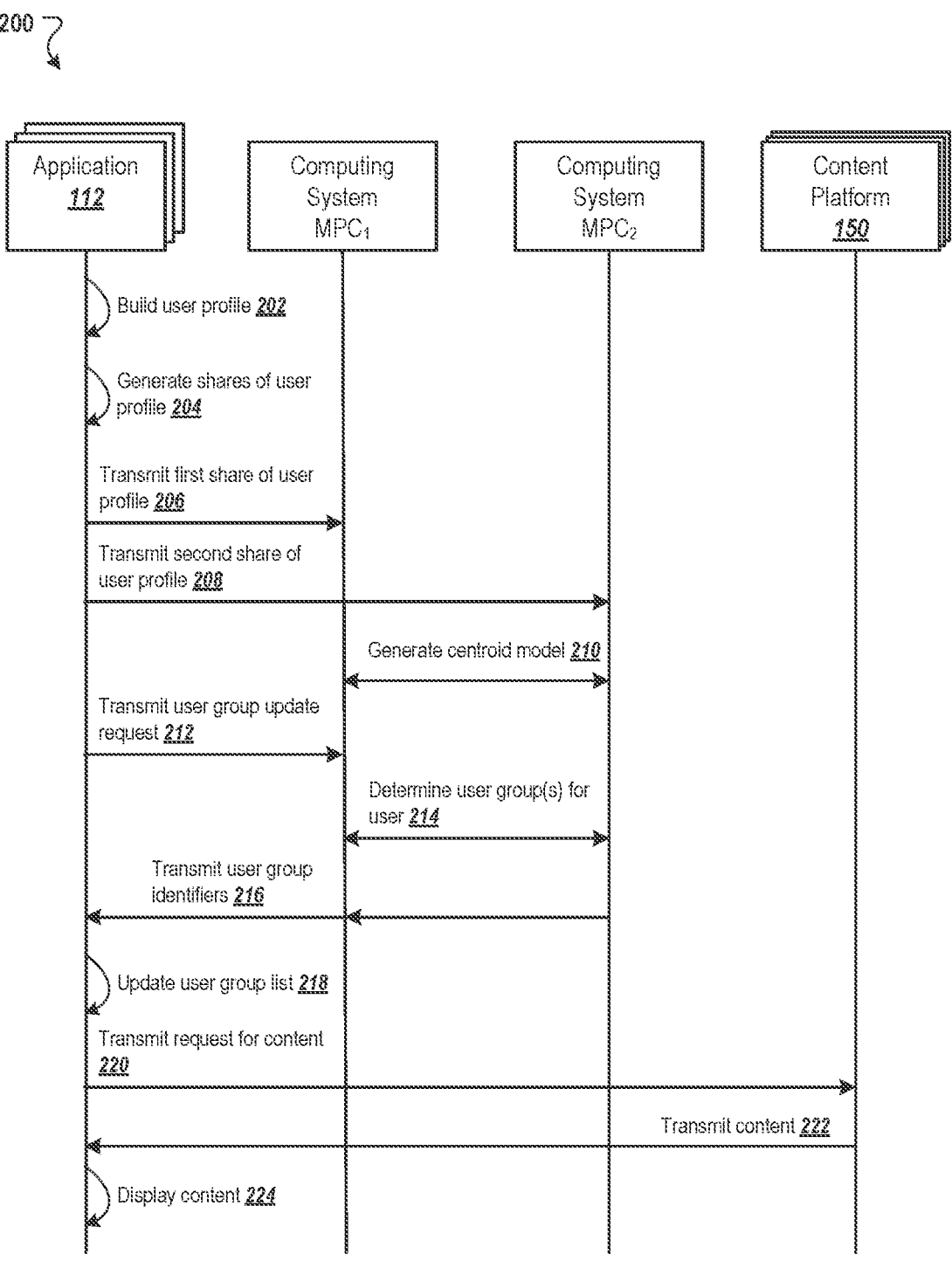
FIG. 2 is a swim lane diagram of an example process for generating a centroid model and using the centroid model to add users to user groups.

FIG. 2 is a swim lane diagram of an example process 200 for generating a centroid model and using the centroid model to add users to user groups. Operations of the process 200 can be implemented, for example, by the client device 110, the computing systems MPC$_1$ and MPC$_2$ of the MPC cluster 130, and a content platform 150. Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two computing systems can also be used to perform similar processes.

In this example process, the centroid model is used to add the user to user groups. The calculation of the centroid of user groups can also be used as a preprocessing phase for other machine learning models, e.g., k-NN models that are based on user groups rather than individual user profiles. For example, each user group in a k-NN model can be presented by the centroid for the user group.

A content platform 150 can initiate the generating and/or updating of one or more of its centroid models by requesting that applications 112 running on client devices 110 generate a user profile for their respective users and upload secret-shared and/or encrypted versions of the user profiles to the MPC cluster 130. For the purposes of this document, secret shares of user profiles can be considered encrypted versions of the user profiles as the secret shares are not in cleartext. In generation, each application 112 can store data for a user profile and generate the updated user profile in response to receiving a request from the content platform 150. As the content of a user profile and the machine learning models differ for different content platforms 150, the application 112 running on a user's client device 110 can maintain data for multiple user profiles and generate multiple user profiles that are each specific to particular content platforms, or specific to particular centroid models.

As a content platform 150 (or digital component provider 160) can have multiple centroid models, e.g., one for each set of one or more user groups, the content platform 150 (or digital component provider 160) can request the application 112 to generate the user profile and upload the user profile for multiple user groups and/or multiple centroid models at the same time, e.g. with a single request.

An application 112 running on a client device 110 builds a user profile for a user of the client device 110 (202). The user profile for a user can include data related to events initiated by the user and/or events that could have been initiated by the user with respect to electronic resources, e.g., web pages or application content. The events can include views of electronic resources, views of digital components, user interactions (e.g. one or more of views, clicks, or conversions by the user on the electronic resources and/or digital components), or the lack of user interactions (e.g. lack of views, clicks, or conversions by the user on the electronic resources and/or digital components) with electronic resources or digital components, conversions that occur (or do not occur) after user interaction with electronic resources, and/or other appropriate events related to the user and electronic resources. As the user profile can change over time, the built user profile can be referred to as a current user profile P$_{current}$.

A user profile for a user can be specific to a content platform 150, or selected centroid models owned by the content platform 150. For example, as described in more detail below with reference to FIG. 3, each content platform 150 can request that the application 112 generate or update a user profile specific to that content platform 150. In another example, the content platform 150 can request that the application generate or update a respective user profile for each centroid model of the content platform 150.

Figure 3:
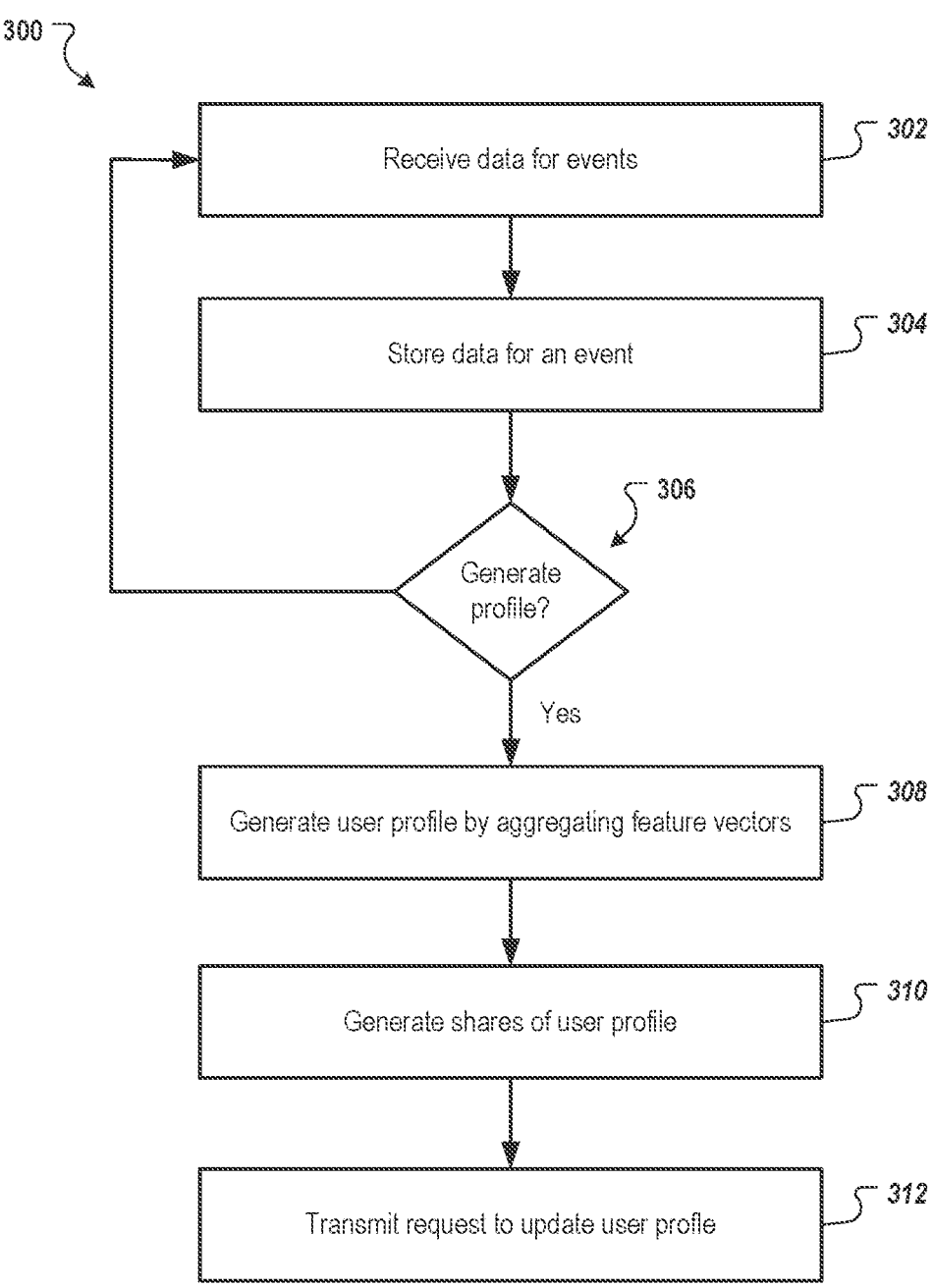
FIG. 3 is a flow diagram that illustrates an example process for generating a user profile and sending the user profile to an MPC cluster.

The user profile P$_{current}$ for a user can be in the form of a feature vector. For example, the user profile P$_{current}$ can be an n-dimensional feature vector. Each of the n dimensions can correspond to a particular feature and the value of each dimension can be the value of the feature for the user. For example, one dimension may be for whether a particular digital component was presented to (or interacted with by) the user. In this example, the value for that feature could be "1" if the digital component was presented to (or interacted with by) the user or "0" if the digital component has not been presented to (or interacted with by) the user. An example process for generating a user profile for a user is illustrated in FIG. 3 and described below.

The application 112 generates secret shares of the user profile P$_{current}$ for the user (204). In this example, the application 112 generates two secret shares [P$_{current, 1}$] and [P$_{current, 2}$] of the user profile P$_{current}$, one for each computing system of the MPC cluster 130. For the purposes of this document, secret shares are represented using brackets [ ] around the element (e.g., value, vector, etc.) that is secret shared, e.g., [secret share], for a secret share of a element "secret share." For example, the application can split the user profile P$_{current}$ into secret shares to protect the value of the user profile P$_{current}$ from a compromised computing system in the MPC cluster 130. Note that each secret share by itself can be a random value that by itself does not reveal anything about the user profile. Both secret shares would need to be combined to get the user profile. If the MPC cluster 130 includes more computing systems that participate in the training of a machine learning model, the application 112 would generate more secret shares, one for each computing system. An example process for building a user profile and generating secret shares of a user profile is illustrated in FIG. 3 and described below.

The application 112 provides the first secret share [P$_{current, 1}$] of the user profile P$_{current}$ to computing system MPC$_1$ (206). The application 112 also provides the second secret share [P$_{current, 2}$] of the user profile to computing system MPC$_2$ (208). As described below with reference to FIG. 3, there are various ways to provide the two secret shares [P$_{current, 1}$] and [P$_{current, 2}$] of the user profile P$_{current}$ to the MPC cluster 130 such that user privacy and the security of the data is protected.

In certain implementations where the model is desired to be trained based on conversions of digital components by users, it may be taken into account that occurrence of conversion can often happen a long time after an impression or a click, in which case it can be advantageous to keep the MPC cluster 130 available to perform other tasks so as to optimize bandwidth, storage, and processing by the content platform 150. In such implementations, the operations 206 and 208 can be replaced by another alternative process where (i) the application 112 transmits the encrypted shares of the user profile and the labels along with a first party cookie to a demand-side platform (DSP), which may be a part of the content platform 150 in some implementations and separate from the content platform 150 in other implementations, (ii) the DSP then uses a first party cookie to map (i.e. associate) the encrypted shares of the user profile and labels with interaction data that can be specific to conversions (e.g. whether conversion occurred within a preset period of time such as 30 days), and (iii) the DSP then transmit this mapping to the computing system $MPC_1$ or $MPC_2$ to train the machine learning model. While this description focuses on the interaction of conversions, this architecture and functionality can be extended to any other interaction (e.g. impressions or clicks), or any combination of interactions (e.g. impressions, clicks, and/or conversions).

Figure 4:
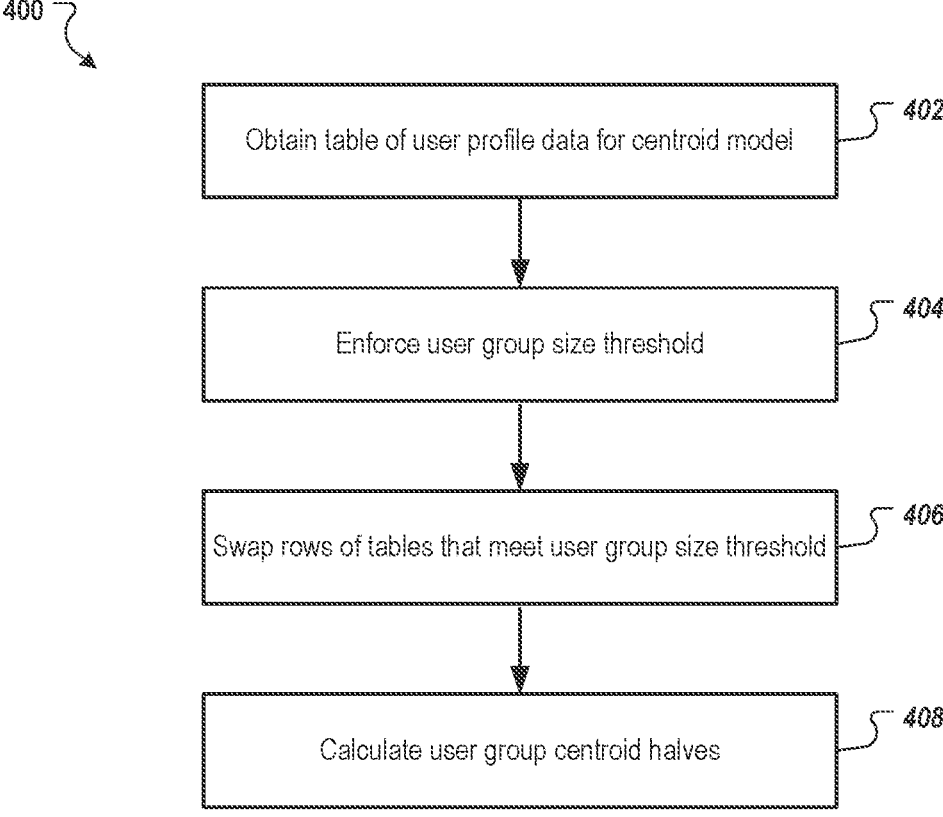
FIG. 4 is a flow diagram that illustrates an example process for generating centroid models.
Figure 6:
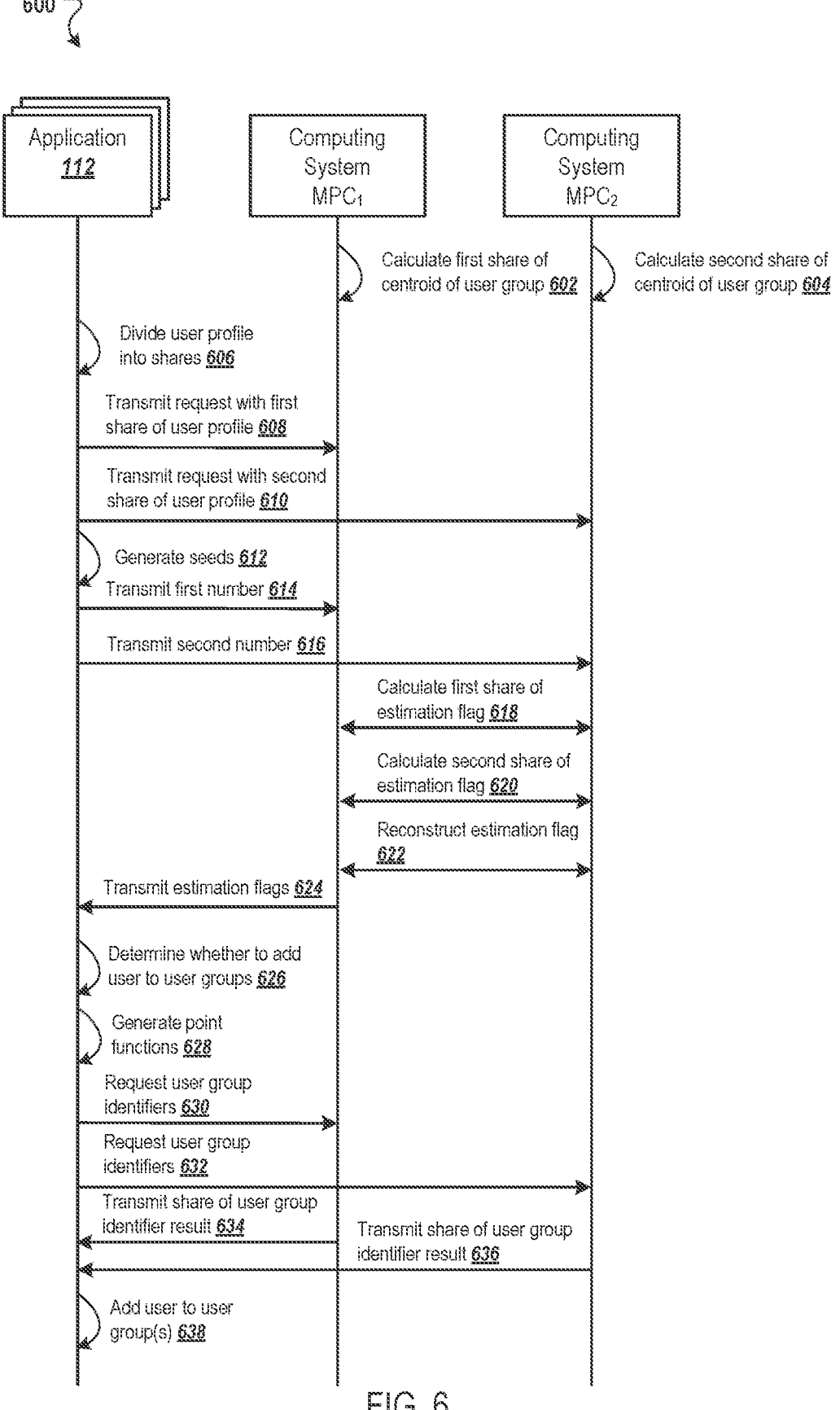
FIG. 6 is a swim lane diagram that illustrates an example process for generating a centroid model and using the centroid model to add a user to a user group corresponding to the centroid model.

The computing systems $MPC_1$ and $MPC_2$ generate a centroid model (210). The computing systems $MPC_1$ and $MPC_2$ can generate a centroid model for multiple user groups of the content platform 150 or digital component provider 160 that requested the client device 110 to upload the user profile. Each time a new machine learning model is generated based on user profile data can be referred to as a training session. The computing systems $MPC_1$ and $MPC_2$ can generate a centroid model based on the secret shares of the user profiles received from multiple client devices. For example, the computing systems $MPC_1$ and $MPC_2$ can use MPC techniques to generate a centroid model based on the secret shares of the user profiles. In general, generating the centroid model for a user group includes calculating the centroid of the user profiles of the users that are members of the user group. Example processes for generating centroid models are illustrated in FIGS. 4 and 6 and described below.

Each centroid model generated by and maintained by the MPC cluster 130 can have a corresponding unique identifier. This enables the application 112 to query the centroid models using the model identifiers. For example, a request to generate a centroid model can include the model identifier for the centroid model, which may be assigned by the owner (e.g., content platform 150 or digital component provider 160). The owner can then use the model identifier to request applications 112 to query the centroid model to determine whether to add users to the user group corresponding to the centroid model.

The application 112 submits a user group update request to the MPC cluster 130 (212). The user group update request can include the current user profile $P_{current}$ of the user. In some implementations, the application 112 can send the complete user profile $P_{current}$ to each computing system $MPC_1$ and $MPC_2$. In other implementations, to protect user privacy, the application 112 can send a respective portion or a secret share of the user profile $P_{current}$ to each computing system $MPC_1$ and $MPC_2$.

The user group update request can also include the model identifier for each of one or more centroid models to be queried to determine whether the user should be added to the user group corresponding to the centroid model. In some implementations, the application 112 sends a separate user group update request for each centroid model. In this example, each user group request includes the model identifier for the one centroid model.

Each user group update request can also include the threshold distance, e.g., maximum distance, for the query. If the user profile of the user is within the threshold distance of the centroid for a user group, the MPC cluster 130 can request that the application 112 add the user to the user group corresponding. Example data formats and techniques for transmitting a user group update request are described with reference to FIG. 5.

Figure 5:
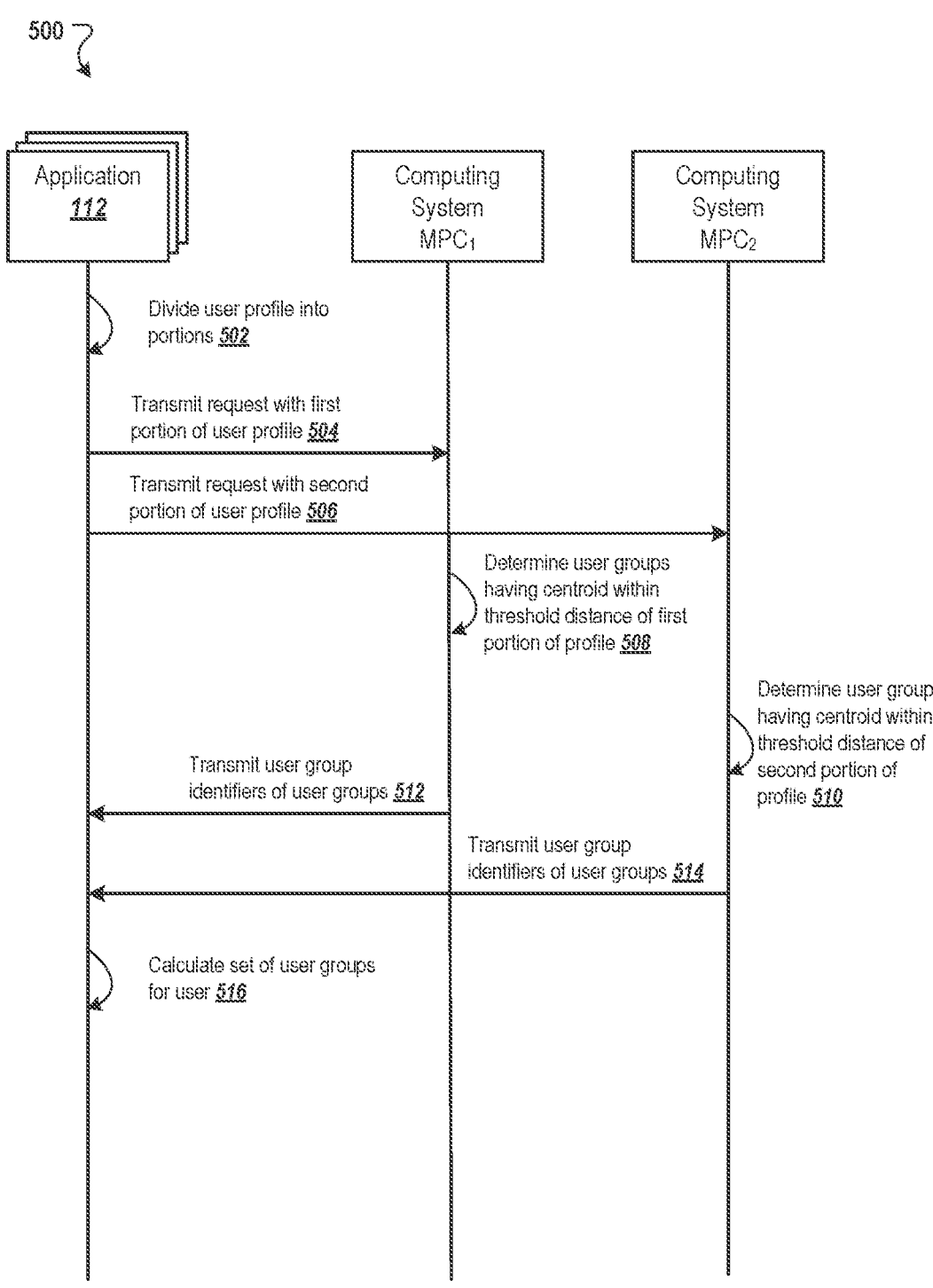
FIG. 5 is a swim lane diagram that illustrates an example process for adding a user to user groups using centroid models.

The MPC cluster 130 determines whether the user should be added to one or more user groups (214). In general, this can include determining whether the user profile of the user is within the threshold distance of the centroid for each of one or more user groups. The computing systems $MPC_1$ and $MPC_2$ can perform a secure MPC process to determine whether the user should be added to one or more user groups such that neither computing system $MPC_1$ nor $MPC_2$ can access any of the users' profiles in cleartext or the user group identifiers that will be suggested for the user in cleartext. Example processes for determining user groups for a user are illustrated in FIGS. 5 and 6 and described below.

The MPC cluster 130 provides zero or more user group identifiers to the application 112 (216). The MPC cluster 130 can provide the user group identifier for each user group to which the user should be added. That is, the MPC cluster 130 can provide the user group identifier for each user group having a centroid of which the user profile of the user is within the threshold distance. To protect user privacy, each computing system $MPC_1$ and $MPC_2$ provides a portion of the user group identifiers or a secret share of the user group identifiers, as described below with reference to FIGS. 5 and 6.

The application 112 updates the user group list for the user (218). For example, the application 112 can add the user to each user group for which the user profile is within a threshold distance of its centroid. That is, the application 112 can add each user group identifier received from the MPC cluster 130 to the user group list maintained at the client device 110 of the user. In some implementations, the application 112 can prompt the user for permission to add the user to each user group.

The application 112 transmits a request for content (220). For example, the application 112 can transmit, to the content platform 150, a request for a digital component in response to loading an electronic resource that has a digital component slot. In some implementations, the request can include one or more user group identifiers for user groups that include the user as a member. For example, the application 112 can obtain one or more user group identifiers from the user group list and provide the user group identifier(s) with the request. In some implementations, techniques can be used to prevent the content platform from being able to associate the user group identifier with the user, the application 112, and/or the client device 112 from which the request is received.

The content platform 150 transmits content to the application 112 (222). For example, the content platform 150 can select a digital component based on the user group identifier(s) and provide the digital component to the application 112. In some implementations, the content platform 150, in collaboration with the application 112 or the device operating system, selects a digital component based on the user group identifier(s), without leaking the user group identifier(s) out of the application 112 or the user device 110.

The application 112 displays or otherwise implements the received content (224). For example, the application 112 can display a received digital component in a digital component slot of an electronic resource.

Example Process for Generating User Profiles for Centroid Models

FIG. 3 is a flow diagram that illustrates an example process 300 for generating a user profile and sending the user profile to an MPC cluster. Operations of the process 300 can be implemented, for example, by the client device 110 of FIG. 1, e.g., by the application 112 running on the client device 110 or the operating system of the client device 110.

Operations of the process 300 can also be implemented as instructions stored on one or more computer readable media which may be non-transitory, and execution of the instructions by one or more data processing apparatus can cause the one or more data processing apparatus to perform the operations of the process 300.

An application 112 executing on a user's client device 110 receives data for an event (302). The event can be, for example, a presentation of an electronic resource at the client device 110, a presentation of a digital component at the client device 110, a user interaction with an electronic resource or digital component at the client device 110, or a conversion for a digital component, or the lack of user interaction with or conversion for an electronic resource or digital component presented. Some examples of user interactions by the user can be interactions with a particular item presented on a web page, such as one or more of (a) click on a link for the particular item, (b) complete a conversion for the particular item by, for example, adding the item to a virtual cart or purchasing the item), (c) view the particular item for more than a preset amount of time. Some examples of lack of specific user interactions can be the user performing some interactions but lacking subsequent interactions—e.g., user views the digital component, but does not click; clicks the digital component, but does not convert (e.g. clicks to go to a checkout webpage but does not purchase an item); and/or the like. Conversion can be defined differently in different implementations. For example, in some implementations, conversion can be the user navigating through to the checkout page. In certain implementations, conversion can be the user attempting to purchase the item. In other implementations, conversion can be the user purchasing the item. When an event occurs, a content platform 150 or digital component provider 160 can provide data related to the event to the application 112 for use in generating a user profile for the user.

The application 112 can generate a different user profile for each content platform 150 or digital component provider 160. That is, the user profile of a user and for a particular content platform 150 may only include event data received from the particular content platform 150. This preserves user privacy by not sharing with content platforms data related to events of other content platforms. In some implementations, the application 112, per the request of the content platform 150, may generate a different user profile for each centroid model owned by the content platform 150. Based on the design goal, different centroid models may require different training data. For example, a first model may be used to determine whether to add a user to a user group. A second model may be used to predict whether a user will interact with (e.g. view, click, and/or convert) a digital component. In this example, the user profiles for the second model can include additional data, e.g., whether the user interacted with the digital component, that the user profiles for the first model do not have.

The content platform 150 can send the event data in the form of a profile update token $M_{update}$. The profile update token $M_{update}$ has the following items shown and described in Table 1 below.

TABLE 1

| Item No. | Content | Description |
|---|---|---|
| 1 | Content Platform Domain (e.g., eTLD + 1 domain) | Content platform's domain that uniquely identifies the content platform |
| 2 | Model Identifier | Unique identifier for the content platform's centroid model. This item |

TABLE 1-continued

| Item No. | Content | Description |
|---|---|---|
| | | can have multiple values if the same user profile should be applicable for the training of multiple centroid models for the same owner domain. |
| 3 | Profile Record | n-dimensional feature vector determined by the content platform based on the event |
| 4 | Token Creation Timestamp | Timestamp indicating when this token is created |
| 5 | Expiration Time | A date and time at which the feature vector will expire and not be used for the user profile calculation. |
| 6 | Profile Decay Rate | Optional rate that defines the rate at which the weight of this event's data decays in the user profile |
| 7 | Operation | Accumulate user profile |
| 8 | Digital Signature | The content platform's digital signature over items 1-7 |

The model identifier identifies the centroid model for which the user profile will be used to train or used to make a user group inference. The profile record is an n-dimensional feature vector that includes data specific to the event, e.g., the type of event, the electronic resource or digital component, time at which the event occurred, and/or other appropriate event data that the content platform 150 (or digital component provider 160) wants to use in training the centroid model and making user group inferences. The operation instructs application 112 to update the user profile based on the profile record. The digital signature is generated based on the seven items using a private key of the content platform 150.

In some implementations, to protect the update token $M_{update}$ during transmission, the content platform 150 encrypts the update token $M_{update}$ prior to sending the update token $M_{update}$ to the application 112. For example, the content platform 150 can encrypt the update token $M_{update}$ using a public key of the application, e.g., PubKeyEnc ($M_{update}$, application_public_key).

In some implementations, the content platform 150 can send the event data to the application 112 without encoding the event data or the update request in the form of a profile update token $M_{update}$. For example, a script originated from the content platform 150 running inside the application 112 may directly transmit the event data and the update request to the application 112 via a script API, where the application 112 relies on World Wide Web Consortium (W3C) origin-based security model and/or (Hypertext Transfer Protocol Secure) HTTPS to protect the event data and update request from falsification or leaking, or man-in-the-middle attack.

The application 112 stores the data for the event (304). If the event data is encrypted, the application 112 can decrypt the event data using its private key that corresponds to the public key used to encrypt the event data. If the event data is sent in the form of an update token $M_{update}$, the application 112 can verify the update token $M_{update}$ before storing the event data. The application 112 can verify the update token $M_{update}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the update token $M_{update}$ is valid, the application 112 can store the event data, e.g., by storing the n-dimensional profile record. If any verification fails, the application 112 may ignore the update request, e.g., by not storing the event data.

For each centroid model, e.g., for each unique model identifier, the application 112 can store event data for that model. For example, the application 112 can maintain, for each unique model identifier, a data structure that includes a set of n-dimensional feature vectors (e.g., the profile records of the update tokens) and, for each feature vector, the expiration time. An example data structure for a model identifier is shown in Table 2 below.

TABLE 2

| Feature Vector | Expiration |
|---|---|
| n-dimensional feature vector | Expiration time |
| . . . | . . . |

Upon receiving a valid update token $M_{update}$, the application 112 can update the data structure for the model identifier included in the update token $M_{update}$ by adding the feature vector and expiration time of the update token $M_{update}$ to the data structure. Periodically, the application 112 can purge expired feature vectors from the data structure to reduce storage size. The expiration time in Table 2 is the same expiration time in the update token $M_{update}$ shown in Table 1.

The application 112 determines whether to generate a user profile (306). For example, the application 112 may generate a user profile for a particular centroid model in response to a request from the content platform 150. The request may be to generate the user profile and upload the user profile to the MPC cluster 130. To ensure the security of the request to generate and upload the user profile, the content platform 150 can send, to the application 112, an upload token $M_{upload}$.

The upload token $M_{upload}$ can have a similar structure as the update token $M_{update}$, but with a different operation (e.g., "update server" instead of "accumulate user profile"). The upload token $M_{upload}$ can also include an additional item for an operation delay. The operation delay can instruct the application 112 to delay calculating and uploading the secret shares of the user profile while the application 112 accumulates more event data, e.g., more feature vectors. This enables the centroid model to capture user event data immediately before and after some critical events, e.g., joining a user group. The operation delay can specify the delay time period. In this example, the digital signature can be generated based on the other seven items in Table 1 and the operation delay using the private key of the content platform. The content platform 150 can encrypt the upload token $M_{upload}$ in a similar manner as the update token $M_{update}$, e.g., PubKeyEnc($M_{upload}$, application_public_key), using the application's public key to protect the upload token $M_{upload}$ during transmission.

The application 112 can receive the upload token $M_{upload}$, decrypt the upload token $M_{upload}$ if it is encrypted, and verify the upload token $M_{upload}$. This verification can be similar to the way in which the update token $M_{update}$ is verified. The application 112 can verify the upload token $M_{upload}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the upload token $M_{upload}$ is valid, the application 112 can generate the user profile. If any verification fails, the application 112 can ignore the upload request, e.g., by not generating a user profile.

In some implementations, the content platform 150 can request the application 112 to upload a user profile without encoding the upload request in the form of a profile upload token $M_{upload}$. For example, a script originated from the content platform 150 running inside the application 112 may directly transmit the upload request to the application 112 via a script API, where the application 112 relies on W3C origin-based security model and/or HTTPS to protect the upload request from falsification or leaking, or man-in-the-middle attack.

If a determination is made to not generate a user profile, the process 302 can return to operation 302 and wait for additional event data from the content platform 150. If a determination is made to generate a user profile, the application 112 generates the user profile (308).

The application 112 can generate the user profile based on the stored event data, e.g., the data stored in the data structure shown in Table 2. The application 112 can access the appropriate data structure based on a model identifier included in the request, e.g., the content platform eTLD+1 domain of item 1 and the model identifier of item 2 of the upload token $M_{upload}$.

The application 112 can compute the user profile by aggregating the n-dimensional feature vectors in the data structure in the study period that have not yet expired. For example, the user profile may be the average of the n-dimensional feature vectors in the data structure in the study period that have not yet expired. The result is an n-dimensional feature vector representing the user in the profile space. Optionally, the application 112 may normalize the n-dimensional feature vector to unit length, e.g., using L2 normalization. The content platform 150 may specify the optional study period.

In some implementations, decay rates can be used to calculate the user profiles. As there may be many content platforms 150 that use the MPC cluster 130 to train centroid models and each content platform 150 may have multiple centroid models, storing user feature vector data may result in significant data storage requirements. Using decay techniques can substantially reduce that amount of data that is stored at each client device 110 for the purposes of generating user profiles for training the machine learning models.

Assume that, for a given centroid model, there are k feature vectors $\{F_1, F_2, \ldots F_k\}$, each of which is a n-dimensional vector and their corresponding age (record_age_in_seconds$_i$). The application 112 can compute the user profile using Relationship 1 below:

$$\sum_{i=1}^{k} \left( e^{-\frac{record\_page\_in\_seconds_i}{decay\_rate\_in\_seconds}} \times F_i \right) \qquad \text{Relationship 1}$$

In this relationship, the parameter record_age_in_seconds$_i$ is the amount of time in seconds that the profile record has been stored at the client device 110 and the parameter decay_rate_in_seconds is the decay rate of the profile record in seconds (e.g., received in item 6 of the update token $M_{update}$). In this way, more recent feature vectors carry more weight. This also enables the application 112 to avoid storing feature vectors and only store profile records with constant storage. The application 112 only has to store an n-dimensional vector P and a timestamp user_profile_time for each model identifier, rather than multiple individual feature vectors for each model identifier.

In this relationship, the parameter record_age_in_seconds$_i$ is the amount of time in seconds that the profile record has been stored at the client device 110 and the parameter decay_rate_in_seconds is the decay rate of the profile record in seconds (e.g., received in item 6 of the update token $M_{update}$). In this way, more recent feature vectors carry more weight. This also enables the application 112 to avoid storing feature vectors and only store profile records with constant storage. The application 112 only has to store an n-dimensional vector P and a timestamp user_profile_time for each model identifier, rather than multiple individual feature vectors for each model identifier.

To initialize the n-dimensional vector user profile P and timestamp, the application can set the vector P to a vector of n dimensions where the value of each dimension is zero and set the user_profile_time to epoch. To update the user profile P with a new feature vector $F_x$ at any time, the application 112 can use Relationship 2 below:

$$P = e^{-\frac{current\_time-user\_profile\_time}{decay\_rate\_in\_seconds}} \times P + F_x \qquad \text{Relationship 2}$$

The application 112 can also update the user profile time to the current time (current_time) when updating the user profile with Relationship 2. Note that operation 304 is omitted if the application 112 calculates user profiles with the above decay rate algorithm.

The application 112 generates secret shares of the user profile (310). The application 112 can use a pseudorandom function to split the user profile $P_{current}$ (e.g., the n-dimensional vector $P_{current}$) into secret shares. That is, the application 112 can use pseudorandom function PRF($P_i$) to generate two secret shares {[$P_{current, 1}$],[$P_{current,2}$]} of the user profile $P_{current}$. The exact splitting can depend on the secret sharing algorithm and crypto library used by the application 112. In some implementations, the application uses Shamir's secret sharing scheme.

In some implementations, the application uses additive secret sharing scheme, i.e., the application 112 generates a random (or pseudorandom) n-dimensional vector nonce. In this example, the application can generate a first secret share that is $P_{current}$+nonce and a second secret share that is $P_{current}$−nonce. The application 112 can then delete the n-dimensional vector nonce.

To deter malicious applications 112 from abusing an upload API for uploading the secret shares of the user profiles, the MPC cluster 130 can require that a trust token issuer sign the secret shares. For each of m user groups, denoted by user group identifier $L_i$, and each of the computing systems $MPC_1$ and $MPC_2$ in the MPC cluster 130, the application 112 can initiate a trust token redemption process with a trust token issuer to obtain a Signed Redemption Record (SRR). The m user groups can be the user groups that (i) are managed by the content platform 150 (or digital component provider 160) that sent the upload token $M_{upload}$ and (ii) that include the user as a member, e.g., the user groups identified in the user group list maintained by the application 112.

In the trust token redemption process, the application 112 can redeem a trust token previously issued to the application 112 based on the application 112 and/or the client device 110 being deemed trusted. This can include sending the trust token and information (e.g., a binding and eTLD+1 of the computing system $MPC_1$ or $MPC_2$) to the trust token issuer with a request to redeem the trust token. The trust token issuer can respond by providing an SRR to the application 112. The application 112 can redeem a trust token for each SRR. An example format of an SRR is shown in Table 3 below.

TABLE 3

| Item No. | Content | Description |
|---|---|---|
| 1.1 | Binding | Binds the model identifier, secret share of user profile, user group $L_i$, and application_public_key to the SRR. |
| 1.2 | Publisher Origin | Could be the eTLD + 1 domain of either computing system $MPC_1$ or $MPC_2$. |
| 1.3 | Signing Timestamp | High resolution timestamp (e.g., in milliseconds) to help the MPC cluster 130 detect stale requests or potential replay attacks. |
| 1.4 | Trust Token Issuer ID | The eTLD + 1 domain of the trust token issuer. |
| 1.5 | Digital Signature | The trust token issuer's signature over the rest of the message, verifiable by the trust token issuer's public key. |

The application 112 can calculate, as the binding, a message authentication code (e.g., hash-based message authentication code (HMAC)) of the model identifier, the secret share of user profile for which the SRR was generated, the user group $L_i$, and the public key of the application 112 (application_public_key). For example, the binding can be represented as HMAC(model_id, share, $L_i$, application_public_key). For a given user profile and given centroid model, the application 112 can calculate this code twice, once for each secret share of the user profile $P_{current}$ and thus one for each computing system $MPC_1$ and $MPC_2$. For example, the parameter "share" for the SRR for computing system $MPC_1$ can be [$P_{current, 1}$] and the parameter "share" for the SRR for computing system $MPC_2$ can be [$P_{current, 2}$].

The trust token issuer can generate the timestamp and the digital signature. The trust token issuer can generate the digital signature using a private key of the trust token issuer. This enables recipients of the SRR to verify the signature using a public key corresponding to the private key.

For each of m user groups, denoted by user group identifier $L_i$, and each of the computing systems $MPC_1$ and $MPC_2$ in the MPC cluster 130, the application 112 can then create a user profile update token $M_{profileupdate}$ for transmission to the MPC cluster 130. An example format for the user profile update token $M_{profileupdate}$ is shown in Table 4 below.

TABLE 4

| Item No. | Content | Description |
|---|---|---|
| 1 | Model ID (model_id) | The model identifier for the centroid model. This can be calculated as HMAC(owner_domain, owner_domain_id). The owner domain can be the eTLD + 1 of the owner of the centroid model and the owner domain ID can be the identifier of the model given to the model by the owner. |
| 2 | Secret Share of the User Profile | E.g., first secret share or second secret share if the MPC cluster 130 includes two computing systems. |
| 3 | User Group Identifier ($L_i$) | E.g., calculated as HMAC(owner_domain, owner_domain_list_id). The owner domain list identifier can be the user group identifier given to the user group by the owner. |

TABLE 4-continued

| Item No. | Content | Description |
|---|---|---|
| 4 | Application Public Key (application_ public_key) | Public key of the application, e.g., created by the application, dedicated to the current user profile update request. |
| 5 | Token Creation Timestamp | High resolution timestamp (e.g., in milliseconds) to help the recipient detect stale requests or potential replay attacks. |
| 6 | SRR | The Signed Redemption Request for the user profile update request. |
| 7 | Digital Signature | The application's signature over the rest of the message, verifiable by the application's issuer's public key in item 4. |

The application 112 can generate the timestamp and the digital signature. The application 112 can generate the digital signature using a private key of the application 112 that corresponds to the public key in item 4. This enables recipients of the user profile update token $M_{profileupdate}$ to verify the signature using a public key corresponding to the private key.

A compromised application 112 may initiate the user profile update operation on its own, instead of acting per the request of the content platform 150 using the user profile update token $M_{profileupdate}$. To enable the MPC cluster 130 to detect such a situation, the application 112 can optionally include the update token $M_{update}$ received from the content platform 150 in the user profile update token $M_{profileupdate}$.

The application 112 transmits a request to update the user profiles for the model(s) at the MPC cluster 130 using the user profile of the user (312). Each request can include a secret share of the user profile. For example, the application 112 can transmit the user profile update token $M_{profileupdate}$ having the first secret share $[P_{current, 1}]$ of the user profile $P_{current}$ to computing system $MPC_1$ and transmit the user profile update token $M_{profileupdate}$ having the second secret share $[P_{current, 2}]$ of the user profile $P_{current}$ to computing system $MPC_2$. The application 112 can perform this operation for each model identifier for which user profile update tokens were created.

In this process, for each of the two computing systems $MPC_1$ and $MPC_2$ in the MPC cluster 130, the application 112 sends m requests to update the user profiles, one for each of the m user groups. It may be possible for a compromised computing system in the MPC cluster 130 to correlate those m requests. Such an attack may allow the compromised computing system to learn that an application 112 (and its user) may belong to multiple user groups and the identifiers of those groups.

To mitigate this risk, the MPC cluster 130 can be leveraged. To upload secret shares to computing system $MPC_1$, the application 112 can send a single request to computing system $MPC_2$ with all user profile update tokens with first secret shares $[P_{current, 1}]$ of the user profile meant for computing system $MPC_1$ individually encrypted with the public key of computing system $MPC_1$. This single request can include a set of encrypted results in the form of: PubKeyEnc($M_{profileupdate\_1}$, $MPC_1$), PubKeyEnc ($M_{profileupdate\_2}$, $MPC_1$), . . . PubKeyEnc($M_{profileupdate\_m}$, $MPC_1$), where PubKeyEnc represents a probabilistic asymmetric encryption algorithm and $MPC_1$ represents an asymmetric public key of computing system $MPC_1$.

The probabilistic nature of PubKeyEnc provides semantic security. A semantic secure scheme is one in which only negligible information can be extracted from the encrypted result. Without colluding with computing system $MPC_1$, computing system $MPC_2$ cannot infer any information from the list of encrypted tokens. The computing system $MPC_2$ can break up the list of tokens and send m requests to computing system $MPC_1$, one request per user profile update token $M_{profileupdate}$. The computing system $MPC_2$ can use random or pseudorandom delays between successive requests. In another example, computing system $MPC_2$ can batch upload multiple requests from multiple applications 112 running on multiple client devices 110 to computing system $MPC_1$ to prevent correlating requests from the same application 112.

The application 112 can use a similar technique to upload the second secret shares for computing system $MPC_2$. That is, the application 112 can send a single request to computing system $MPC_1$ with all user profile update tokens with second secret shares $[P_{current, 2}]$ of the user profile meant for computing system $MPC_2$ individually encrypted with the public key of computing system $MPC_2$. This single request can include a set of encrypted results in the form of: PubKeyEnc($M_{profileupdate\_1}$, $MPC_2$), PubKeyEnc ($M_{profileupdate\_2}$, $MPC_2$), PubKeyEnc($M_{profileupdate\_m}$, $MPC_2$), where $MPC_2$ represents an asymmetric public key of computing system $MPC_2$. The computing system $MPC_1$ can break up the list of tokens and send m requests to computing system $MPC_2$, one request per user profile update token $M_{profileupdate}$, e.g., using delay or batch uploads as described above. Given the large number of requests that may be received by the computing systems $MPC_1$ and $MPC_2$, it would be difficult if not impossible for either computing system $MPC_1$ or $MPC_2$ to correlate tokens with individual client devices 110 using these techniques.

The computing systems $MPC_1$ and $MPC_2$ can verify each received request to update a user profile. Upon receiving a request having an encrypted result PubKeyEnc ($M_{profileupdate\_i}$, $MPC_j$), where j is 1 or 2 depending on the computing system, the computing system $MPC_j$ decrypts the encrypted result to recover the user profile update token $M_{profileupdate\_i}$, in cleartext. The computing system $MPC_j$ validates the user profile update token $M_{profileupdate\_i}$. To do so, the computing system $MPC_j$ verifies the digital signature in item 1.5 of the SRR (see Table 3) using the public key fetched from the trust token issuer domain in item 1.4 of the SRR. The computing system $MPC_j$ can also verify the digital signature in item 7 of the user profile update token $M_{profileupdate\_i}$, (see Table 4) using the public key of the application 112 that sent the $M_{profileupdate\_i}$, to the MPC cluster 130.

The computing system $MPC_j$ can also verify the signing timestamp of item 1.3 of the SRR for staleness, e.g., by ensuring that the timestamp is within a threshold duration of a current time at which the verification is being performed. The computing system $MPC_j$ can also verify that the publisher origin in item 1.2 of the SRR matches the identity of the current computing system $MPC_j$. The computing system $MPC_j$ can also verify that the value of the binding in item 1.1 of the SRR matches HMAC(model_id, share, $L_i$, application_public_key) calculated from items 1-4 in the user profile update token $M_{profileupdate\_i}$. The computing system MPC can also verify that the toke creation timestamp in item 5 of the user profile update token $M_{profileupdate\_i}$ is not stale, e.g., by ensuring that the token creation timestamp is within a threshold duration of a current time at which the verification is being performed. The computing system $MPC_j$ can also use the token creation timestamp to detect a potential replay attack, e.g., based on multiple user profile update tokens having the same token creation timestamp. If any of these verifications fail, the computing system $MPC_j$ can ignore the request.

Each computing system MPC1 and MPC2 can maintain a table (or other appropriate data structure) that includes data for each centroid model. For example, the table can be in the form of Table 5 below.

TABLE 5

| Model ID | User Group ID | Sum of All Shares | Number of Applications |
|---|---|---|---|
| model_id | $L_i$ | sum_of_shares | number_of_applications |
| . . . | . . . | . . . | . . . |

The row for a centroid model includes the model identifier (model_id), the user group identifier ($L_i$) for the user group included in the model, the sum of all shares of user profiles received for the centroid model, and the number of unique applications 112 (e.g., number of unique client devices) that submitted a secret share of a user profile for the centroid model and for which its secret shares are included in the sum of all shares for the centroid model. The sum of all shares is an n-dimensional vector corresponding to the n-dimensional vector of the user profiles.

When a model/user group pair {model_id, $L_i$} is received that the computing system $MPC_j$ has never received before, the computing system $MPC_j$ can initialize the sum of all shares for the centroid model to a zero vector and initialize the number of applications to zero. To process a valid request to update the user profiles for a centroid model that includes a particular model/user group pair, the computing system $MPC_j$ can find the row for the centroid model/user group pair in the table and update the sum of all shares and the number of applications for the centroid model/user group pair. For example, the computing system $MPC_j$ can add the received secret share of the user profile to the sum of all shares for the centroid model/user group pair and increment the number of applications by one.

Example Processes for Generating and Using Centroid Models

FIG. 4 is a flow diagram that illustrates an example process 400 for generating centroid models. Operations of the process 400 can be implemented, for example, by the MPC cluster 130 of FIG. 1. Operations of the process 400 can also be implemented as instructions stored on one or more computer readable media which may be non-transitory, and execution of the instructions by one or more data processing apparatus can cause the one or more data processing apparatus to perform the operations of the process 400. Although the process 400 is described in terms of generating multiple centroid models, the process 400 can also be used to generate a single centroid model for a single user group. As described above, the process for calculating the centroids can also be used in a preprocessing phase for k-NN or other machine learning models that are based on user groups rather than individual user profiles.

Each computing system $MPC_1$ and $MPC_2$ obtains a table of user profile data (402). For example, the table can be in the form of Table 5 above. The computing system $MPC_1$ can obtain a table that includes, for each model identifier and user group pair, the sum of first secret shares $[P_{current, 1}]$ received from applications 112 for the user group included in the centroid model identifier by the model identifier and user group ID. Similarly, the computing system $MPC_2$ can obtain a table that includes, for each model identifier and user group pair, the sum of second secret shares $[P_{current, 2}]$ received from applications 112 for the user group included in the centroid model identifier by the model identifier and user group ID.

Each computing system $MPC_1$ and $MPC_2$ enforces a user group size threshold on each model identifier (404). For example, each computing system $MPC_1$ and $MPC_2$ can enforce the size threshold on each row of its table. To enforce the user group size threshold, each computing system $MPC_1$ and $MPC_2$ can determine whether the number of applications for a model identifier exceeds a predefined size threshold.

The computing systems $MPC_1$ and $MPC_2$ notify each other the rows of the table (e.g., the information for each model identifier/user group ID pair) that satisfies the size threshold (406). For example, computing system $MPC_1$ can send, to computing system $MPC_2$, the model identifier, the user group identifier, and the number of applications of each row for which the number of applications exceeds the size threshold. In addition, computing system $MPC_1$ can send, to computing system $MPC_2$, the second half of the sum of shares vector (sum_of_shares$_1$) for each of these rows to computing system $MPC_2$. The transmission of only the second half of sum_of_shares$_1$ based on the horizontal partitioning strategy discussed below.

Similarly, computing system $MPC_2$ can send, to computing system $MPC_1$, the model identifier, the user group identifier, and the number of applications of each row for which the number of applications exceeds the size threshold. In addition, computing system $MPC_2$ can send, to computing system $MPC_1$, the first half of the sum of shares vector (sum_of_shares$_2$) for each of these rows to computing system $MPC_1$.

The computing system $MPC_1$ matches the rows of its table for which the number of applications exceeds the size threshold with the rows received from computing system $MPC_2$. For example, the computing system $MPC_1$ can use the model identifier and/or the user group identifiers of the rows to match corresponding rows that are for the same model and user group. Similarly, the computing system $MPC_2$ matches the rows of its table for which the number of applications exceeds the size threshold with the rows received from computing system $MPC_1$. For example, the computing system $MPC_2$ can use the model identifier and/or the user group identifiers of the rows to match corresponding rows that are for the same model and user group. An example result of this size threshold enforcement and cross-notification in tabular form at computing system $MPC_1$ is shown in Table 6 below.

TABLE 6

| Model ID | User Group ID | Sum of All Shares from $MPC_1$ | Number of Applications from $MPC_1$ | Sum of All Shares from $MPC_2$ | Number of Applications from $MPC_2$ |
|---|---|---|---|---|---|
| model_id | $L_i$ | sum_of_shares$_1$ | num_of_applications$_1$ | $1^{st}$ half of sum_of_shares$_2$ | num_of_applications$_2$ |
| . . . | . . . | . . . | . . . | . . . | . . . |

Similarly, an example result of the size threshold enforcement and cross-notification in tabular form at computing system $MPC_2$ is shown in Table 7 below.

TABLE 7

| Model ID | User Group ID | Sum of All Shares from $MPC_2$ | Number of Applications from $MPC_2$ | Sum of All Shares from $MPC_1$ | Number of Applications from $MPC_1$ |
|---|---|---|---|---|---|
| model_ id | $L_i$ | sum_of_ shares$_2$ | num_of_ applications$_2$ | $2^{nd}$ half of sum_of_ shares$_1$ | num_of_ applications$_1$ |
| . . . | . . . | . . . | . . . | . . . | . . . |

For each row, in an ideal situation, the values in "Number of Applications from $MPC_1$," and "Number of Applications from $MPC_2$," should be the same if both are present for a given mode identifier. Due to delays in processing, the two values might have slight differences. If both values are present and the two values vary significantly, or if one of the values does not exceed the size threshold, the computing system that provided the value that does not exceed the size threshold may be compromised. For those rows that the values in "Number of Applications from $MPC_1$," and "Number of Applications from $MPC_2$," meet a closeness threshold (e.g., that are within a threshold difference of each other) and both exceed the size threshold, the computing system can calculate its centroid.

The computing systems $MPC_1$ and $MPC_2$ calculate centroids for the centroid models (408). The computing system $MPC_1$ can calculate the first half of the centroid vector of the user groups in the rows that meet the closeness (e.g., within the threshold difference) and size thresholds. The computing system $MPC_1$ can calculate the centroid for a model identifier and user group (e.g., for a row) using Relationship 3 below.

$$\text{Relationship 3}$$

$$\text{Centroid}(\text{model}_{id}, L_i) = \frac{2 \times (\text{first half of sum\_of\_shares}_1 + \text{first half of sum\_of\_shares}_2)}{num\_\text{of\_applications}_1 + num\_\text{of\_applications}_2}$$

Similarly, computing system $MPC_2$ can calculate the centroid for a model identifier and user group (e.g., for a row) using Relationship 4 below.

$$\text{Relationship 4}$$

$$\text{Centroid}(\text{model}_{id}, L_i) = \frac{2 \times (\text{second half of sum\_of\_shares}_1 + \text{second half of sum\_of\_shares}_2)}{num\_\text{of\_applications}_1 + num\_\text{of\_applications}_2}$$

The centroid of a user group is generally not privacy sensitive and cannot easily be manipulated to allow malicious applications 112, content platforms 150, or computing systems $MPC_1$ and $MPC_2$ of the MPC cluster 130 to steal user profiles.

At the end of this process, computing system $MPC_1$ has the first half of centroids for all lists exceeding the list size threshold. An example of the result of this process is shown in tabular form in Table 8 below. The computing system $MPC_2$ has the same data for the second half of the centroid vector for each model identifier and user group identifier. The trained centroid model for the user groups can include a first centroid model that includes the first half of the centroid for each of these user groups and a second centroid model that includes the second half of the centroid for each user group.

TABLE 8

| Model ID | User Group ID | Centroid | List Size |
|---|---|---|---|
| model_id | $L_i$ | First half of centroid vector | $\dfrac{num\_of\_applications_1 + num\_of\_applications_2}{2}$ |
| . . . | . . . | . . . | . . . |

FIG. 5 is a swim lane diagram that illustrates an example process 500 for adding a user to user groups using centroid models. Operations of the process 500 can be implemented, for example, by the MPC cluster 130 and the client device 110 of FIG. 1, e.g., the application 112 running on the client device 110. Operations of the process 500 can also be implemented as instructions stored on one or more computer readable media which may be non-transitory, and execution of the instructions by one or more data processing apparatus can cause the one or more data processing apparatus to perform the operations of the process 500.

An application 112 running on the client device 110 can query the MPC cluster 130 for suggested user groups for a user in response to a request from a content platform 150 or digital component provider 160. For example, the request can be to determine whether the user should be added to a user group owned by the requester using the centroid models generated for and owned by the requester. For example, a content platform 150 can manage many user groups and the MPC cluster 130 can train and use one or more centroid models for the user groups to determine whether users should be added to those user groups.

To request the application to query a centroid model, the requester can transmit, to the client device 110 a download groups token $M_{download}$. The token $M_{download}$ can have the following items shown and described in Table 9 below.

TABLE 9

| Item No. | Content | Description |
|---|---|---|
| 1 | Content Platform's eTLD + 1 domain | Uniquely identifies the content platform, i.e., the owner of the model (would be similar for digital component provider if owned by digital component provider) |
| 2 | Content Platform Model ID | Unique model identifier assigned by content platform (same for digital component provider if owner) |
| 3 | Threshold Distance (d) | The maximum allowed distance between the user profile and the centroid of fetched user groups |
| 4 | Token Creation Timestamp | High-resolution timestamp (e.g., in milliseconds) indicating when this token is created |
| 5 | Operation | Fetch user groups |
| 6 | Digital Signature | The content platform's digital signature over the rest of the token (e.g., over items 1-5) using content platform's private key |

In some implementations, the content platform 150 can encrypt the download groups token $M_{download}$ using the public key of the application 112. The content platform 150 can then invoke an API of the application to fetch user group identifiers via its own or an SSP's script. The application 112 can decrypt and validate the download groups token $M_{download}$ in the same way it decrypts and validates the user profile update token $M_{profileupdate}$.

For a given tuple of model_id, user profile P, and threshold distance d, the application 112 should fetch all user group identifiers $L_i$, where $|P-\text{Centroid}(\text{model\_id}, L_i)|<d$. In this example, the function "Centroid(model_id, $L_i$) returns the value in the Centroid column from the row marked by model_id and $L_i$ in Table 8.

To prevent either computing system $MPC_1$ or $MPC_2$ from learning the user profile P in its entirety, the application 112 divides the user profile P for the user into portions (502). The application 112 can divide the user profile into a respective portion for each computing system of the MPC cluster 130. In this example, the application 112 can split the user profile into two portions, a first portion for computing system $MPC_1$ and a second portion for computing system $MPC_2$. Assuming the user profile P is an n-dimensional vector and the user profile $P=\{p_1, p_2, \ldots, p_n\}$, the two halves $P_1$ and $P_2$ would be $P_1=\{p_1, p_2, \ldots, p_{n/2}\}$ and $P_2=\{p_{n/2+1}, \ldots, p_n\}$. The computing systems $MPC_1$ and $MPC_2$ can calculate their centroids of user groups accordingly, i.e., Centroid(model_id, $L_i$) becomes $\text{Centroid}_1(\text{model\_id}, L_i)$ and $\text{Centroid}_2$ (model_id, $L_i$).

In some implementations, the application 112 can also add differential privacy noise to better protect user privacy. For example, the application 112 can add one-time user noise $\Delta P$ to the user profile P, e.g., prior to splitting the user profile P into portions.

Let $P'=P+\Delta P$. The application 112 applies a horizontal partition to divide P' into two halves, $P_1'$ and $P_2'$. Let $d'=d+|\Delta P|$. The application 112 sends the first half $P_1'$ to computing system $MPC_1$ (504). For example, the application 112 can send a request with two parameters $\{P_1', d'\}$ to the computing system $MPC_1$. The request can be to fetch all user group identifiers $L_i$ where $|P_1'-\text{Centroid}_1(\text{model\_id}, L_i)|<d'$.

Similarly, the application 112 sends the second half $P_2'$ to computing system $MPC_2$ (506). For example, the application 112 can send a request with two parameters $\{P_2', d'\}$ to computing system $MPC_2$. The request can be to fetch all user group identifiers $L_i$ where $|P_2'-\text{Centroid}_1(\text{model\_id}, L_i)|<d'$.

In certain implementations where the model is desired to be trained based on conversions of digital components by users, it may be taken into account that occurrence of conversion can often happen a long time after an impression or a click, in which case it can be advantageous to keep the MPC cluster 130 available to perform other tasks so as to optimize bandwidth, storage, and processing by the content platform 150. In such implementations, the operations 504 and 508 can be replaced by an alternative process where (i) the application 112 transmits the encrypted shares of the user profile and the labels along with a first party cookie to a demand-side platform (DSP), which may be a part of the content platform 150 in some implementations and separate from the content platform 150 in other implementations, (ii) the DSP then uses a first party cookie to map (i.e. associate) the encrypted shares of the user profile and labels with interaction data that can be specific to conversions (e.g. whether conversion occurred within a preset period of time such as 30 days), and (iii) the DSP then transmit this mapping to the computing system $MPC_1$ or $MPC_2$ to train the machine learning model. While this description focuses on the interaction of conversions, this architecture and functionality can be extended to any other interaction (e.g.

impressions or clicks), or any combination of interactions (e.g. impressions, clicks, and/or conversions).

The computing system $MPC_1$ can determine user groups having a centroid within a threshold distance d' of the first half $P_1'$ of the user profile P' (508). The computing system $MPC_1$ can determine, for each user group, the distance between the first half $P_1'$ and the centroid for the user group, i.e., $|P_1'-\text{Centroid}_1(\text{model\_id}, L_i)|$. The application 112 can then determine which user groups have a distance that is less than the distance d'. The user group identifiers for these user groups can be represented by $U_1$.

Similarly, the computing system $MPC_2$ can determine user groups having a centroid within a threshold distance d' of the second half $P_2'$ of the user profile P' (510). The computing system $MPC_2$ can determine, for each user group, the distance between the second half $P_2'$ and the centroid for the user group, i.e., $|P_2'-\text{Centroid}_2(\text{model\_id}, L_i)|$. The application 112 can then determine which user groups have a distance that is less than the distance d'. The user group identifiers for these user groups can be represented by $U_2$.

The computing system $MPC_1$ transmits the set of user group identifiers $U_1$ to the application 110 (512). Similarly, the computing system $MPC_2$ transmits the set of user group identifiers $U_2$ to the application 110 (514).

The application 112 can calculate the set U of all user group identifiers Li that satisfy $|P-\text{Centroid}(\text{model\_id}, L_i)|<d$ using the sets $U_1$ and $U_2$. As $U\subseteq(U_1\cup U_2)$, the application 112 can calculate the set U from $U_1$ and $U_2$ because $U=\{L_i\}$ where $|P-\text{Centroid}(\text{model\_id}, L_i)|<d$ and $L_i\in U_1\cup U_2$.

The previous approach assumes that the centroid of user groups are not privacy sensitive and it is acceptable to leak the superset of user groups, i.e., $U_1 U_1$ and $U_2 U_2$, that the browser should join to either $MPC_1$ and $MPC_2$. In situations demanding stronger privacy protection, the following approach can be used. FIG. 6 is a swim lane diagram that illustrates an example process 600 for generating a centroid model and using the centroid model to add a user to a user group corresponding to the centroid model with much stronger privacy protection. Operations of the process 600 can be implemented, for example, by the MPC cluster 130 and the client device 110 of FIG. 1, e.g., the application 112 running on the client device 110. Operations of the process 600 can also be implemented as instructions stored on one or more computer readable media which may be non-transitory, and execution of the instructions by one or more data processing apparatus can cause the one or more data processing apparatus to perform the operations of the process 600.

The MPC cluster 130 can train a centroid model for one or more user groups. In this example, the centroid models are queried using secret shares of user profiles. Thus, each computing system $MPC_1$ and $MPC_2$ can determine a respective secret share of the centroid of the user group using secret shares of user profiles of a training set, e.g., secret shares of user profiles uploaded by client devices 110.

For each user group, computing system $MPC_1$ calculates a first secret share of the centroid of the user group (602). The centroid for a centroid model identified by model identifier model_id and for a user group identified by user group identifier $L_i$ can be represented as sum_of_profile (model_id, $L_i$). The first secret share $[\text{sum\_of\_profile}_{model\_id, i, 1}]=\Sigma[P_{j,1}]$ for all user profiles $P_i$ that is a member of the user group $L_i$. That is, the first secret share of the centroid for user group $L_i$ represents a sum of the first secret shares of the user profiles $P_i$ in the user group $L_i$.

For each user group, computing system $MPC_2$ calculates a second secret share of the centroid of the user group (604). The centroid for a centroid model identified by model identifier model_id and for a user group identified by user group identifier $L_i$ can be represented as sum_of_profile (model_id, $L_i$). The second secret share [sum_of_profile$_{model\_id, i, 2}$]=$\Sigma[P_{j,2}]$ for all user profiles $P_i$ that is a member of the user group $L_i$. That is, the second secret share of the centroid for user group $L_i$ represents a sum of the second secret shares of the user profiles $P_i$ in the user group $L_i$.

The centroid model can include the first share of the centroid for each user group and the second share of the centroid of each user group. The first share of each centroid can be maintained confidentially at computing system $MPC_1$ and the second share of each centroid can be maintained confidentially at computing system $MPC_2$.

An application 112 running on the client device 110 divides the user profile of the user into secret shares (606). For example, the application 112 can calculate a first secret share [$P_1$] of the user profile P for computing system $MPC_1$ and a second secret share [$P_2$] of the user profile P for computing system $MPC_2$. The exact splitting can depend on the secret sharing algorithm and crypto library used by the application 112. In some implementations, the application uses Shamir's secret sharing scheme.

The application 112 sends a request to fetch user group identifiers for the user to computing system $MPC_1$ (608). The request can include the first secret share [$P_1$] of the user profile P. In some implementations, the request includes a query token $M_{query1}$. An example format of the query token is shown in Table 9 below.

The application 112 sends a request to fetch user group identifiers for the user to computing system $MPC_2$ (610). The request can include the second secret share [$P_2$] of the user profile P. In some implementations, the request includes a query token $M_{query2}$. An example format of the query token is shown in Table 9 below.

TABLE 9

| Item No. | Content | Description |
|---|---|---|
| 1 | Model Identifier (model_id) | Unique identifier for the centroid model being queried |
| 2 | User Profile Secret Share | [$P_1$] if the recipient of the token is $MPC_1$ or [$P_2$] if the recipient is $MPC_2$ |
| 3 | Threshold Distance (d) | The maximum allowed distance between the user profile and the centroid of fetched user groups |
| 4 | Token Creation Timestamp | High-resolution timestamp (e.g., in milliseconds) indicating when this token is created |
| 5 | Destination Domain | Domain of $MPC_1$ if $MPC_1$ is the recipient of the token or domain of $MPC_2$ if $MPC_2$ is the recipient of the token |
| 6 | SRR | Signed Redemption Record from redeeming a trust token for the request |
| 7 | Application Public Key (application_public_key) | The application's public key. The SRR can bind the key by carrying SHA256(application_pulic_key) |
| 8 | Digital Signature | The content platform's digital signature over the rest of the token (e.g., over items 1-7) |

In some implementations, the application 112 can send two separate requests, as shown in FIG. 6. To save bandwidth and battery consumption of the client device 110, the application 112 can combine the two requests (e.g., the two query tokens $M_{query1}$ and $M_{query2}$) into a single request and send the single request to one of the computing systems $MPC_1$ or $MPC_2$. To do so, the application 112 can encrypt the query token intended to the other computing system $MPC_1$ or $MPC_2$. For example, the application 112 can encrypt the query token $M_{query2}$ using an encryption public key of computing system $MPC_2$, e.g., using a probabilistic asymmetric public key algorithm. For example, the application 112 can generate the encryption result PubKeyEnc ($M_{query2}$, $MPC_2$) using a public key of computing system $MPC_2$. The application 112 can then send the query token $M_{query1}$ and the encryption result PubKeyEnc($M_{query2}$, $MPC_2$) to computing system $MPC_1$.

The computing system $MPC_1$ can validate the query token $M_{query1}$ in a similar manner as the computing system $MPC_1$ validates the update token $M_{profileupdate}$, as described above with reference to FIG. 3. The computing system $MPC_1$ can also transmit a request with the encryption result PubKey-Enc($M_{query2}$, $MPC_2$) to computing system $MPC_2$. The computing system $MPC_2$ can decrypt the encryption result using its private key corresponding to the public key used to encrypt the query token $M_{query2}$. The computing system $MPC_2$ can then validate the query token $M_{query2}$ in a similar manner as the computing system $MPC_2$ validates the update token $M_{profileupdate}$, as described above with reference to FIG. 3.

In some implementations, each computing system $MPC_1$ and $MPC_2$ can determine, for each of multiple user groups associated with a centroid model, respective secret shares of user group eligibility eligible_group$_i$ for the user group. The user group eligibility eligible_group$_i$ for a user profile and user group indicates whether the user profile of the user is within the threshold distance of the centroid of the user group based on the centroid model.

In this example, each computing $MPC_1$ and $MPC_2$ can look up all user groups $L_i$ associated with a model identifier model_id, where $1 \le i \le N$ and N is the number of user groups associated with the model identifier model_id. For each user group $L_i$, computing system $MPC_1$ can calculate a first secret share of the square of Euclidean distance [$d_{i, 1}$] using Relationship 5 below.

$$[d_{i,1}]=\Sigma([P_1] \times \text{num\_apps\_group}_i - [\text{sum\_of\_profile\_model\_id}_{i,1}])^2 \qquad \text{Relationship 5:}$$

In Relationship 5, the parameter num_apps_group$_i$ represents the number of applications (e.g., number of unique users) in the user group and for which user profiles were used to generate the centroid for the user group $L_i$. The computing system $MPC_1$ can then calculate the first secret share [eligible_group$_{i, 1}$] of the user group eligibility eligible_group$_i$ for the user profile and user group using Relationship 6 below:

$$[\text{eligible\_group}_{i,1}]=[d_{i,1}]<(\text{num\_apps\_group}_i \times d)^2 \qquad \text{Relationship 6:}$$

That is, computing system $MPC_1$ can calculate whether the first secret share of the Euclidean distance is less than the threshold distance. The computing system $MPC_2$ can compute the second secret share [eligible_group$_{i, 2}$] of the user group eligibility eligible_group$_i$ for the user profile and user group in a similar manner using Relationships 7 and 8 below.

$$[d_{i,2}]=\Sigma([P_2] \times \text{num\_apps\_group}_i - [\text{sum\_of\_profile\_model\_id}_{i,2}])^2 \qquad \text{Relationship 7:}$$

$$[\text{eligible\_group}_{i,2}]=[d_{i,2}]<(\text{num\_apps\_group}_i \times d)^2 \qquad \text{Relationship 8:}$$

Each computing system $MPC_1$ and $MPC_2$ can transmit their respective secret shares of the user group eligibility to the application 112. The application 112 can then combine the secret shares to determine whether to add the user to the user group. As the response size is proportional to the number of user groups in the model, the response size can be large for content platforms that have a large number of user groups associated with a centroid model. However, this technique for determining whether to add a user to a user group can be used when the number of user groups is small or bandwidth consumption is not a concern. The remaining operations of this process 600 provides an improvement over this technique that can be used when the number of user groups may be large and greatly reduces the response size.

Conceptually, for a user group eligibility eligible_group$_i$ for a user profile and user group, the application 112 can randomly or pseudorandomly generate two numbers $g_i$ and $h_i$ each of which has a value of either zero or one with equal probability. In this example, the sum of $g_i$ and $h_i$ would be zero with 25% probability, one with 50% probability, or two with 25% probability.

The application 112 can estimate the value of the user group eligibility eligible_group$_i$ to be $(g_i+h_i)==1$. Via Table 10 below, the MPC cluster 130 can inform the application 112 whether its estimation was correct.

TABLE 10

| eligible_group$_i$ | $g_i + h_i$ | | |
|---|---|---|---|
| | 0 | 1 | 2 |
| 0 | 1 | 0 | 1 |
| 1 | 0 | 1 | 0 |

For example, if $g_i+h_i==1$ and eligible_group$_i==1$, the application estimated the value of eligible_group$_i$ correctly such that the corresponding cell's value is 1. On the other hand, if $g_i+h_i==2$ and eligible_group$_i==1$, the application 112 estimated the value of eligible_group$_i$ incorrectly such that the corresponding cell's value is 0. In this case, the application 112 can flip its estimation so that the application 112 can estimate the value of eligible_group$_i$ correctly. It can be verified that the above table is equivalent to:

$$(1-\text{eligible\_group}_i) \times (1-(g_i+h_i-1)^2)+\text{eligible\_group}_i \times (g_i+h_i-1)^2$$

To implement this concept using secure MPC, the application 112 can generate two random (or pseudorandom) seeds (e.g., of 16 bytes or another appropriate data size) $seed_1$ and $seed_2$ (612). The application 112 can send the first seed $seed_1$ to computing system $MPC_1$. The application 112 can send the second seed $seed_2$ to computing system $MPC_2$.

The MPC cluster 130 can use a pseudorandom function (PRF) and the seeds to generate the numbers $g_i$ and $h_i$, which may be random or pseudorandom. The PRF can be a function that generates a value of either 0 or 1 with a 50% probability. For example, the PRF can be one such that $PRF(\text{seed},i) \rightarrow \{0, 1\}$. Computing system $MPC_1$ can generate $g_i$ using the PRF and $seed_1$ (e.g., $PRF(\text{seed}_{1, i})$) and computing system $MPC_2$ can generate $h_i$ using the PRF and $seed_2$ (e.g., $PRF(\text{seed}_{2, i})$. The numbers $g_i$ and $h_i$ are two additive secret shares of $g_i+h_i$ (which is the application's estimate of whether the user should be added to user group $L_i$), which can be represented as $[g_i]$ and $[h_i]$ to indicate that they are secret shares.

Instead of calculating $$(1-\text{eligible\_group}_i) \times (1-(g_i+h_i-1)^2)+\text{eligible\_group}_i \times (g_i+h_i-1)^2$$

in cleartext, the MPC cluster 130 calculates $$(1-[\text{eligible\_group}_i]) \times (1-([g_i+h_i]-1)^2)+[\text{eligible\_group}_i] \times ([g_i+h_i]-1)^2$$

in secret shares. Note that in this equation, it includes a square of a secret share and the multiplication between two secret shares. The calculation of the square and multiplication using a secure MPC process between computing systems $MPC_1$ and $MPC_2$ can require one round of remote procedure calls (RPCs) between the two computing systems $MPC_1$ and $MPC_2$. All other operations can be performed locally within each computing system $MPC_1$ and $MPC_2$.

In particular, each of the computing systems $MPC_1$ and $MPC_2$ can calculate a secret share of an estimation flag flag$_i$ for each user group $L_i$. The estimation flag flag$_i$ for a user group indicates whether the application 112 estimated correctly whether the user should be added to the user group correctly.

The computing system $MPC_1$ calculates the first secret share $[\text{flag}_{i, 1}]$ of the estimation flag flag$_i$ for each user group $L_i$ (618). The computing system $MPC_1$ can calculate the first secret share $[\text{flag}_{i, 1}]$ of the estimation flag flag$_i$ for each user group $L_i$ using Relationship 9 below.

$$[\text{flag}_{i,1}]=(1-[\text{eligible\_group}_{i,1}]) \times (1-([g_i]-1)^2)+[\text{eligible\_group}_{i,1}] \times ([g_i]-1)^2 \qquad \text{Relationship 9:}$$

The computing system $MPC_2$ calculates the second secret share $[\text{flag}_{i, 2}]$ of the estimation flag flag$_i$ for each user group $L_i$ (620). The computing system $MPC_2$ can calculate the second secret share $[\text{flag}_{i, 2}]$ of the estimation flag flag$_i$ for each user group $L_i$ using Relationship 10 below.

$$[\text{flag}_{i,2}]=(1-[\text{eligible\_group}_{i,2}]) \times (1-([h_i]-1)^2)+[\text{eligible\_group}_{i,2}] \times ([h_i]-1)^2 \qquad \text{Relationship 10:}$$

The computing systems $MPC_1$ and $MPC_2$ reconstruct the estimation flag flag$_i$ for each user group $L_i$ (622). The computing systems $MPC_1$ and $MPC_2$ can reconstruct the estimation flag flag$_i$ for each user group $L_i$ based on the two secret shares $[\text{flag}_{i, 1}]$ using one RPC between the two computing systems $MPC_1$ and $MPC_2$. If the value of the estimation flag flag$_i$ for a user group $L_i$ is one, the application estimated whether the user should be added to the user group $L_i$ accurately. Because neither computing system $MPC_1$ nor $MPC_2$ knows what the application 112 actually estimated, knowing the value of the estimation flag flag$_i$ for a user group $L_i$ does not leak any information to the computing systems $MPC_1$ or $MPC_2$.

The computing system $MPC_1$ transmits the estimation flags flag$_i$ for each user group $L_i$ to the application 112 (624). For example, computing system $MPC_1$ can transmit $\{\text{flag}_1, \text{flag}_2, \dots\}$ for the user groups to the application 112. Cleartext flag$_i$ has a value of either zero or one, i.e., indicating whether estimated correctly or incorrectly. That is, a value of one means that the application 112 estimated whether the user should be added to the i-th group correctly and a value of zero if not. Therefore, each cleartext flag$_i$ can be represented by 1 bit.

For each user group associated with the centroid model, computing system $MPC_1$ can return a single bit (flag$_i$). For a centroid model with one million user groups, the response size would be 128 kilobytes (KB), which is practical based on the required latency of the requests and the frequency at which the requests are submitted to the MPC cluster 130.

The application 112 determines whether to add the user to user groups based on the estimation flags (626). For each user group, the application can calculate flag$_i==(g_i+h_i==1)$.

The operation "==" represents an equality operation that returns true if both values are equal. If the result of the calculation is true, the application 112 should join the i-th user group associated with the centroid model.

The application 112 can then request the user group identifiers for the user groups that the application 112 should join from the MPC cluster 130. To do so, the application 112 can initiate a dense private information retrieval (PIR) to the computing systems $MPC_1$ and $MPC_2$ with any suitable dense private information retrieval (PIR) algorithms and implementation. Some implementations rely on Distributed Point Functions (DPFs). For the i-th user group that the application 112 should join, the application 112 can generate two DPFs, $g_i$ and $h_i$ such that $g_i(j)+h_i(j)=1$ if j=i, and $g_i(j)+h_i(j)=0$ otherwise.

The application 112 can transmit a first request to computing system $MPC_1$ (630). The first request can include the point function $g_i$ for each user group that the application 112 should join.

The application 112 can transmit a second request to computing system $MPC_2$ (632). The second request can include the point function $h_i$ for each user group that the application 112 should join.

For each point function $g_i$, computing system $MPC_1$ calculates and returns a first secret share of a user group identifier result to the application 112 (634). The application 112 can calculate the first secret share of the user group identifier result using Relationship 11 below.

$$result_{i,1}=\Sigma_j g_i(j)\times group\_id_j \qquad \text{Relationship 11:}$$

For each point function $h_i$, computing system $MPC_2$ calculates and returns a second secret share of a user group identifier result to the application 112 (636). The application 112 can calculate the second secret share of the user group identifier result using Relationship 12 below.

$$result_{i,2}=\Sigma_j h_i(j)\times group\_id_j \qquad \text{Relationship 12:}$$

The application 112 can add the user to one or more user groups (638). The application 112 can reconstruct the user group identifier for each user group that the user should join using the first share $result_{i,1}$ and the second share $result_{i,2}$ for the user group. For example, the application 112 can calculate the sum of the two secret shares to obtain the user group identifier for the user group, if the two secret shares are additive secret shares. The application 112 can then add the user group identifier to the user group list.

In this process 600 of FIG. 6, neither computing system in the MPC cluster 130 knows the centroids of the user groups in cleartext, neither knows the application query parameter, i.e., the user profile, and neither knows the user groups that the user will join, thus preserving user privacy.

In situation with relaxed privacy requirements, e.g., the computing systems $MPC_1$ and $MPC_2$ can know the query result in cleartext, the computing systems $MPC_1$ and $MPC_2$ can reconstruct the user group eligibility eligible_group$_i$ results from the two secret shares and only return the user group identifiers $L_i$ to the application 112 in the query response if the corresponding eligible_group$_i$ is true.

In some implementations, the training of the centroid models and the querying of the centroid models can be performed by an aggregation service. The aggregation service can include the MPC cluster 130 and communicate with the content platforms 150, e.g., rather than the client devices 110. In such a case, when querying which user groups the application 112 should join, the application 112 may not send the user profile of a user to the content platform 150 for forwarding to the MPC cluster 130 for privacy reasons. One option would be to configure the content platforms 150 to transmit the centroids of the user groups to the application 112. However, this could consume significant bandwidth.

Another option is for the content platform 150 to infer the user groups for a use based on a secure mobile ID (e.g., FLOC ID) for the user, first party cookie data received from a first party cookie, and the URL of a digital component request. However, this may not be as accurate as the techniques described above.

Figure 7:
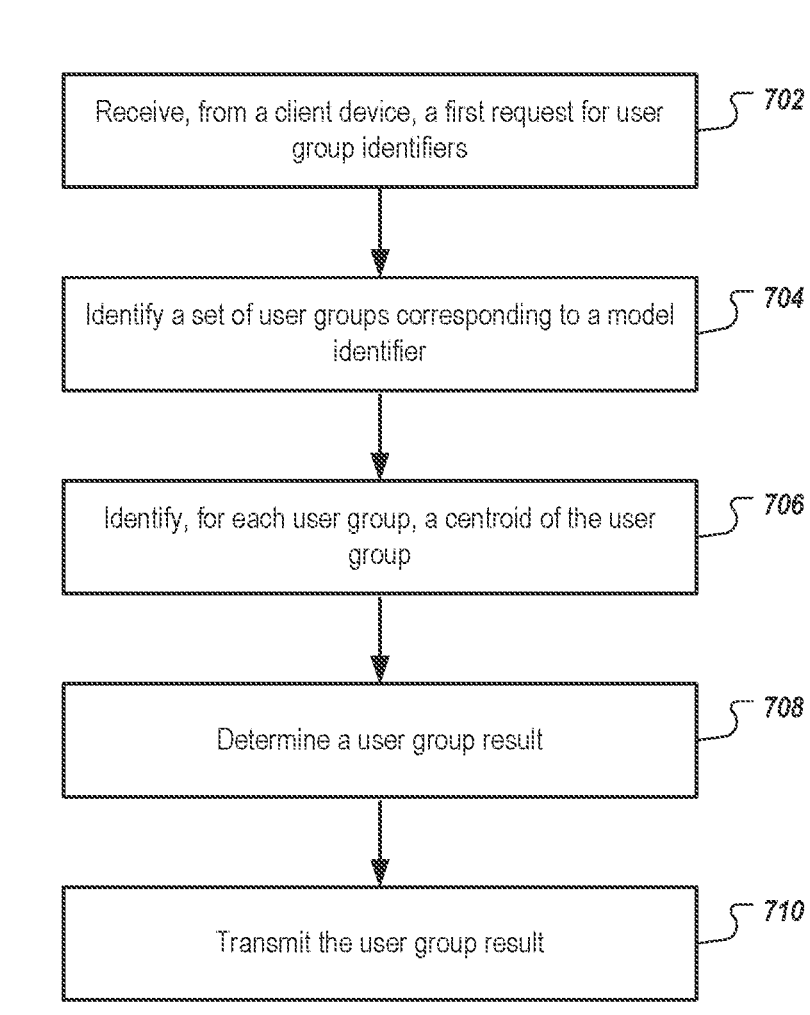
FIG. 7 is a flow diagram that illustrates an example process for determining a user group result based on user profile data of a user and centroid models.

FIG. 7 is a flow diagram that illustrates an example process 700 for determining a user group result (i.e., whether the application 112 should join one or more user groups) based on user profile data of a user and centroid models. Operations of the process 700 can be implemented, for example, by the MPC cluster 130. Operations of the process 700 can also be implemented as instructions stored on one or more computer readable media which may be non-transitory, and execution of the instructions by one or more data processing apparatus can cause the one or more data processing apparatus to perform the operations of the process 700.

A first request for user group identifiers is received (702). A first computing system, e.g., $MPC_1$, of the MPC cluster 130 can receive the first request from an application 112 running on a client device 110. The application 112 can send a respective second request to each other computing system, e.g., $MPC_2$, of the MPC cluster 130. The request can be for user group identifiers of user groups that the user is to be added, e.g., each user group for which the user profile of the user is within a threshold distance of the centroid of the user group.

In general, each request can include user profile data for the user profile of the user. The first request can include first user profile data and each second request sent to each second computing system can include respective second user profile data. The user profile data can vary based on the cryptography techniques used.

For example, if the centroids are determined using an MPC process and horizontal partitioning, as described with reference to FIG. 4, the user profile data of each request can include a respective portion of the user profile of the user. If each computing system of the MPC cluster 130 has a secret share of the centroid, the user profile data of each request can include a respective secret share of the user profile of the user. In either case, the user profile data can also include a model identifier for the centroid model and a threshold distance.

A set of user groups corresponding to the model identifier is identified (704). For example, a content platform 150 or digital component provider 160 can have the MPC cluster 130 generate a centroid model for a set of user groups. Each computing system in the MPC cluster 130 can store data identifying the user group identifiers for the user groups that correspond to a centroid model, e.g., by linking the model identifier with each user group identifier. The first computing system can identify the set of user groups based on the stored data. Each user group identifier and the model identifier can be referred to as a centroid model and user group identifier pair.

For each user group in the set of user groups, a centroid for the user group is identified (706). When the MPC cluster 130 generates the centroid models, the MPC cluster 130 can determine the centroid for each user group corresponding to the centroid model. The form of the centroid can vary based on the cryptography techniques used. For example, if the centroids are determined using an MPC process and horizontal partitioning, as described with reference to FIG. 4, each computing system of the MPC cluster 130 can have a centroid for the user group that is determined based on portions, e.g., halves, of the sum of the secret shares of the user profiles used to generate the centroid. If secret sharing is used, each computing system of the MPC cluster 130 can have a secret share of the centroid for the user group.

A user group result is determined (708). The user group result is indicative of one or more user groups to which to add the user. For example the user group result can be indicative of user groups having a centroid that is within the threshold distance of the user profile of the user.

The user group result is transmitted (710). For example, the first computing system can transmit its user group result to the application 112 running on the client device 110.

The first computing system can determine the user group result in different ways depending on the cryptography techniques used and the user group result can vary based on the cryptography techniques used. For example, if horizontal partitioning is used, the first computing system can determine, for each user group in the set of user groups, whether the first portion of the user profile included in the first user profile data is within the threshold distance of the centroid of the user group previously determined by the first computing system, as described with reference to FIG. 5. In this example, the user group result can include the user group identifiers of the user groups for which the centroid is within the threshold distance of the user profile of the user. Each other computing system can perform a similar process using its centroid and received portion of the user profile. Each computing system can provide a user group result that includes the user group identifiers of the user groups for which the centroid is within the threshold distance of the user profile of the user. The application of the client device can then determine a list of user groups to which to add the user based on the user group result received from each computing system, as described with reference to FIG. 5.

If secret sharing is used, the user group result can include an estimation flag for each user group in the set of user groups, as described with reference to FIG. 6. The estimation flag for a user group indicates whether the application estimated whether the user is to be added to the user group correctly. The application 112 can use the estimation flags to determine whether to add the user to the user groups, e.g., based on whether the application 112 estimated that the user should be added to the user group and whether the estimation was correct. If so, the application 112 can then query the MPC cluster 130 for the user group identifier corresponding to the estimation flag.

Example Process for Generating and Using k-NN Models

Figure 8:
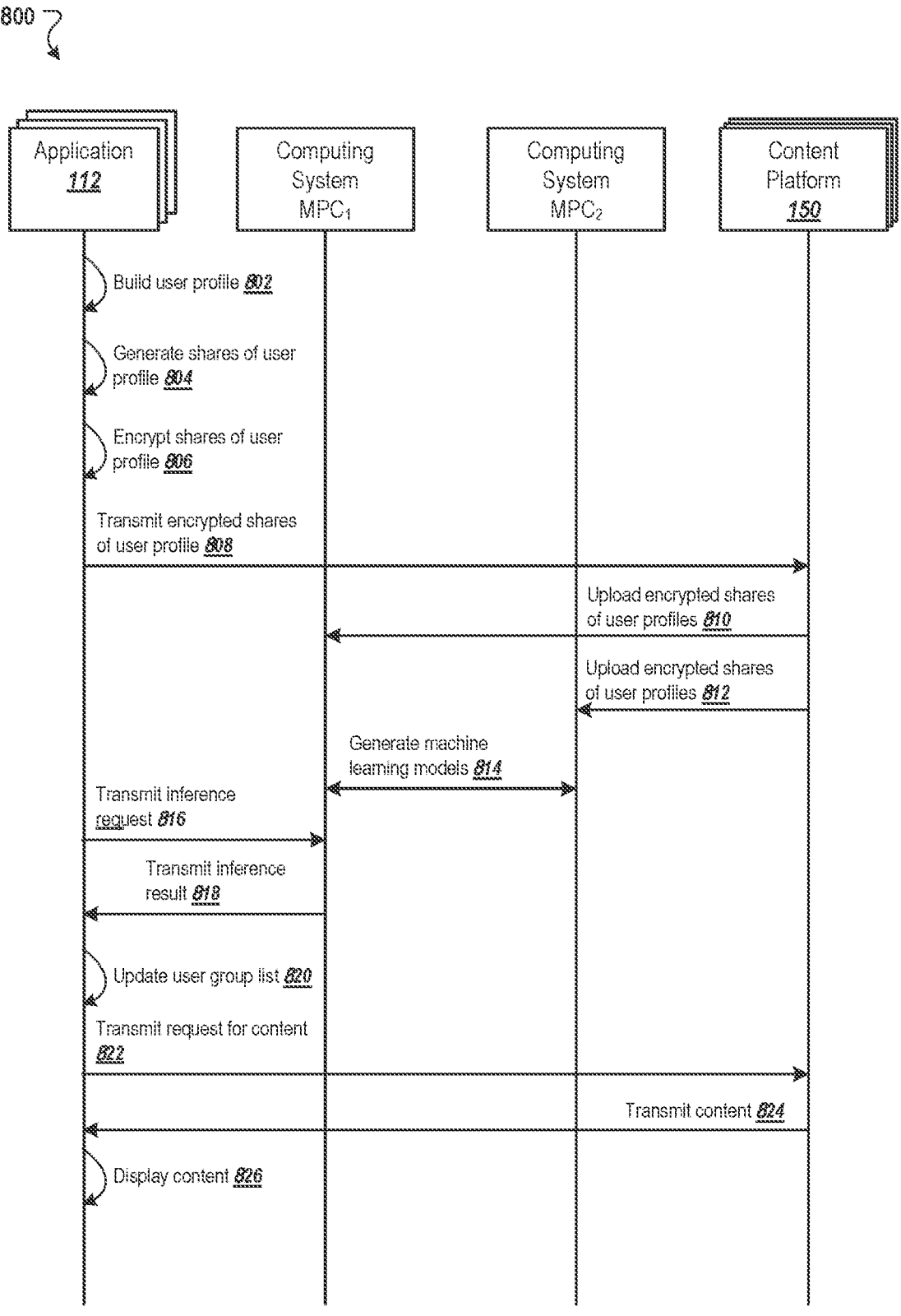
FIG. 8 is a swim lane diagram of an example process for training a k-NN model and using the k-NN model to add users to user groups.

FIG. 8 is a swim lane diagram of an example process 800 for training a machine learning model and using the machine learning model to add users to user groups. Operations of the process 800 can be implemented, for example, by the client device 110, the computing systems MPC$_1$ and MPC$_2$ of the MPC cluster 130, and a content platform 150. Operations of the process 800 can also be implemented as instructions stored on one or more computer readable media which may be non-transitory, and execution of the instructions by one or more data processing apparatus can cause the one or more data processing apparatus to perform the operations of the process 800. Although the process 800 and other processes below are described in terms of a two computing system MPC cluster 130, MPC clusters having more than two computing systems can also be used to perform similar processes.

The machine learning model can be a k-NN model that represents the distances between user profiles of users or user profiles for user groups. When the k-NN model represents the distances between user profiles for user groups, each user group can be represented in the model using the centroid for the user group.

A content platform 150 can initiate the training and/or updating of one of its machine learning models by requesting that applications 112 running on client devices 110 generate a user profile for their respective users and upload secret-shared and/or encrypted versions of the user profiles to the MPC cluster 130. For the purposes of this document, secret shares of user profiles can be considered encrypted versions of the user profiles as the secret shares are not in cleartext. In generation, each application 112 can store data for a user profile and generate the updated user profile in response to receiving a request from the content platform 150. As the content of a user profile and the machine learning models differ for different content platforms 150, the application 112 running on a user's client device 110 can maintain data for multiple user profiles and generate multiple user profiles that are each specific to particular content platforms.

An application 112 running on a client device 110 builds a user profile for a user of the client device 110 (802). The user profile for a user can include data related to events initiated by the user and/or events that could have been initiated by the user with respect to electronic resources, e.g., web pages or application content. The events can include views of electronic resources, views of digital components, user interactions, or the lack of user interactions, with (e.g., selections of) electronic resources or digital components, conversions that occur after user interaction with electronic resources, and/or other appropriate events related to the user and electronic resources. Some examples of user interactions by the user can be interactions with a particular item presented on a web page, such as one or more of (a) click on a link for the particular item, (b) complete a conversion for the particular item by, for example, adding the item to a virtual cart or purchasing the item, (c) view the particular item for more than a preset amount of time. Some examples of lack of specific user interactions can be the user performing some interactions but lacking subsequent interactions—e.g. user views the digital component, but does not click; clicks the digital component, but does not convert (e.g. clicks to go to a checkout webpage but does not purchase an item); and/or the like. Conversion can be defined differently in different implementations. For example, in some implementations, conversion can be the user navigating through to the checkout page. In certain implementations, conversion can be the user attempting to purchase the item. In other implementations, conversion can be the user purchasing the item.

A user profile for a user can be specific to a content platform 150, or selected machine learning models owned by the content platform 150. For example, as described in more detail below with reference to FIG. 9, each content platform 150 can request that the application 112 generate or update a user profile specific to that content platform 150.

Figure 9:
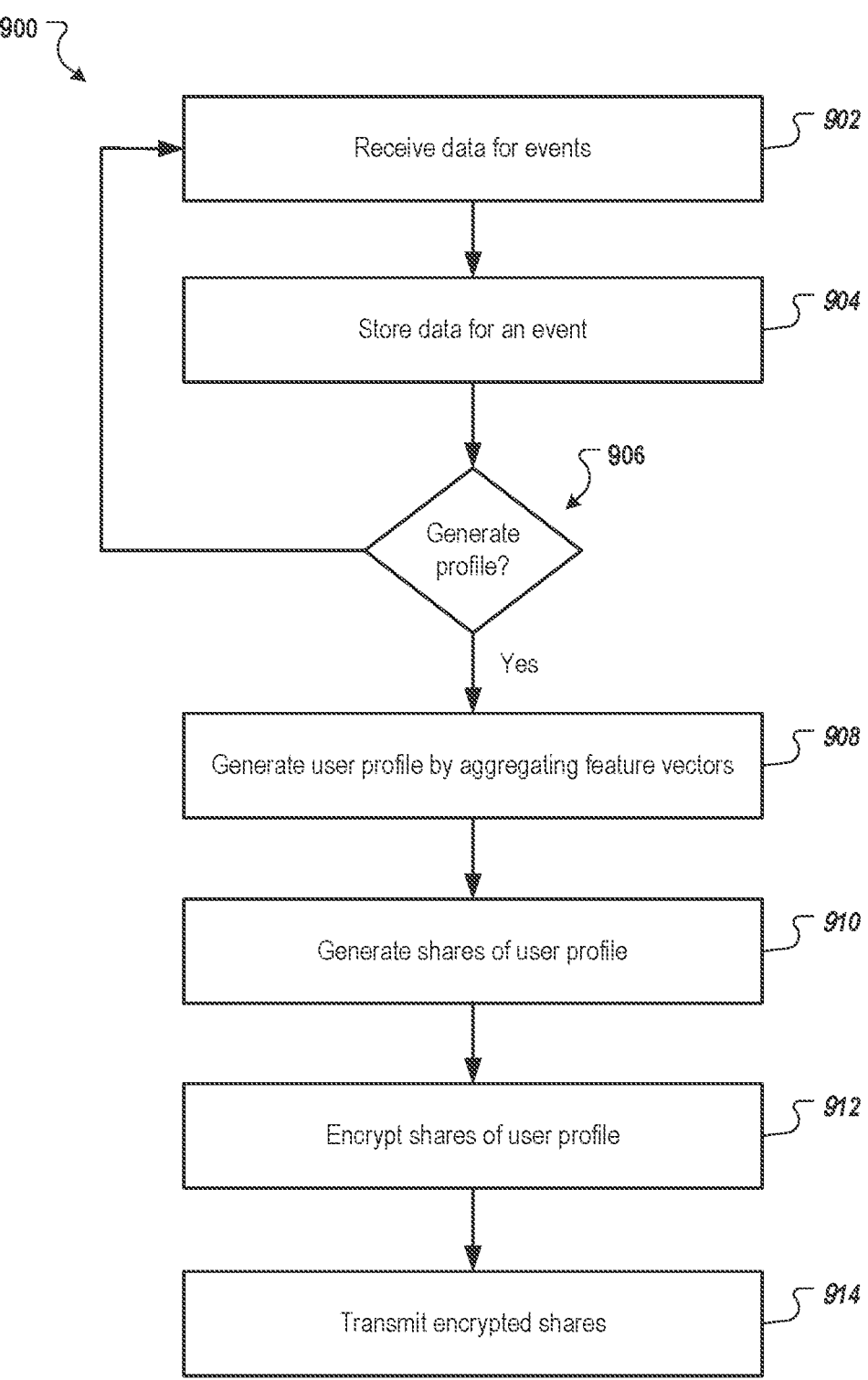
FIG. 9 is a flow diagram that illustrates an example process for generating a user profile and sending shares of the user profile to an MPC cluster.

The user profile for a user can be in the form of a feature vector. For example, the user profile can be an n-dimensional feature vector. Each of the n dimensions can correspond to a particular feature and the value of each dimension can be the value of the feature for the user. For example, one dimension may be for whether a particular digital component was presented to (or interacted with by) the user. In this example, the value for that feature could be "1" if the digital component was presented to (or interacted with by) the user or "0" if the digital component has not been presented to (or interacted with by) the user. An example process for generating a user profile for a user is illustrated in FIG. 9 and described below.

In some implementations, a content platform 150 may want to train machine learning models based on additional signals, such as contextual signals, signals related to particular digital components, or signals related to the user of which the application 112 may not be aware or to which the application 112 may not have access, such as the current weather at the user's location. For example, the content platform 150 may want to train a machine learning model to predict whether a user will interact with a particular digital component if the digital component is presented to the user in a particular context. In this example, the contextual signals can include, for each presentation of a digital component to a user, the geographic location of the client device 110 at the time (if permission is granted by the user), signals describing the content of the electronic resource with which the digital component is presented, and signals describing the digital component, e.g., the content of the digital component, the type of digital components, where on the electronic resource the digital component is presented, etc. In another example, one dimension may be for whether the digital component presented to the user is of a particular type. In this example, the value could be 1 for travel, 2 for cuisine, 3 for movie, etc. For ease of subsequent description, $P_i$ will represent both user profile and additional signals (e.g., contextual signals and/or digital component-level signals) associated with the $i_{th}$ user profile.

The application 112 generates shares of the user profile $P_i$ for the user (804). In this example, the application 112 generates two shares of the user profile $P_i$, one for each computing system of the MPC cluster 130. Note that each share by itself can be a random variable that by itself does not reveal anything about the user profile. Both shares would need to be combined to get the user profile. If the MPC cluster 130 includes more computing systems that participate in the training of a machine learning model, the application 112 would generate more shares, one for each computing system. In some implementations, to protect user privacy, the application 112 can use a pseudorandom function to split the user profile $P_i$ into shares. That is, the application 112 can use pseudorandom function $PRF(P_i)$ to generate two shares $\{[P_{i,1}],[P_{i,2}]\}$. The exact splitting can depend on the secret sharing algorithm and crypto library used by the application 112.

In some implementations, the application 112 can also provide one or more labels to the MPC cluster 130. Although the labels may not be used in training the machine learning models of certain architecture (e.g. k-NN), the labels can be used to fine-tune hyperparameters controlling the model training process (e.g., the value of k), or evaluate the quality of the machine learning models trained, or make predictions, i.e. determine whether to suggest a user group for a user. The labels can include, for example, one or more of the user group identifiers for the user and for which the content platform 150 has access. That is, the labels can include the user group identifiers for the user groups managed by the content platform 150 or for which the content platform 150 has read access. In some implementations, a single label includes multiple user group identifiers for the user. In some implementations, the label for a user can be heterogeneous and include all user groups that include the user as a member and additional information, e.g., whether the user interacted with (e.g. view, click, and/or convert) a given digital component. This enables the k-NN model to be used to predict whether another user will interact with the given digital component. A label for each user profile can indicate user group membership for a user corresponding to the user profile.

The label for the user profiles are predictive of user groups to which a user corresponding to an input will be, or should be added. For example, the labels corresponding to the k nearest neighbor user profiles to the input user profile are predictive of user groups that the user corresponding to the input user profile will or should join, e.g., based on the similarity between the user profiles. These predictive labels can be used to suggest user groups to the user or to request that the application added the user to the user groups corresponding to the labels.

If labels are included, the application 112 can also split each label $label_i$ into shares, e.g., $[label_{i,1}]$ and $[label_{i,2}]$. In this way, without collusion between the computing systems $MPC_1$ and $MPC_2$, neither computing system $MPC_1$ nor $MPC_2$ can reconstruct $P_i$ from $[P_{i,1}]$ or $[P_{i,2}]$ or reconstruct $label_i$ from $[label_{i,1}]$ or $[label_{i,2}]$.

The application 112 encrypts the shares $[P_{i,1}]$ or $[P_{i,2}]$ of the user profile $P_i$ and/or the shares $[label_{i,1}]$ or $[label_{i,2}]$ of each label $label_i$ (806). In some implementations, the application 112 generates a composite message of the first share $[P_{i,1}]$ of the user profile $P_i$ and the first share $[label_{i,1}]$ of the label $label_i$ and encrypts the composite message using an encryption key of the computing system $MPC_1$. Similarly, application 112 generates a composite message of the second share $[P_{i,2}]$ of the user profile $P_i$ and the second share $[label_{i,2}]$ of the label $label_i$ and encrypts the composite message using an encryption key of the computing system $MPC_2$. These functions can be represented as PubKeyEncrypt($[P_{i,1}]\|[label_{i,1}]$, $MPC_1$) and PubKeyEncrypt($[P_{i,2}]\|[label_{i,2}]$, $MPC_2$), where PubKeyEncrypt represents a public key encryption algorithm using the corresponding public key of $MPC_1$ or $MPC_2$. The symbol "$\|$" represents a reversible method to compose complex messages from multiple simple messages, e.g., JavaScript Object Notation (JSON), Concise Binary Object Representation (CBOR), or protocol buffer.

The application 112 provides the encrypted shares to the content platform 150 (808). For example, the application 112 can transmit the encrypted shares of the user profile and the label to the content platform 150. As each share is encrypted using an encryption key of the computing system $MPC_1$ or $MPC_2$, the content platform 150 cannot access the user's user profile or the label.

The content platform 150 can receive shares of user profiles and shares of labels from multiple client devices. The content platform 150 can initiate the training of a machine learning model by uploading the shares of the user profiles to the computing systems $MPC_1$ and $MPC_2$. Although the labels may not be used in the training process, the content platform 150 can upload the shares of the labels to the computing systems $MPC_1$ and $MPC_2$ for use when evaluating the model quality or querying the model later.

The content platform 150 uploads the first encrypted shares (e.g., PubKeyEncrypt($[P_{i,1}]\|[label_{i,1}]$, $MPC_1$)) received from each client device 110 to the computing system $MPC_1$ (810). Similarly, the content platform 150 uploads the second encrypted shares (e.g., PubKeyEncrypt($[P_{i,2}]\|[label_{i,2}]$, $MPC_2$)) to the computing system $MPC_2$ (812). Both uploads can be in batches and can include the encrypted shares of user profiles and labels received during a particular time period for training the machine learning model.

In some implementations, the order in which the content platform 150 uploads the first encrypted shares to the computing system $MPC_1$ must match the order in which the content platform 150 uploads the second encrypted shares to the computing system $MPC_2$. This enables the computing systems $MPC_1$ and $MPC_2$ to properly match two shares of the same secret, e.g., two shares of the same user profile.

In some implementations, the content platform 150 may explicitly assign the same pseudorandomly or sequentially generated identifier to shares of the same secret to facilitate the matching. While some MPC techniques can rely on random shuffling of input or intermediate results, the MPC techniques described in this document may not include such random shuffling and may instead rely on the upload order to match.

In some implementations, the operations 808, 810 and 812 can be replaced by alternative process where the application 112 directly uploads $[P_{i,1}]\|[label_{i,1}]$ to $MPC_1$, and $[P_{i,2}]\|[label_{i,2}]$ to $MPC_2$. This alternative process can reduce the infrastructure cost of the content platform 150 to support the operations 808, 810 and 812, and reduce the latency to start training or updating the machine learning models in $MPC_1$ and $MPC_2$.

In certain implementations where the model is desired to be trained based on conversions of digital components by users, it may be taken into account that occurrence of conversion can often happen a long time after an impression or a click, in which case it can be advantageous to keep the content platform 150 available to perform other tasks so as to optimize bandwidth, storage, and processing by the content platform 150. In such implementations, the operations 808, 810 and 812 can be replaced by another alternative process where (i) the application 112 transmits the encrypted shares of the user profile and the labels along with a first party cookie to a demand-side platform (DSP), which may be a part of the content platform 150 in some implementations and separate from the content platform 150 in other implementations, (ii) the DSP then uses the first party cookie to map (i.e. associate) the encrypted shares of the user profile and labels with interaction data that can be specific to conversions (e.g. whether conversion occurred within a preset period of time such as 30 days), and (iii) the DSP transmits this mapping to the computing system $MPC_1$ or $MPC_2$ to train the machine learning model. The other functionalities of the content platform 150 as described with respect to operations 808, 810 and 812 can be performed by the DSP in these implementations. While this description focuses on the interaction of conversions, this architecture and functionality can be extended to any other interaction (e.g. impressions or clicks), or any combination of interactions (e.g. impressions, clicks, and/or conversions).

The computing systems $MPC_1$ and $MPC_2$ generate a machine learning model (814). Each time a new machine learning model is generated based on user profile data can be referred to as a training session. The computing systems $MPC_1$ and $MPC_2$ can train a machine learning model based on the encrypted shares of the user profiles received from the client devices 110. For example, the computing systems $MPC_1$ and $MPC_2$ can use MPC techniques to train a k-NN model based on the shares of the user profiles.

To minimize or at least reduce the crypto computation, and thus the computational burden placed on the computing systems $MPC_1$ and $MPC_2$ to protect user privacy and data during both model training and inference, the MPC cluster 130 can use random projection techniques, e.g., SimHash, to quantify the similarity between two user profiles $P_i$ and $P_j$ quickly, securely, and probabilistically. The similarity between the two user profiles $P_i$ and $P_j$ can be determined by determining the Hamming distance between two bit vectors that represent the two user profiles $P_i$ and $P_j$, which is proportional to the cosine distance between the two user profiles with high probability.

Conceptually, for each training session, m random projection hyperplanes $U=\{U_1, U_2, \ldots, U_m\}$ can be generated. The random projection hyperplanes can also be referred to as random projection planes. One objective of the multi-step computation between the computing systems $MPC_1$ and $MPC_2$ is to create a bit vector $B_i$ of length m for each user profile $P_i$ used in the training of the k-NN model. In this bit vector $B_i$ each bit $B_{i,j}$ represents the sign of a dot product of one of the projection planes $U_j$ and the user profile $P_i$, i.e., $B_{i,j}=sign(U_j \odot P_i)$ for all $j \in [1, m]$ where $\odot$ denotes the dot product of two vectors of equal length. That is, each bit represents which side of the plane $U_j$ the user profile $P_i$ is located. A bit value of one represents a positive sign and a bit value of zero represents a negative sign.

At each end of the multi-step computation, each of the two computing systems $MPC_1$ and $MPC_2$ generates an intermediate result that includes a bit vector for each user profile in cleartext, a share of each user profile, and a share of the label for each user profile. For example, the intermediate result for computing system $MPC_1$ can be the data shown in Table 11 below. The computing system $MPC_2$ would have a similar intermediate result but with a different share of each user profile and each label. To add extra privacy protection, each of the two servers in the MPC cluster 130 can only get half of the m-dimensional bit vectors in cleartext, e.g., computing system $MPC_1$ gets the first m/2 dimension of all the m-dimension bit vectors, computing system $MPC_2$ gets the second m/2 dimension of all the m-dimension bit vectors.

TABLE 11

| Bit Vector in Cleartext | $MPC_1$ Share for $P_i$ | $MPC_1$ Share for $label_i$ |
|---|---|---|
| . . . | . . . | . . . |
| $B_i$ | . . . | . . . |
| $B_{i+1}$ | . . . | . . . |
| . . . | . . . | . . . |

Given two arbitrary user profile vectors $P_i$ and $P_j$ of unit length i≠j, it has been shown that the Hamming distance between the bit vectors $B_i$ and $B_j$ for the two user profile vectors $P_i$ and $P_j$ is proportional to the cosine distance between the user profile vectors $P_i$ and $P_j$ with high probability, assuming that the number of random projections m is sufficiently large.

Figure 10:
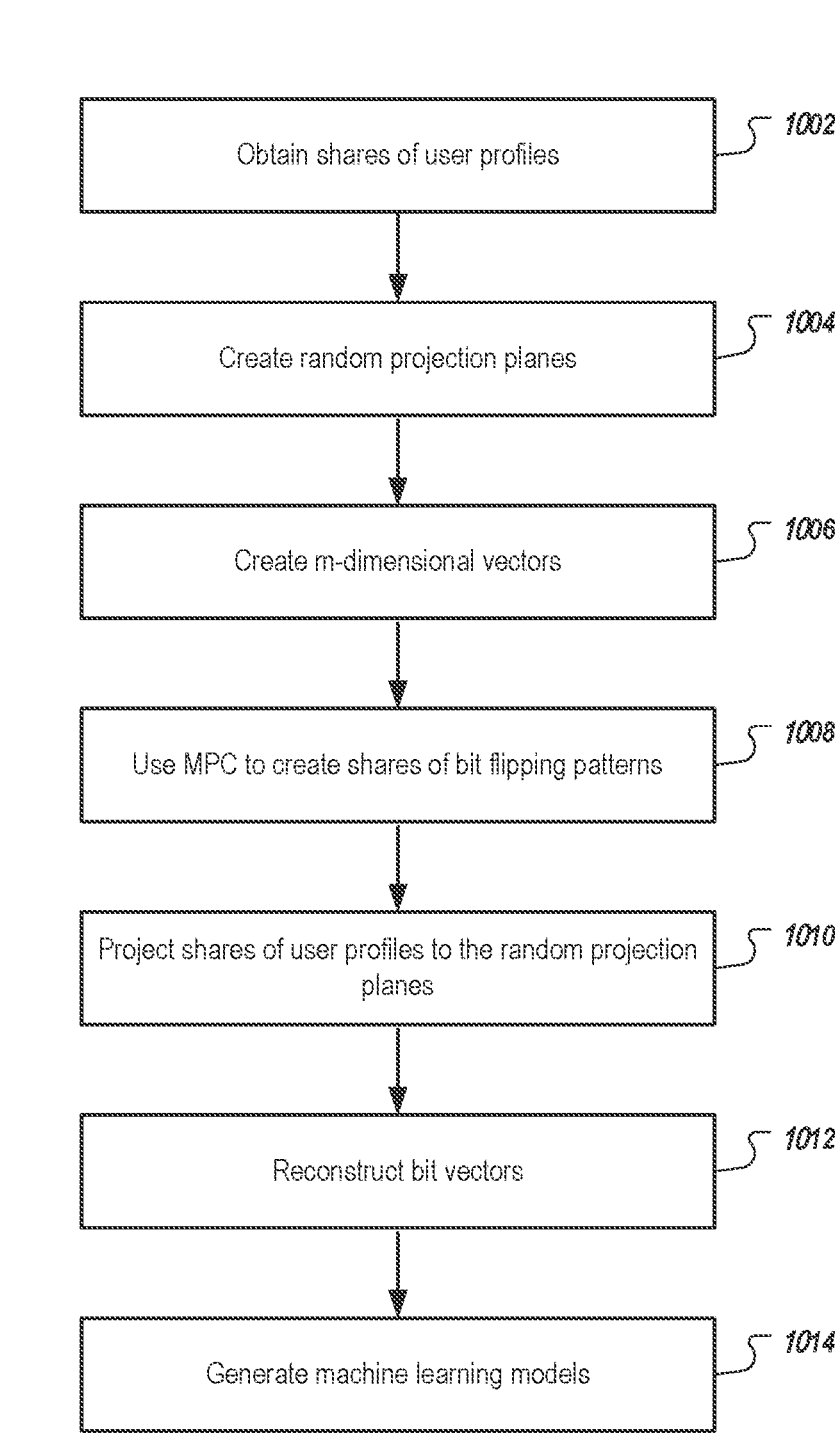
FIG. 10 is a flow diagram that illustrates an example process for generating a k-NN model.

Based on the intermediate result shown above and because the bit vectors $B_i$ are in cleartext, each computing system $MPC_1$ and $MPC_2$ can independently create, e.g., by training, a respective k-NN model using a k-NN algorithm. The computing systems $MPC_1$ and $MPC_2$ can use the same or different k-NN algorithms. An example process for training a k-NN model is illustrated in FIG. 10 and described below. Once the k-NN models are trained, the application 112 can query the k-NN models to determine whether to add a user to a user group.

The application 112 submits an inference request to the MPC cluster 130 (816). In this example, the application 112 transmits the inference request to computing system $MPC_1$. In other examples, the application 112 can transmit the inference request to computing system $MPC_2$. The application 112 can submit the inference request in response to a request from the content platform 150 to submit the inference request. For example, the content platform 150 can request the application 112 to query the k-NN model to determine whether the user of the client device 110 should be added to a particular user group. This request can be referred to an inference request to infer whether the user should be added to the user group.

To initiate an inference request, the content platform 150 can send, to the application 112, an inference request token $M_{infer}$. The inference request token $M_{infer}$ enables servers in the MPC cluster 130 to validate that the application 112 is authorized to query a particular machine learning model owned by a particular domain. The inference request token $M_{infer}$ is optional if the model access control is optional. The inference request token $M_{infer}$ can have the following items shown and described in Table 12 below.

TABLE 12

| Item No. | Content | Description |
|---|---|---|
| 1 | Content Platform Domain (e.g., eTLD + 1 domain) | Content platform's domain that uniquely identifies the content platform |
| 2 | Model Identifier | Unique identifier for the content platform's machine learning model |
| 3 | k | How many nearest neighbors to fetch |
| 4 | Aggregation Function | The aggregation function applied to the k nearest neighbors |
| 5 | Aggregation Function Parameters | Additional parameters used by the aggregation function |
| 6 | Token Creation Timestamp | Timestamp indicating when this token is created |
| 7 | Operation | Infer request operation |
| 8 | Digital Signature | The content platform's digital signature over items 1-7 |

In this example, the inference request token $M_{infer}$ includes seven items and a digital signature generated based on the seven items using a private key of the content platform 150. The eTLD+1 is the effective top-level domain (eTLD) plus one level more than the public suffix. An example eTLD+1 is "example.com" where ".com" is the top-level domain.

To request an inference for a particular user, the content platform 150 can generate an inference request token $M_{infer}$ and send the token to the application 112 running on the user's client device 110. In some implementations, the content platform 150 encrypts the inference request token $M_{infer}$ using a public key of the application 112 so that only the application 112 can decrypt the inference request token $M_{infer}$ using its confidential private key that corresponds to the public key. That is, the content platform can send, to the application 112, PubKeyEnc($M_{infer}$, application_public_key).

The application 112 can decrypt and verify the inference request token $M_{infer}$. The application 112 can decrypt the encrypted inference request token $M_{infer}$ using its private key. The application 112 can verify the inference request token $M_{infer}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the inference request token $M_{infer}$ is valid, the application 112 can query the MPC cluster 130.

Conceptually, the inference request can include the model identifier for the machine learning model, the current user profile $P_i$, k (the number of nearest neighbors to fetch), optionally additional signals (e.g., contextual signals or digital component signals), the aggregation function, and the aggregation function parameters. However, to prevent leaking the user profile $P_i$ in cleartext form to either computing system $MPC_1$ or $MPC_2$, and thereby preserve user privacy, the application 112 can split the user profile $P_i$ into two shares $[P_{i,1}]$ and $[P_{i,2}]$ for $MPC_1$ and $MPC_2$, respectively. The application 112 can then select one of the two computing systems $MPC_1$ or $MPC_2$, e.g., randomly or pseudo-randomly, for the query. If the application 112 selects computing system $MPC_1$, the application 112 can send a single request to computing system $MPC_1$ with the first share $[P_{i,1}]$ and an encrypted version of the second share, e.g., PubKeyEncrypt($[P_{i,2}]$, $MPC_2$). In this example, the application 112 encrypts the second share $[P_{i,2}]$ using a public key of the computing system $MPC_2$ to prevent computing system $MPC_1$ from accessing $[P_{i,2}]$, which would enable computing system $MPC_1$ to reconstruct the user profile $P_i$ from $[P_{i,1}]$ and $[P_{i,2}]$.

As described in more detail below, the computing systems $MPC_1$ and $MPC_2$ collaboratively compute the k nearest neighbors to the user profile $P_i$. The computing systems $MPC_1$ and $MPC_2$ can then use one of several possible machine learning techniques (e.g., binary classification, multiclass classification, regression, etc.) to determine, based on the k nearest neighbor user profiles, whether to add the user to a user group. For example, the aggregation function can identify the machine learning technique (e.g., binary, multiclass, regression) and the aggregation function parameters can be based on the aggregation function.

In some implementations, the aggregation function parameters can include a user group identifier for a user group for which the content platform 150 is querying the k-NN model for the user. For example, the content platform 150 may want to know whether to add a user to a user group related to hiking and that has a user group identifier "hiking." In this example, the aggregation function parameter can include the "hiking" user group identifier. In general, the computing systems $MPC_1$ and $MPC_2$ can determine whether to add the user to the user group based on the number of the k nearest neighbors that are a member of the user group, e.g., based on their labels.

Figure 11:
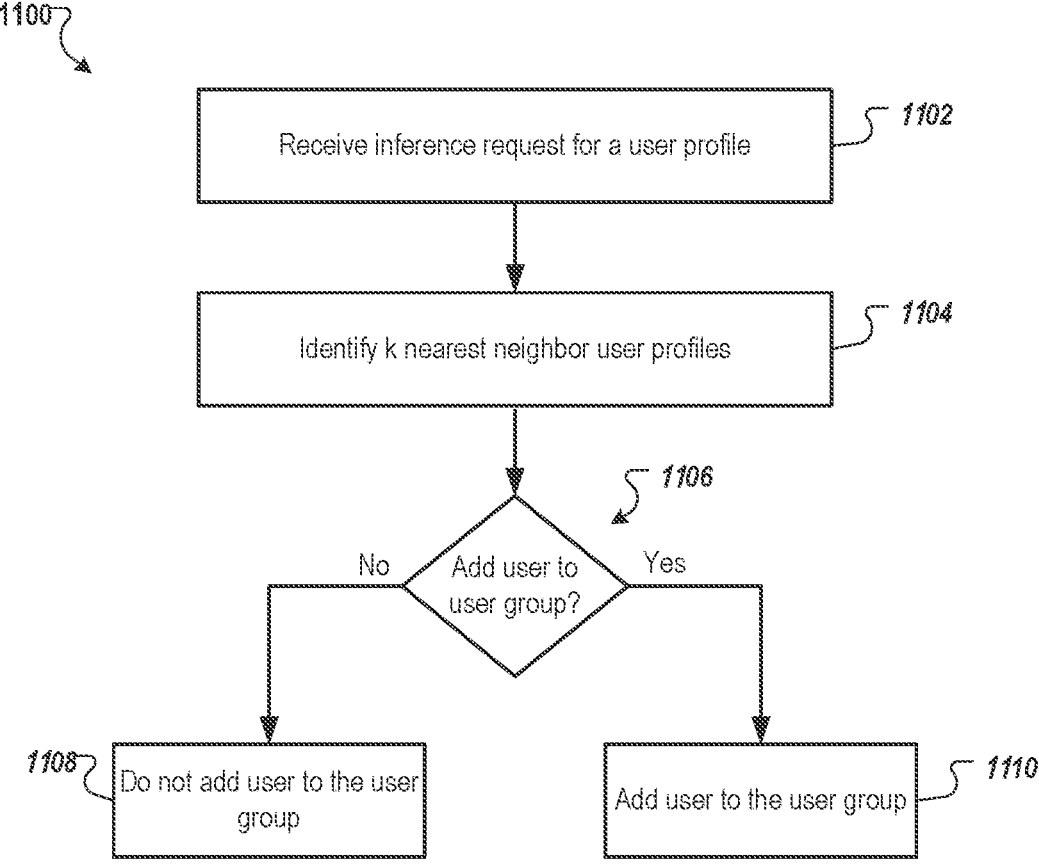
FIG. 11 is a flow diagram that illustrates an example process for adding a user to user groups using k-NN models.

The MPC cluster 130 provides an inference result to the application 112 (818). In this example, the computing system $MPC_1$ that received the query sends the inference result to the application 112. The inference result can indicate whether the application 112 should add the user to zero or more user groups. For example, the user group result can specify a user group identifier for the user group. However, in this example, the computing system $MPC_1$ would know the user group. To prevent this, the computing system $MPC_1$ may compute a share of the inference result and the computing system $MPC_2$ may compute another share of the same inference result. The computing system $MPC_2$ can provide an encrypted version of its share to the computing system $MPC_1$, where the share is encrypted using a public key of the application 112. The computing system $MPC_1$ can provide, to the application 112, its share of the inference result and the encrypted version of computing system $MPC_2$'s share of the user group result. The application 112 can decrypt computing system $MPC_2$'s share and calculate the inference result from the two shares. An example process for querying a k-NN model to determine whether to add a user to a user group is illustrated in FIG. 11 and described below. In some implementations, to prevent computing system $MPC_1$ from falsifying computing system $MPC_2$'s result, computing system $MPC_2$ digitally signs its result either before or after encrypting its result using the public key of the application 112. The application 112 verifies computing system $MPC_2$'s digital signature using the public key of $MPC_2$.

The application 112 updates the user group list for the user (820). For example, if the inference result is to add the user to a particular user group, the application 112 can add the user to the user group. In some implementations, the application 112 can prompt the user for permission to add the user to the user group.

The application 112 transmits a request for content (822). For example, the application 112 can transmit, to the content platform 150, a request for a digital component in response to loading an electronic resource that has a digital component slot. In some implementations, the request can include one or more user group identifiers for user groups that include the user as a member. For example, the application 112 can obtain one or more user group identifiers from the user group list and provide the user group identifier(s) with the request. In some implementations, techniques can be used to prevent the content platform from being able to associate the user group identifier with the user, the application 112, and/or the client device 112 from which the request is received.

The content platform 150 transmits content to the application 112 (824). For example, the content platform 150 can select a digital component based on the user group identifier(s) and provide the digital component to the application 112. In some implementations, the content platform 150, in collaboration with the application 112, selects a digital component based on the user group identifier(s), without leaking the user group identifier(s) out of the application 112.

The application 112 displays or otherwise implements the received content (826). For example, the application 112 can display a received digital component in a digital component slot of an electronic resource.

Example Process for Generating User Profiles Using k-NN Models

FIG. 9 is a flow diagram that illustrates an example process 900 for generating a user profile and sending shares of the user profile to an MPC cluster. Operations of the process 900 can be implemented, for example, by the client device 110 of FIG. 1, e.g., by the application 112 running on the client device 110. Operations of the process 900 can also be implemented as instructions stored on one or more computer readable media which may be non-transitory, and execution of the instructions by one or more data processing apparatus can cause the one or more data processing apparatus to perform the operations of the process 900.

An application 112 executing on a user's client device 110 receives data for an event (902). The event can be, for example, a presentation of an electronic resource at the client device 110, a presentation of a digital component at the client device 110, a user interaction with an electronic resource or digital component at the client device 110, or a conversion for a digital component, or the lack of user interaction with or conversion for an electronic resource or digital component presented. Some examples of user interactions by the user can be interactions with a particular item presented on a web page, such as one or more of (a) click on a link for the particular item by, for example, adding the item to a virtual cart or purchasing the item, (c) view the particular item for more than a preset amount of time. Some examples of lack of specific user interactions can be the user performing some interactions but lacking subsequent interactions—e.g. user views the digital component, but does not click; clicks the digital component, but does not convert (e.g. clicks to go to a checkout webpage but does not purchase an item); and/or the like. Conversion can be defined differently in different implementations. For example, in some implementations, conversion can be the user navigating through to the checkout page. In certain implementations, conversion can be the user attempting to purchase the item. In other implementations, conversion can be the user purchasing the item. When an event occurs, a content platform 150 can provide data related to the event to the application 112 for use in generating a user profile for the user.

The application 112 can generate a different user profile for each content platform 150. That is, the user profile of a user and for a particular content platform 150 may only include event data received from the particular content platform 150. This preserves user privacy by not sharing with content platforms data related to events of other content platforms. In some implementations, the application 112, per the request of the content platform 150, may generate a different user profile for each machine learning model owned by the content platform 150. Based on the design goal, different machine learning models may require different training data. For example, a first model may be used to determine whether to add a user to a user group. A second model may be used to predict whether a user will interact with a digital component. In this example, the user profiles for the second model can include additional data, e.g., whether the user interacted with the digital component, that the user profiles for the first model do not have.

The content platform 150 can send the event data in the form of a profile update token $M_{update}$. The profile update token $M_{update}$ have the following items shown and described in Table 1 above.

The model identifier identifies the machine learning model, e.g., k-NN model, for which the user profile will be used to train or used to make a user group inference. The profile record is an n-dimensional feature vector that includes data specific to the event, e.g., the type of event, the electronic resource or digital component, time at which the event occurred, and/or other appropriate event data that the content platform 150 wants to use in training the machine learning model and making user group inferences. The digital signature is generated based on the seven items using a private key of the content platform 150.

In some implementations, to protect the update token $M_{update}$ during transmission, the content platform 150 encrypts the update token $M_{update}$ prior to sending the update token $M_{update}$ to the application 112. For example, the content platform 150 can encrypt the update token $M_{update}$ using a public key of the application, e.g., PubKeyEnc $(M_{update}$, application_public_key).

In some implementations, the content platform 150 can send the event data to the application 112 without encoding the event data or the update request in the form of a profile update token $M_{update}$. For example, a script originated from the content platform 150 running inside the application 112 may directly transmit the event data and the update request to the application 112 via a script API, where the application 112 relies on W3C origin-based security model and/or HTTPS to protect the event data and update request from falsification or leaking.

The application 112 stores the data for the event (904). If the event data is encrypted, the application 112 can decrypt the event data using its private key that corresponds to the public key used to encrypt the event data. If the event data is sent in the form of an update token $M_{update}$, the application 112 can verify the update token $M_{update}$ before storing the event data. The application 112 can verify the update token $M_{update}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the update token $M_{update}$ is valid, the application 112 can store the event data, e.g., by storing the n-dimensional profile record. If any verification fails, the application 112 may ignore the update request, e.g., by not storing the event data.

For each machine learning model, e.g., for each unique model identifier, the application 112 can store event data for that model. For example, the application 112 can maintain, for each unique model identifier, a data structure that includes a set of n-dimensional feature vectors (e.g., the profile records of the update tokens) and, for each feature vector, the expiration time. An example data structure for a model identifier is shown in Table 2 above.

Upon receiving a valid update token $M_{update}$, the application 112 can update the data structure for the model identifier included in the update token $M_{update}$ by adding the feature vector and expiration time of the update token $M_{update}$ to the data structure. Periodically, the application 112 can purge expired feature vectors from the data structure to reduce storage size.

The application 112 determines whether to generate a user profile (906). For example, the application 112 may generate a user profile for a particular machine learning model in response to a request from the content platform 150. The request may be to generate the user profile and return shares of the user profile to the content platform 150. In some implementations, the application 112 may directly upload the generated user profiles to the MPC cluster 130, e.g., rather than sending them to the content platform 150. To ensure the security of the request to generate and return the shares of the user profile, the content platform 150 can send, to the application 112, an upload token $M_{upload}$.

The upload token $M_{upload}$ can have a similar structure as the update token $M_{update}$, but with a different operation (e.g., "update server" instead of "accumulate user profile"). The upload token $M_{upload}$ can also include an additional item for an operation delay. The operation delay can instruct the application 112 to delay calculating and uploading the shares of the user profile while the application 112 accumulates more event data, e.g., more feature vectors. This enables the machine learning model to capture user event data immediately before and after some critical events, e.g., joining a user group. The operation delay can specify the delay time period. In this example, the digital signature can be generated based on the other seven items in Table 1 and the operation delay using the private key of the content platform. The content platform 150 can encrypt the upload token $M_{upload}$ in a similar manner as the update token $M_{update}$, e.g., PubKeyEnc($M_{upload}$, application_public_key), using the application's public key to protect the upload token $M_{upload}$ during transmission.

The application 112 can receive the upload token $M_{upload}$, decrypt the upload token $M_{upload}$ if it is encrypted, and verify the upload token $M_{upload}$. This verification can be similar to the way in which the update token $M_{update}$ is verified. The application 112 can verify the upload token $M_{upload}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the upload token $M_{upload}$ is valid, the application 112 can generate the user profile. If any verification fails, the application 112 may ignore the upload request, e.g., by not generating a user profile.

In some implementations, the content platform 150 can request the application 112 to upload a user profile without encoding the upload request in the form of a profile upload token $M_{upload}$. For example, a script originated from the content platform 150 running inside the application 112 may directly transmit the upload request to the application 112 via a script API, where the application 112 relies on W3C origin-based security model and/or HTTPS to protect the upload request from falsification or leaking.

If a determination is made to not generate a user profile, the process 900 can return to operation 902 and wait for additional event data from the content platform 150. If a determination is made to generate a user profile, the application 112 generates the user profile (908).

The application 112 can generate the user profile based on the stored event data, e.g., the data stored in the data structure shown in Table 2. The application 112 can access the appropriate data structure based on a model identifier included in the request, e.g., the Content Platform eTLD+1 domain of item 1 and the model identifier of item 2 of the upload token $M_{upload}$.

The application 112 can compute the user profile by aggregating the n-dimensional feature vectors in the data structure in the study period that have not yet expired. For example, the user profile may be the average of the n-dimensional feature vectors in the data structure in the study period that have not yet expired. The result is an n-dimensional feature vector representing the user in the profile space. Optionally, the application 112 may normalize the n-dimensional feature vector to unit length, e.g., using L2 normalization. The content platform 150 may specify the optional study period.

In some implementations, decay rates can be used to calculate the user profiles. As there may be many content platforms 150 that use the MPC cluster 130 to train machine learning models and each content platform 150 may have multiple machine learning models, storing user feature vector data may result in significant data storage requirements. Using decay techniques can substantially reduce that amount of data that is stored at each client device 110 for the purposes of generating user profiles for training the machine learning models.

Assume that, for a given machine learning model, there are k feature vectors $\{F_1, F_2, \ldots F_k\}$, each of which is a n-dimensional vector and their corresponding age (record_age_in_seconds$_i$). The application 112 can compute the user profile using Relationship 13 below:

$$\sum_{k=1}^{k} \left( e^{-\frac{record\_page\_in\_seconds_i}{decay\_rate\_in\_seconds}} \times F_i \right) \qquad \text{Relationship 13}$$

In this relationship, the parameter record_age_in_seconds$_i$ is the amount of time in seconds that the profile record has been stored at the client device 110 and the parameter decay_rate_in_seconds is the decay rate of the profile record in seconds (e.g., received in item 6 of the update token $M_{update}$). In this way, more recent feature vectors carry more weight. This also enables the application 112 to avoid storing feature vectors and only store profile records with constant storage. The application 112 only has to store an n-dimensional vector P and a timestamp user_profile_time for each model identifier, rather than multiple individual feature vectors for each model identifier.

To initialize the n-dimensional vector user profile P and timestamp, the application can set the vector P to a vector of n dimensions where the value of each dimension is zero and set the user_profile_time to epoch. To update the user profile P with a new feature vector $F_x$ at any time, the application 112 can use Relationship 14 below:

$$P = e^{-\frac{current\_time - user\_profile\_time}{decay\_rate\_in\_seconds}} \times P + F_x \qquad \text{Relationship 14}$$

The application 112 can also update the user profile time to the current time (current_time) when updating the user profile with Relationship 14. Note that operation 904 is omitted if the application 112 calculates user profiles with the above decay rate algorithm.

The application 112 generates shares of the user profile (910). The application 112 can use a pseudorandom function to split the user profile $P_i$ (e.g., the n-dimensional vector P) into shares. That is, the application 112 can use pseudorandom function $PRF(P_i)$ to generate two shares $\{[P_{i,1}],[P_{i,2}]\}$ of the user profile $P_i$. The exact splitting can depend on the secret sharing algorithm and crypto library used by the application 112. In some implementations, the application uses Shamir's secret sharing scheme. If shares of one or more labels are being provided, the application 112 can also generate shares of the labels as well.

The application 112 encrypts the shares $\{[P_{i, 1}],[P_{i,2}]\}$ of the user profile $P_i$ (912). For example, as described above, the application 112 can generate composite messages that include shares of the user profile and the label and encrypt the composite messages to obtain encryption results $PubKeyEncrypt([P_{i,1}]\|[label_{i,1}], MPC_1)$ and PubKeyEncrypt $([P_{i,2}]\|[label_{i,2}], MPC_2)$. Encrypting the shares using encryption keys of the MPC cluster 130 prevents the content platform 150 from being able to access the user profiles in cleartext. The application 112 transmits the encrypted shares to the content platform (914). Note that operation 914 is omitted if the application 112 transmits the secret shares directly to computing systems $MPC_1$ and $MPC_2$.

Example Process for Generating and Using k-NN Models

FIG. 10 is a flow diagram that illustrates an example process 1000 for generating a machine learning model. Operations of the process 1000 can be implemented, for example, by the MPC cluster 130 of FIG. 1. Operations of the process 1000 can also be implemented as instructions stored on one or more computer readable media which may be non-transitory, and execution of the instructions by one or more data processing apparatus can cause the one or more data processing apparatus to perform the operations of the process 1000.

The MPC cluster 130 obtains shares of user profiles (1002). A content platform 150 can request that the MPC cluster 130 train a machine learning model by transmitting shares of user profiles to the MPC cluster 130. The content platform 150 can access the encrypted shares received from the client devices 110 for the machine learning model over a given time period and upload those shares to the MPC cluster 130.

For example, the content platform 150 can transmit, to computing system $MPC_1$, the encrypted first share of the user profile and the encrypted first share of its label (e.g., $PubKeyEncrypt([P_{i,1}]\|[label_{i,1}])$ for each user profile $P_i$. Similarly, the content platform 150 can transmit, to computing system $MPC_2$, the encrypted second share of the user profile and the encrypted second share of its label (e.g., $PubKeyEncrypt([P_{i,2}]\|[label_{i,2}])$ for each user profile $P_i$.

In some implementations where the application 112 directly sends secret shares of user profiles to the MPC cluster 130, the content platform 150 can request that the MPC cluster 130 train a machine learning model by transmitting a training request to the MPC cluster 130.

The computing systems $MPC_1$ and $MPC_2$ create random projection planes (1004). The computing systems $MPC_1$ and $MPC_2$ can collaboratively create m random projection planes $U=\{U_1, U_2, \ldots, U_m\}$. These random projection planes should remain as secret shares between the two computing systems $MPC_1$ and $MPC_2$. In some implementations, the computing systems $MPC_1$ and $MPC_2$ create the random projection planes and maintain their secrecy using the Diffie-Hellman key exchange technique.

As described in more detail below, the computing systems $MPC_1$ and $MPC_2$ will project their shares of each user profile onto each random projection plane and determine, for each random projection plane, whether the share of the user profile is on one side of the random projection plane. Each computing system $MPC_1$ and $MPC_2$ can then build a bit vector in secret shares from secret shares of the user profile based on the result for each random projection. Partial knowledge of the bit vector for a user, e.g., whether or not the user profile Pi is on one side of the projection plane $U_k$ allows either computing system $MPC_1$ or $MPC_2$ to gain some knowledge about the distribution of $P_i$, which is incremental to the prior knowledge that the user profile $P_i$ has unit length. To prevent the computing systems $MPC_1$ and $MPC_2$ gaining access to this information (e.g., in implementations in which this is required or preferred for user privacy and/or data security), in some implementations, the random projection planes are in secret shares, therefore neither computing system $MPC_1$ nor $MPC_2$ can access the random projection planes in cleartext. In other implementations, a random bit flipping pattern can be applied over random projection results using secret share algorithms, as described in optional operations 1006-1008.

To demonstrate how to flip bits via secret shares, assume that there are two secrets x and y whose values are either zero or one with equal probability. An equality operation [x]==[y] will flip the bit of x if y==0 and will keep the bit of x if y==1. In this example, the operation will randomly flip the bit x with 50% probability. This operation can require remote procedure calls (RPCs) between the two computing systems $MPC_1$ and $MPC_2$ and the number of rounds depends on the data size and the secret share algorithm of choice.

Each computing system $MPC_1$ and $MPC_2$ create a secret m-dimensional vector (1006). The computing system $MPC_1$ can create a secret m-dimension vector $\{S_1, S_2, \ldots S_m\}$, where each element $S_i$ has a value of either zero or one with equal probability. The computing system $MPC_1$ splits its m-dimensional vector into two shares, a first share $\{[S_{1,1}], [S_{2,1}], \ldots [S_{m,1}]\}$ and a second share $\{[S_{1,2}], [S_{2,2}], \ldots [S_{m,2}]\}$. The computing system $MPC_1$ can keep the first share secret and provide the second share to computing system $MPC_2$. The computing system $MPC_1$ can then discard the m-dimensional vector $\{S_1, S_2, \ldots S_m\}$.

The computing system $MPC_2$ can create a secret m-dimension vector $\{T_1, T_2, \ldots T_m\}$, where each element $T_i$ has a value of either zero or one. The computing system $MPC_2$ splits its m-dimensional vector into two shares, a first share $\{[T_{1,1}], [T_{1,2}], \ldots [T_{m,1}]\}$ and a second share $\{[T_{1,2}], [T_{2,2}], \ldots [T_{m,2}]\}$. The computing system $MPC_2$ can keep the first share secret and provide the second share to computing system $MPC_1$. The computing system $MPC_2$ can then discard the m-dimensional vector $\{T_1, T_2, \ldots T_m\}$.

The two computing systems $MPC_1$ and $MPC_2$ use secure MPC techniques to calculate shares of a bit flipping pattern (1008). The computing systems $MPC_1$ and $MPC_2$ can use a secure share MPC equality test with multiple roundtrips between the computing systems $MPC_1$ and $MPC_2$ to compute shares of the bit flipping pattern. The bit flipping pattern can be based on the operation [x]==[y] described above. That is, the bit flipping pattern can be $\{S_1==T_1, S_2== T_2, \ldots S_m==T_m\}$. Let each $ST_i=(S_i==T_i)$. Each $ST_i$ has a value of either zero or one. After the MPC operation is completed, computing system $MPC_1$ has a first share $\{[ST_{1,1}], [ST_{2,1}], \ldots [ST_{m,1}]\}$ of the bit flipping pattern and computing system $MPC_2$ has a second share $\{[ST_{1,2}], [ST_{2,2}], \ldots [ST_{m,2}]\}$ of the bit flipping pattern. The shares of each $ST_i$ enable the two computing systems $MPC_1$ and $MPC_2$ to flip the bits in bit vectors in a way that is opaque to either one of the two computing systems $MPC_1$ and $MPC_2$.

Each computing system $MPC_1$ and $MPC_2$ projects its shares of each user profile onto each random projection plane (1010). That is, for each user profile that the computing system $MPC_1$ received a share, the computing system $MPC_1$ can project the share $[P_{i,1}]$ onto each projection plane $U_j$. Performing this operation for each share of a user profile and for each random projection plane $U_j$ results in a matrix R of z×m dimension, where z is the number of user profiles available and m is the number of random projection planes. Each element $R_{i,j}$ in the matrix R can be determined by computing the dot product between the projection plane $U_j$ and the share $[P_{i,1}]$, e.g., $R_{i,j}=U_j\odot[P_{i,1}]$. The operation p denotes the dot product of two vectors of equal length.

If bit flipping is used, computing system $MPC_1$ can modify the values of one or more of the elements $R_{i,j}$ in the matrix using the bit flipping pattern secretly shared between the computing systems $MPC_1$ and $MPC_2$. For each element $R_{i,j}$ in the matrix R, computing system $MPC_1$ can compute, as the value of the element $R_{i,j}$, $[ST_{j,1}]==\text{sign}(R_{i,j})$. Thus, the sign of the element $R_{i,j}$ will be flipped if its corresponding bit in the bit $[ST_{j,1}]$ in the bit flipping pattern has a value of zero. This computation can require multiple RPCs to computing system $MPC_2$.

Similarly, for each user profile that the computing system $MPC_2$ received a share, the computing system $MPC_2$ can project the share $[P_{i,2}]$ onto each projection plane $U_j$. Performing this operation for each share of a user profile and for each random projection plane $U_j$ results in a matrix R' of z×m dimension, where z is the number of user profiles available and m is the number of random projection planes. Each element $R_{i,j}'$ in the matrix R' can be determined by computing the dot product between the projection plane $U_j$ and the share $[P_{i,2}]$, e.g., $R_{i,j}'=\text{ij}_j\odot[P_{i,2}]$. The operation $\odot$ denotes the dot product of two vectors of equal length.

If bit flipping is used, computing system $MPC_2$ can modify the values of one or more of the elements $R_{i,j}'$ in the matrix using the bit flipping pattern secretly shared between the computing systems $MPC_1$ and $MPC_2$. For each element $R_{i,j}'$ in the matrix R, computing system $MPC_2$ can compute, as the value of the element $R_{i,j}'$, $[ST_{j,2}]==\text{sign}(R_{i,j}')$. Thus, the sign of the element $R_{i,j}'$ will be flipped if its corresponding bit in the bit $ST_j$ in the bit flipping pattern has a value of zero. This computation can require multiple RPCs to computing system $MPC_1$.

The computing systems $MPC_1$ and $MPC_2$ reconstruct bit vectors (1012). The computing systems $MPC_1$ and $MPC_2$ can reconstruct the bit vectors for the user profiles based on the matrices R and R', which have exactly the same size. For example, computing system $MPC_1$ can send a portion of the columns of matrix R and computing system $MPC_2$ can send the remaining portion of the columns of matrix R' to $MPC_1$. In a particular example, computing system $MPC_1$ can send the first half of the columns of matrix R to computing system $MPC_2$ and computing system $MPC_2$ can send the second half of the columns of matrix R' to $MPC_1$. Although columns are used in this example for horizontal reconstruction and are preferred to protect user privacy, rows can be used in other examples for vertical reconstruction.

In this example, computing system $MPC_2$ can combine the first half of the columns of matrix R' with the first half of the columns of matrix R received from computing system $MPC_1$ to reconstruct the first half (i.e., m/2 dimension) of bit vectors in cleartext. Similarly, computing system $MPC_1$ can combine the second half of the columns of matrix R with the second half of the columns of matrix R' received from computing system $MPC_2$ to reconstruct the second half (i.e. m/2 dimension) of bit vectors in cleartext. Conceptually, the computing systems $MPC_1$ and $MPC_2$ have now combined corresponding shares in two matrixes R and R' to reconstruct bit matrix B in cleartext. This bit matrix B would include the bit vectors of the projection results (projected onto each projection plane) for each user profile for which shares were received from the content platform 150 for the machine learning model. Each one of the two servers in the MPC cluster 130 owns half of the bit matrix B in cleartext.

However, if bit flipping is used, the computing systems $MPC_1$ and $MPC_2$ have flipped bits of elements in the matrices R and R' in a random pattern fixed for the machine learning model. This random bit flipping pattern is opaque to either of the two computing systems $MPC_1$ and $MPC_2$ such that neither computing system $MPC_1$ nor $MPC_2$ can infer the original user profiles from the bit vectors of the project results. The crypto design further prevents $MPC_1$ nor $MPC_2$ from inferring the original user profiles by horizontally partitioning the bit vectors, i.e. computing system $MPC_1$ holds the second half of bit vectors of the projection results in cleartext and computing system $MPC_2$ holds the first half of bit vectors of the projection results in cleartext.

The computing systems $MPC_1$ and $MPC_2$ generate machine learning models (1014). The computing system $MPC_1$ can generate a k-NN model using the second half of the bit vectors. Similarly, computing system $MPC_2$ can generate a k-NN model using the first half of the bit vectors. Generating the models using bit flipping and horizontal partitioning of the matrices applies the defense-in-depth principle to protect the secrecy of the user profiles used to generate the models.

In general, each k-NN model represents cosine similarities (or distances) between the user profiles of a set of users. The k-NN model generated by computing system $MPC_1$ represents the similarity between the second half of the bit vectors and the k-NN model generated by computing system $MPC_2$ represents the similarity between the first half of the bit vectors. For example, each k-NN model can define the cosine similarity between its half of the bit vectors.

The two k-NN models generated by the computing systems $MPC_1$ and $MPC_2$ can be referred to as a k-NN model, which has a unique model identifier as described above. The computing systems $MPC_1$ and $MPC_2$ can store their models and shares of the labels for each user profile used to generate the models. The content platform 150 can then query the models to make inferences for user groups for a user.

Example Process for Using k-NN Model to Infer User Groups

FIG. 11 is a flow diagram that illustrates an example process 1100 for adding a user to user groups using machine learning models. Operations of the process 1100 can be implemented, for example, by the MPC cluster 130 and the client device 110 of FIG. 1, e.g., the application 112 running on the client device 110. Operations of the process 1100 can also be implemented as instructions stored on one or more computer readable media which may be non-transitory, and execution of the instructions by one or more data processing apparatus can cause the one or more data processing apparatus to perform the operations of the process 1100.

The MPC cluster 130 receives an inference request for a given user profile (1102). An application 112 running on a user's client device 110 can transmit the inference request to the MPC cluster 130, e.g., in response to a request from a content platform 150. For example, the content platform 150 can transmit, to the application 112, an upload token $M_{infer}$ to request that the application 112 submit the inference request to the MPC cluster 130. The inference request can be to query whether the user should be added to any number of user groups.

The inference request token $M_{infer}$ can include shares of the given user profile of the user, the model identifier for the machine learning model (e.g., k-NN model) and the owner domain to be used for the inference, a number k of nearest neighbors of the given user profile to be used for the inference, additional signals (e.g., contextual or digital component signals), the aggregation function to be used for the inference and any aggregation function parameters to be used for the inference, and the signature over all the above information created by the owner domain using an owner domain confidential privacy key.

As described above, to prevent leaking the given user profile $P_i$ in cleartext form to either computing system $MPC_1$ or $MPC_2$, and thereby preserve user privacy, the application 112 can split the given user profile $P_i$ into two shares $[P_{i,1}]$ and $[P_{i,2}]$ for $MPC_1$ and $MPC_2$, respectively. The application 112 can then send a single inference request to computing system $MPC_1$ with the first share $[P_{i,1}]$ of the given user profile and an encrypted version of the second share, e.g., PubKeyEncrypt($[P_{i,2}]$, $MPC_2$) of the given user profile. The inference request may also include the inference request token $M_{infer}$ so that the MPC cluster 130 can authenticate the inference request. By sending an inference request that includes the first share and the encrypted second share, the number of outgoing requests sent by the application 112 is reduced, resulting in computational and battery savings at the client device 110.

In other implementations, the application 112 can send the first share $[P_{i,1}]$ of the given user profile to computing system $MPC_1$ and the second share $[P_{i,2}]$ of the given user profile to computing system $MPC_2$. By sending the second share $[P_{i,2}]$ of the given user profile to computing system $MPC_2$ without going through computing system $MPC_1$, the second share does not need to be encrypted to prevent computing system $MPC_1$ from accessing the second share $[P_{i,2}]$ of the given user profile.

Each computing system $MPC_1$ and $MPC_2$ identifies the k nearest neighbors to the given user profile in secret share representation (1104). The computing system $MPC_1$ can compute its half of a bit vector of the given user profile using the first share $[P_{i,1}]$ of the given user profile. To generate the bit vector, computing system $MPC_1$ can use operations 1010 and 1012 of the process 1000 of FIG. 10. That is, computing system $MPC_1$ can use the random projection vectors generated for the k-NN model to project the share $[P_{i,1}]$ of the given user profile and create a secret share of a bit vector for the given user profile. If bit flipping was used to generate the k-NN model, the computing system $MPC_1$ can then use the first share $\{[ST_{1,1}], [ST_{2,1}], \ldots [ST_{m,1}]\}$ of the bit flipping pattern that was used to generate the k-NN model to modify the elements of the secret share of a bit vector for the given user profile.

Similarly, the computing system $MPC_1$ can provide, to computing system $MPC_2$, the encrypted second share PubKeyEncrypt($[P_{i,2}]$, $MPC_2$) of the given user profile. The computing system $MPC_2$ can decrypt the second share $[P_{i,2}]$ of the given user profile using its private key and compute its half of the bit vector for the given user profile using the second share $[P_{i,2}]$ of the given user profile. That is, computing system $MPC_2$ can use the random projection vectors generated for the k-NN model to project the share $[P_{i,2}]$ of the given user profile and create a bit vector for the given user profile. If bit flipping was used to generate the k-NN model, the computing system $MPC_2$ can then use the second share $\{[ST_{1,2}], [ST_{2,2}], \ldots [ST_{m,2}]\}$ of the bit flipping pattern that was used to generate the k-NN model to modify the elements of the bit vector for the given user profile. The computing systems $MPC_1$ and $MPC_2$ then reconstruct the bit vector with horizontal partition, as described in operation 1012 in FIG. 10. After the completion of reconstruction, computing system $MPC_1$ has the first half of the overall bit vector for the given user profile and computing system $MPC_2$ has the second half of the overall bit vector for the given user profile.

Each computing system $MPC_1$ and $MPC_2$ uses its half of the bit vector for the given user profile and its k-NN model to identify the k' nearest neighbor user profiles, where k'=a×k, where a is empirically determined based on actual production data and statistical analysis. For example a=3 or another appropriate number. The computing system $MPC_1$ can compute a Hamming distance between the first half of the overall bit vector and the bit vector for each user profile of the k-NN model. The computing system $MPC_1$ then identifies the k' nearest neighbors based on the computed Hamming distances, e.g., the k' user profiles having the lowest Hamming distances. In other words, the computing system $MPC_1$ identifies a set of nearest neighbor user profiles based on a share of a given user profile and a k-nearest neighbor model trained using a plurality of user profiles. An example result in tabular form is shown in Table 13 below

TABLE 13

| Row ID | Hamming Distance (in cleartext) | Shares of User Profile | Shares of Label |
|---|---|---|---|
| i | $d_{i,1}$ | $[P_{i,1}]$ | $[label_{i,1}]$ |
| . . . | . . . | . . . | . . . |

In Table 13, each row is for a particular nearest neighbor user profile and includes the Hamming distance between that user profile and the given user profile computed by computing system $MPC_1$. The row for a particular nearest neighbor user profile also includes the first share of that user profile and the first share of the label associated with that user profile.

Similarly, the computing system $MPC_2$ can compute a Hamming distance between the second half of the overall bit vector and the bit vector for each user profile of the k-NN model. The computing system $MPC_2$ then identifies the k' nearest neighbors based on the computed Hamming distances, e.g., the k' user profiles having the lowest Hamming distances. An example result in tabular form is shown in Table 14 below.

TABLE 14

| Row ID | Hamming Distance (in cleartext) | Shares of User Profile | Shares of Label |
|---|---|---|---|
| j | $d_{j,2}$ | $[P_{j,2}]$ | $[label_{j,2}]$ |
| . . . | . . . | . . . | . . . |

In Table 14, each row is for a particular nearest neighbor user profile and includes the Hamming distance between that user profile and the given user profile computed by computing system $MPC_2$. The row for a particular nearest neighbor user profile also includes the second share of that user profile and the second share of the label associated with that user profile.

The computing systems $MPC_1$ and $MPC_2$ can exchange the list of row identifiers (row ID) and Hamming distance pairs with each other. Thereafter, each computing system $MPC_1$ and $MPC_2$ can independently select k nearest neighbors with the same algorithm and input data. For example, computing system $MPC_1$ can find row identifiers common to partial query results from both computing systems $MPC_1$ and $MPC_2$. For each i in the common row identifiers, computing system $MPC_1$ calculates combined Hamming distance d, from the two partial Hamming distances, e.g., $d_i=d_{i,1}+d_{i,2}$. The computing system $MPC_1$ can then order the common row identifiers based on the combined Hamming distance $d_i$ and select the k nearest neighbors. The row identifiers for the k nearest neighbors can be represented as $ID=\{id_1, \ldots id_k\}$. It can be proven that if a is sufficiently large, the k nearest neighbors determined in the above algorithm are the true k nearest neighbors with high probability. However, larger value for a leads to high computation cost.

A determination is made whether to add the user to a user group (1106). This determination can be made based on the k nearest neighbor profiles and their associated labels. The determination is also based on the aggregation function used and any aggregation parameters for that aggregation function. The aggregation functions can include, for example binary classification, regression (e.g., using arithmetic mean or root mean square), multiclass classification, and weighted k-NN. Each way of determining whether to add a user to a user group can include different interactions between the MPC cluster 130 and the application 112 running on the client 110, as described in more detail below.

If a determination is made to not add the user to the user group, the application 112 may not add the user to the user group (1108). If a determination is made to add the user to the user group, the application 112 can add the user to the user group, e.g., by updating the user group list stored at the client device 110 to include the user group identifier of the user group (1110).

Example Binary Classification Inference Techniques Using k-NN Models

For binary classification, the inference request can include, as aggregation function parameters, a threshold, $L_{true}$, and $L_{false}$. The label values are Boolean type, i.e. either true or false. The threshold parameter can represent a threshold percentage of k nearest neighbor profiles that must have a label of true value in order for the user to be added to the user group $L_{true}$. Otherwise the user will be added to user group $L_{false}$. In one approach, the MPC cluster 130 could instruct the application 112 to add the user to the user group $L_{true}$ ($L_{false}$ otherwise) if the number of nearest neighbor user profiles that has a label value that is true is greater than a product of the threshold and k. However, computing system $MPC_1$ would learn the inference result, e.g., the user group that the user should join.

To preserve user privacy, the inference request can include the threshold in cleartext, a first share $[L_{true,1}]$ and $[L_{false,1}]$ for computing system $MPC_1$, and an encrypted second share $PubKeyEncrypt([L_{true,2}]||[L_{false,2}]||application\_ public\_key], MPC_2)$ for computing system $MPC_2$. In this example, the application 112 can generate a composite message from $[L_{true,2}]$, $[L_{fasle,2}]$ and the public key of the application 112, as denoted by the symbols ||, and encrypt this composite message using a public key of computing system $MPC_2$. The inference response from computing system $MPC_1$ to the application 112 can include a first share of the inference result $[L_{result,1}]$ determined by computing system $MPC_1$ and a second share of the inference result $[L_{result,2}]$ determined by computing system $MPC_2$.

To prevent the second share from being accessed by computing system $MPC_1$ and therefore enabling computing system $MPC_1$ to obtain the inference result in cleartext, computing system $MPC_2$ can send an encrypted (and optionally digitally signed) version of the second share of the inference result $[L_{result,2}]$, e.g., $PubKeySign(PubKeyEncrypt([L_{result,2}], application\_public\_key), MPC_2)$ to computing system $MPC_1$ for inclusion in the inference response sent to the application 112. In this example, the application 112 can verify the digital signature using the public key of computing system $MPC_2$ that corresponds to the private key of computing system $MPC_2$ used to generate the digital signature, and decrypt the second share of the inference result $[L_{result,2}]$ using the private key of the application 112 corresponding to the public key (application_public_key) used to encrypt the second share of the inference result $[L_{result,2}]$.

The application 112 can then reconstruct the inference result $L_{result}$ from the first share $[L_{result,1}]$ and the second share $[L_{result,2}]$. Using the digital signature enables the application 112 to detect falsification of the result from computing system $MPC_2$, e.g., by computing system $MPC_1$. Depending on the level of security desired, what parties operate the computing systems of the MPC cluster 130, and the security model assumed, the digital signature may not be required.

The computing systems $MPC_1$ and $MPC_2$ can use MPC techniques to determine the shares $[L_{result,1}]$ and $[L_{result,2}]$ of the binary classification result. In binary classification, the value of labels for a user profile is either zero (false) or one (true). Assuming that the selected k nearest neighbors are identified by identifiers $\{id_1, \ldots id_k\}$, the computing systems $MPC_1$ and $MPC_2$ can calculate a sum of the labels (sum_of_labels) for the k nearest neighbor user profiles, where the sum is represented by Relationship 15 below:

$$sum\_of\_labels=\Sigma_{i\in(id1, \ldots idk)}label_i \quad \text{Relationship 15:}$$

To determine the sum, computing system $MPC_1$ sends ID (i.e., $\{id_1, \ldots id_k\}$) to computing system $MPC_2$. The computing system $MPC_2$ can verify that the number of row identifiers in ID is greater than a threshold to enforce k-anonymity. The computing system $MPC_2$ can then calculate a second share of the sum of labels [sum_of_labels$_2$] using Relationship 16 below:

$$[\text{sum\_of\_labels}_2] = \Sigma_{i \in (id1, \dots idk)}[\text{label}_{i,2}] \qquad \text{Relationship 16:}$$

The computing system $MPC_1$ can also calculate a first share of the sum of labels [sum_of_labels$_1$] using Relationship 17 below:

$$[\text{sum\_of\_labels}_1] = \Sigma_{i \in (id1, \dots idk)}[\text{label}_{i,1}] \qquad \text{Relationship 17:}$$

If the sum of the labels sum_of_labels is confidential information that the computing systems $MPC_1$ and $MPC_2$ should know as little as possible, computing system $MPC_1$ can calculate whether the first share of the sum of labels [sum_of_labels$_1$] is below the threshold, e.g., [below_threshold$_1$]=[sum_of_labels$_1$]<threshold×k. Similarly, computing system $MPC_2$ can calculate whether the second share of the sum of labels [sum_of_labels$_2$] is below the threshold, e.g., [below_threshold$_2$]=[sum_of_labels$_2$]<threshold×k. The computing system $MPC_1$ can proceed to calculate inference result [$L_{result,1}$] by [below_threshold$_1$]×[$L_{false, 1}$]+ (1−[below_threshold$_1$])×[$L_{true, 1}$]. Similarly, computing system $MPC_2$ can calculate [$L_{result,2}$] by [below_threshold$_2$]× [$L_{false, 2}$]+(1−[below_threshold$_2$])×[$L_{true, 2}$].

If the sum of the labels sum_of_labels is not confidential information, computing systems $MPC_1$ and $MPC_2$ can reconstruct the sum_of_labels from [sum_of_labels$_1$] and [sum_of_labels$_2$]. The computing systems $MPC_1$ and $MPC_2$ can then set the parameter below_threshold to sum_of_labels<threshold×k, e.g., a value of one if it is below the threshold or a value of zero if not below the threshold.

After computing the parameter below_threshold, the computing systems $MPC_1$ and $MPC_2$ can proceed to determine the inference result $L_{result}$. For example, computing system $MPC_2$ can set [$L_{result,2}$] to either [$L_{true,2}$] or [$L_{false,2}$] according to the value of below_threshold. For example, computing system $MPC_2$ can set [$L_{result,2}$] to [$L_{true,2}$] if the sum of labels is not below the threshold or to [$L_{false,2}$] if the sum of labels is below the threshold. The computing system $MPC_2$ can then return an encrypted second share of the inference result (PubKeyEncrypt($L_{result,2}$, application_public_key)) or a digitally signed version of this result to computing system $MPC_1$.

Similarly, computing system $MPC_1$ can set [$L_{result,1}$] to either [$L_{true,1}$] or [$L_{false,1}$] according to the value of below_threshold. For example, computing system $MPC_1$ can set [$L_{result,1}$] to [$L_{true,1}$] if the sum of labels is not below the threshold or to [$L_{false,1}$] if the sum of labels is below the threshold. The computing system $MPC_1$ can transmit the first share of the inference result [$L_{result,1}$] and the encrypted second share of the inference result [$L_{result,2}$] as an inference response to the application 112. The application 112 can then compute the inference result based on the two shares, as described above.

Example Multiclass Classification Inference Techniques Using k-NN Models

For multiclass classification, the label associated with each user profile can be categorical feature. The content platform 150 can specify a lookup table that maps any possible categorical value to a corresponding user group identifier. The lookup table can be one of the aggregation function parameters included in the inference request.

Within the k nearest neighbors found, the MPC cluster 130 finds the most frequent label value. The MPC cluster 130 can then find, in the lookup table, the user group identifier corresponding to the most frequent label value and request that the application 112 add the user to the user group corresponding to the user group identifier, e.g., by adding the user group identifier to the user group list stored at the client device 110.

Similar to binary classification, it may be preferable to hide the inference result $L_{result}$ from the computing systems $MPC_1$ and $MPC_2$. To do so, the application 112 or the content platform 150 can create two lookup tables that each maps categorical values to a respective share of the inference result $L_{result}$. For example, the application can create a first lookup table that maps the categorical values to a first share [$L_{result1}$] and a second lookup table that maps the categorical values to a second share [$L_{result2}$]. The inference request from the application to computing system $MPC_1$ can include the first lookup table in cleartext for computing system $MPC_1$ and an encrypted version of the second lookup table for computing system $MPC_2$. The second lookup table can be encrypted using a public key of computing system $MPC_2$. For example, a composite message that includes the second lookup table and a public key of the application can be encrypted using the public key of the computing system $MPC_2$, e.g., PubKeyEncrypt(lookuptable2‖ application_ public_key, $MPC_2$).

The inference response sent by computing system $MPC_1$ can include the first share [$L_{result1}$] of the inference result generated by the computing system $MPC_1$. Similar to binary classification, to prevent the second share from being accessed by computing system $MPC_1$ and therefore enabling computing system $MPC_1$ to obtain the inference result in cleartext, computing system $MPC_2$ can send an encrypted (and optionally digitally signed) version of the second share of the inference result [$L_{result,2}$], e.g., PubKeySign(PubKey-Encrypt([$L_{result,2}$], application_public_key), $MPC_2$) to computing system $MPC_1$ for inclusion in the inference result sent to the application 112. The application 112 can reconstruct the inference result $L_{result}$ from [$L_{result1}$] and [$L_{result2}$].

Assume there are w valid labels {$l_1$, $l_2$, . . . $l_w$} for a multiclass classification problem. To determine the shares [$L_{result1}$] and [$L_{result2}$] of the inference result $L_{result}$ in multiclass classification, computing system $MPC_1$ sends ID (i.e., {$id_1$, . . . $id_k$}) to computing system $MPC_2$. The computing system $MPC_2$ can verify that the number of row identifiers in ID is greater than a threshold to enforce k-anonymity. In general, the k in k-NN may be significantly larger than the k in k-anonymity. The computing system $MPC_2$ can then calculate a second frequency share [frequency$_{j,2}$] of the j-th label [$l_{j,2}$] which is defined using Relationship 18 below.

$$[\text{frequency}_{j,2}] = \Sigma_{i \in (id_1, \dots id_k)}[\text{label}_{i,2}] == l_j) \qquad \text{Relationship 18:}$$

Similarly, computing system $MPC_1$ calculates a first frequency share [frequency$_{j,1}$] of the j-th label [$l_{j,1}$] which is defined using Relationship 19 below.

$$[\text{frequency}_{j,1}] = \Sigma_{i \in (id_1, \dots id_k)}[\text{label}_{i,1}] == l_j) \qquad \text{Relationship 19:}$$

Assuming that the frequency of a label (frequency$_i$) within the k nearest neighbors is not sensitive, the computing systems $MPC_1$ and $MPC_2$ can reconstruct frequency$_i$ from the two shares [frequency$_{i,1}$] and [frequency$_{i,2}$] for that label. The computing systems $MPC_1$ and $MPC_2$ can then determine an index parameter (index) where frequency$_{index}$ has the largest value, e.g., index=argmax$_i$(frequency$_i$).

The computing system $MPC_2$ can then lookup, in its lookup table, the share [$L_{result,2}$] corresponding to the label having the highest frequency and return PubKeyEncrypt ([$L_{result,2}$], application_public_key) to the computing system $MPC_1$. The computing system $MPC_1$ can similarly lookup, in its lookup table, the share $[L_{result,1}]$ corresponding to the label having the highest frequency. The computing system $MPC_1$ can then send, to the application 112, an inference response that includes the two shares (e.g., $[L_{result,1}]$ and PubKeyEncrypt($[L_{result,2}]$, application_public_key). As described above, the second share can be digitally signed to prevent computing system $MPC_1$ from falsifying the response of computing system $MPC_2$. The application 112 can then compute the inference result based on the two shares, as described above, and add the user to the user group identified by the inference result.

Example Regression Inference Techniques

For regression, the label associated with each user profile P must be numerical. The content platform 150 can specify an ordered list of thresholds, e.g., $(-\infty < t_0 < t_1 < \ldots < t_n < \infty)$, and a list of user group identifiers, e.g., $\{L_0, L_1, \ldots L_n, L_{n+1}\}$. In addition, the content platform 150 can specify an aggregation function, e.g., arithmetic mean or root mean square.

Within the k nearest neighbors found, the MPC cluster 130 calculates the mean (result) of the label values and then looks up the mapping using the result to find the inference result $L_{result}$. For example, the MPC cluster 130 can use Relationship 20 below to identify the label based on the mean of the label values:

$$\text{If result} \leq t_0, L_{result} \leftarrow L_0;$$

$$\text{If result} > t_n, L_{result} \leftarrow L_{n+1};$$

$$\text{If } t_x < \text{result} \leq t_{x+1}, L_{result} \leftarrow L_{x+1} \qquad \text{Relationship 20:}$$

That is, if the result is less than or equal to threshold $t_o$, the inference result $L_{result}$ is $L_0$. If the result is greater than threshold $t_n$, the inference result $L_{result}$ is $L_{n+1}$. Otherwise, if the result is greater than threshold $t_x$ and less than or equal to threshold $t_{x+1}$, the inference result $L_{result}$ is $L_{x+1}$. The computing system $MPC_1$ then requests that the application 112 add the user to the user group corresponding to the inference result $L_{result}$, e.g., by sending an inference response that includes the inference result $L_{result}$ to the application 112.

Similar to the other classification techniques described above, the inference result $L_{result}$ can be hidden from the computing systems $MPC_1$ and $MPC_2$. To do so, the inference request from the application 112 can include first share of the labels $[L_{i,1}]$ for computing system $MPC_1$ and encrypted second shares of the labels $[L_{i,2}]$ (e.g., PubKeyEncrypt $([L_{0,2}] \| \ldots \| L_{n+1,2}]\|$application_public_key, $MPC_2$)) for computing system $MPC_2$.

The inference result sent by computing system $MPC_1$ can include the first share $[L_{result1}]$ of the inference result generated by the computing system $MPC_1$. Similar to binary classification, to prevent the second share from being accessed by computing system $MPC_1$ and therefore enabling computing system $MPC_1$ to obtain the inference result in cleartext, computing system $MPC_2$ can send an encrypted (and optionally digitally signed) version of the second share of the inference result $[L_{result,2}]$, e.g., PubKeySign(PubKey-Encrypt($[L_{result2}]$, application_public_key), $MPC_2$) to computing system $MPC_1$ for inclusion in the inference result sent to the application 112. The application 112 can reconstruct the inference result $L_{result}$ from $[L_{result,1}]$ and $[L_{result,2}]$.

When the aggregation function is arithmetic mean, the computing systems $MPC_1$ and $MPC_2$ compute the sum of the labels sum_of_labels, similar to binary classification. If the sum of the labels is not sensitive, the computing systems $MPC_1$ and $MPC_2$ can calculate the two shares [sum_of_labels$_1$] and [sum_of_labels$_2$] and then reconstruct sum_of_labels based on the two shares. The computing systems $MPC_1$ and $MPC_2$ can then compute the average of the labels by dividing the sum of the labels by the quantity of the nearest neighbor labels, e.g., by k.

The computing system $MPC_1$ can then compare the average to the thresholds using Relationship 20 to identify the label corresponding to the average and set the first share $[L_{result,1}]$ to the identified label. Similarly, the computing system $MPC_2$ can compare the average to the thresholds using Relationship 20 to identify the label corresponding to the average and set the second share $[L_{result,2}]$ to the identifier label. The computing system $MPC_2$ can encrypt the second share $[L_{result,2}]$ using the public key of the application 112, e.g., PubKeyEncrypt($[L_{result2}]$, application_public_key) and send the encrypted second share to computing system $MPC_1$. The computing system $MPC_1$ can provide the first share and the encrypted second share (which can optionally be digitally signed as described above) to the application 112. The application 112 can then add the user to the user group identified by the label (e.g., user group identifier) $L_{result}$.

If the sum of the labels is sensitive, the computing systems $MPC_1$ and $MPC_2$ may not be able to construct sum_of_labels in cleartext. Instead, computing system $MPC_1$ can calculate a mask $[mask_{i,1}]=[sum\_of\_labels_1]$ $> t_i \times k$ for $\forall i \in [0,n]$. This computation can require multiple roundtrips between the computing systems $MPC_1$ and $MPC_2$. Next, computing system $MPC_1$ can calculate $[acc_{i,1}]=(1==\Sigma_{j=0}^i[mask_{j,1}])$ and computing system $MPC_2$ can calculate $[acc_{i,2}]=(1==\Sigma_{j=0}^i[mask_{j,2}])$. The equality test in this operation can require multiple roundtrips between the computing systems $MPC_1$ and $MPC_2$.

In addition, computing system $MPC_1$ can calculate $[use\_default_1]=(0==\Sigma_{j=0}^n[mask_{j,1}])$ and computing system $MPC_2$ can calculate $[use\_default_2]=(0==\Sigma_{j=0}^n[mask_{j,2}])$. The MPC cluster 130 would then return $L_i$ if and only if $acc_i==1$, for $\forall i \forall [0,n] \forall i \in [0,n]$, and would return $L_{n+1}$ if use_default==1. This condition can be represented in Relationship 21 below.

$$\text{result=use\_default} \times L_{n+1} + \Sigma_{i=0}^n \text{acc}_i \times L_i \qquad \text{Relationship 21:}$$

The corresponding cryptographic implementation can be represented by Relationships 22 and 23 below.

$$[L_{result,1}]=[use\_default_1] \times L_{n+1} + \Sigma_{i=0}^n([acc_{i,1}] \times L_i) \qquad \text{Relationship 22:}$$

$$[L_{result,2}]=[use\_default_2] \times L_{n+1} + \Sigma_{i=0}^n([acc_{i,2}] \times L_i) \qquad \text{Relationship 23:}$$

These computations do not require any roundtrip computations between the computing systems $MPC_1$ and $MPC_2$. The computing system $MPC_1$ can provide the two shares of the result (e.g., $[L_{result,1}]$ and $[L_{result,2}]$ to the application 112, with the second share encrypted and optionally digitally signed as described above. In this way, the application 112 can determine the inference result $L_{result}$ without the computing systems $MPC_1$ or $MPC_2$ learning anything about the immediate or final result.

For root mean square, computing system $MPC_1$ sends ID (i.e., $\{id_1, \ldots id_k\}$) to computing system $MPC_2$. The computing system $MPC_2$ can verify that the number of row identifiers in ID is greater than a threshold to enforce k-anonymity. The computing system $MPC_2$ can calculate a second share of a sum_of_square_labels parameter (e.g., the sum of the squares of the label values) using Relationship 24 below.

$$[sum\_of\_square\_labels_2]=\Sigma_{i \in (id_1, \ldots id_k)}[label_{i,2}]^2 \qquad \text{Relationship 24:}$$

Similarly, computing system $MPC_1$ can calculate a first share of the sum_of_square_labels parameter using Relationship 25 below.

$$[\text{sum\_of\_square\_labels}_1] = \Sigma_{i \in (id_1, \ldots id_k)}[\text{label}_{i,1}]^2 \quad \text{Relationship 25:}$$

Assuming that the sum_of_square_labels parameter is not sensitive, the computing systems $MPC_1$ and $MPC_2$ can reconstruct the sum_of_square_labels parameter from the two shares [sum_of_square_labels$_1$] and [sum_of_square_labels$_2$]. The computing systems $MPC_1$ and $MPC_2$ can compute the root mean square of the labels by dividing the sum_of_squares_labels by the quantity of the nearest neighbor labels, e.g., by k, then calculating the square root.

Regardless of whether the average is calculated via arithmetic mean or root mean square, the computing system $MPC_1$ can then compare the average to the thresholds using Relationship 20 to identify the label corresponding to the average and set the first share [$L_{result,1}$] to the identified label. Similarly, the computing system $MPC_2$ can compare the average to the thresholds using Relationship 20 to identify the label corresponding to the average and set the second share [$L_{result,2}$] to the identifier label. The computing system $MPC_2$ can encrypt the second share [$L_{result,2}$] using the public key of the application 112, e.g., PubKeyEncrypt ([$L_{result,2}$], application_public_key) and send the encrypted second share to computing system $MPC_1$. The computing system $MPC_1$ can provide the first share and the encrypted second share (which can optionally be digitally signed as described above) to the application 112 as the inference result. The application 112 can then add the user to the user group identified by the label (e.g., user group identifier) of the $L_{result}$. If the sum_of_square_labels parameter is sensitive, the computing systems $MPC_1$ and $MPC_2$ can perform a similar cryptographic protocol as used in the arithmetic mean example to compute the shares of the inference result.

In the above techniques to infer the result of classification and regressions problems, all k nearest neighbors have equal influence, e.g., equal weight, over the final inference result. For many classification and regression problems, model quality can be improved if each of the k neighbors is assigned a weight that monotonically decreases when the Hamming distance between the neighbor and the query parameter $P_i$ increases. A common kernel function with this property is Epanechnikov (parabolic) kernel function. Both the Hamming distance and the weight can be calculated in cleartext.

Modification of Definition of Neighbor in k-NN Models

In some implementations, the k nearest neighbors refer to k users that are most similar, in a high-dimensional space, to the user of the application (e.g., browser) that makes the query, as discussed above. However, the algorithm for training or deploying a k-NN model can be independent of how a neighbor is defined. Thus, in some additional implementations, the term neighbor can refer to a group of users, where the points in the high-dimensional space are user groups rather than users. In this example, each user group can be represented by its centroid.

The k-NN models based on such user groups can advantageously be less complex than the k-NN models where users form different points in the high-dimensional space, because there are often significantly less number of user groups than the number of users. For example, a content platform could have a few billion users but a few million user groups; in such case, training the k-NN model with each neighbor being a defined as a user group instead of a user can scale down the model by 1000 times. Such scaling down of the model can advantageously require lower data storage requirements to store the data (here, user groups and associated data such as mappings between different elements) and faster processing to determine whether to add a user to a user group.

To implement a k-NN model where each point in the high-dimensional space is a respective user group, the points in the high-dimensional points are established as follows. The two computing systems $MPC_1$ and $MPC_2$ evaluate each user group to determine a number of users in each user group. If the number of users in a list are less than a preset threshold, that list is not considered as a point in the high-dimensional space. This can help establish that the points in the high-dimensional space are occupied only by lists with more than a preset number of users (e.g., 100 users, 1000 users, or any other threshold number of users). This can preserve user privacy by ensuring that a user group does not target a particular user.

Once the lists are established, the two computing systems $MPC_1$ and $MPC_2$ can determine a centroid of each user group based on the number of users in the user group. The centroid can be defined as an average, as noted above but computed for all the users in the user group. The average as noted above involves a computation of sum for all of the users profiles for the users in the group divided by the number of users in the group. To determine this average to determine the centroid, the two computing systems $MPC_1$ and $MPC_2$ can have a secret share of each user profile, as received from the client devices of the users. For example, each client device can generate two or more secret shares of the user profile and send a respective secret share to each computing system before the centroid is determined. In some implementations, the different subsets of the information in each user profile is provided to each computing system such that there is no overlap in the user profile data that is sent to each computing system. The computation of the average to determine the centroid may require back and forth of data between the MPC cluster 130 and the client devices 110, and such back and forth of specific data may vary based on the specific secret share algorithm being implemented. The centroid can be computed as described above (e.g. see discussion of FIG. 1).

Such centroid of each user group forms a point in the high-dimensional space. For each application that makes a query, the k nearest neighbors are represented by k points (which are representative of k user groups) within that high-dimensional space. Each neighbor is a respective user group. Other modeling aspects and techniques noted above with respect to FIGS. 8-11 can be used to train and deploy such k-NN models, with the difference being that here each point—which is representative of a neighbor—in the high-dimensional space is a user group.

The computing systems $MPC_1$ and $MPC_2$ can use one of several possible machine learning techniques—such as multiclass classification—to determine, based on the k nearest neighbor user profiles, whether to add the user to a group of user groups. Unlike more machine learning techniques—including regression and binary classification—used in implementations above where a point in the high-dimensional space represents a user, the machine learning techniques for implementations where each user group forms a point in the high-dimensional space may exclude regression or binary classification.

Adding Interaction-Based Weights to Users

For digital component providers 160, interactions (e.g. views, clicks, and/or conversions) by all users may not have equal value, and interactions by some users may be more important than the same interactions by other users. For example, a specific interaction (e.g. a view, click, or conversion) by a user who seemingly has a higher purchase capacity (e.g. by virtue of living in an expensive zip code, spending more within a past preset amount of time, or the like) may be more important than that specific interaction by another user who seemingly has a lower purchase capacity.

For a model where each point in the high-dimensional space is a respective user group, this variation in importance based on interactions is accounted for during calculation of the centroid while the model is being trained by allocating a higher interactions-based weight to users who interact with digital components promoting more expensive products, and lower interactions-based weight to users who interact with digital components promoting less expensive products. In some implementations, the weight is determined based on other business objectives. The centroid calculation was described above as being an average for all the users. Here, however, the centroid is calculated as a weighted average for all the users. The weighted average is a sum of weighted values divided by the sum of weights.

For a model where each point in the high-dimensional space is a user, the importance based on interactions is accounted for after the model has been trained and when the model is being used for prediction. For this model, the timing for the accounting of the variation in importance of interactions (i.e. during prediction, which occurs after the training of the model) is different from the timing for the model where each point in the high-dimensional space is a user (i.e., after the computing of the centroid) due to the algorithms used. In this model where each point in the high-dimensional space is a user, the model is implemented as explained above such that the model makes a prediction of the user being assigned a particular class or user group. The importance based on interactions can be accounted for by two ways, which can be implemented either individually or in combination.

Under the first way, the user may be excluded from the assigned user group if less than a preset amount of nearest neighbors are a part of that user group. For example, if only 3 or less neighbors among 10 nearest neighbors are part of the user group, that user is excluded from that assigned group.

Under the second way, each user is assigned a weight based on the interactions by that user (e.g. more weight for interactions with a digital component that promotes an expensive product and less weight for interactions with a digital component that promotes an inexpensive product), and the user is excluded from the assigned group if a mathematical product of the weight and the preset amount of nearest neighbors that are a part of that user group is less than a threshold. For example, if the threshold is 4, only 2 neighbors of the user are a part of the assigned group (which would exclude the user from the assigned group under the first way described above), and the weight assigned to the user is 3, the user would not be excluded from the assigned group under this second way because the mathematical product of the weight and the preset amount of nearest neighbors that are a part of that user group—i.e. 6, which is computed by multiplying 3 by 2—exceeds the threshold value of 4.

The weight assigned to the user can be specified by the demand-side platforms (DSPs), which can be a part of the content platforms 150. In some implementations, the weight can be defined as, or account for, the purchase price of a product promoted by a digital component with which the user interacts (e.g. by way of impressions, clicks, and/or conversions) in response to the user's interaction with a digital component promoting that product. In a few implementations, the weight can be defined as, or account for, the profit to be made on such product. In certain implementations, the weight can be defined based on frequency metrics (e.g. weight being defined as a number of times a product having a price more than a preset value is purchased by the user) and/or recency metrics (e.g. weight being defined as number of times a product was purchased within a preset amount of time in the past). The DSPs may define the weight in any other manner.

The DSPs may provide the weight of a user to the MPC cluster 130 for modeling calculations, including pre-processing or post-processing calculations, by providing the weight to a script running inside the application (e.g. browser). The script is configured to provide, and provides, the weight to the MPC cluster 130 when it uploads the user profile of the user to the MPC cluster 130. The script can send the weight in either secret shares or plain text, depending on the security requirements imposed by the architecture. For example, because the weight is simply a number without much additional data, in some implementations the security may not suffer by sending the weight in plain text. In other implementations, the weight may also be transferred in secret shares to further improve privacy.

FIG. 12 is a flow diagram that illustrates an example process for training and deploying a k-NN model to effectively categorize users into one or more respective user groups. The k-NN model can be trained using user profiles of individual users or centroids for user groups.

Prior to training the k-NN models, the training data can be preprocessed by the MPC cluster 130. For example, if the k-NN model is based on user groups, the MPC cluster 130 can calculate the centroid for each user group. In addition, the MPC cluster 130 can calculate one or more performance measures for each user group. As described above, the performance measures can include interaction rates and conversion rates. When weights are used, the MPC cluster 130 can calculate the performance measures using the weights, as described above.

To calculate a user interaction rate for a user group, the MPC cluster 130 can determine, for the users in the user group, a total number of times one or more digital component(s) for which the model is trained were displayed to the users in the user group and the total number of user interactions with the digital component(s) by the users in the user group. The MPC cluster 130 can determine, as the user interaction rate, a quotient by dividing the total number of user interactions by the total number of times the digital component(s) were displayed to the users in the user group.

To calculate a conversion rate for a user group, the MPC cluster 130 can determine a total number of conversions made by the users of the user group. The MPC cluster 130 can determine, as the conversion rate, a quotient by dividing the total number of conversions by the total number of times the digital component(s) were displayed to the users in the user group.

A first MPC system of an MPC cluster 130 can receive from an application 112 on a client device 110, an inference request comprising a first share of a given user profile for a user of the application 112 and a performance threshold (1202). One or more second MPC systems of the MPC cluster 130 can each receive a corresponding second share of the given user profile.

Each inference request can include the share of the user profile, an identifier for the machine learning model to be used for the inference request, a number k of nearest neighbors to identify using the machine learning model, and a threshold performance measure for use in the inference. In some implementations, the inference request can also include a domain of the owner of the model (e.g., the eTLD+1 for the owner) and a digital signature of the rest of the content of the inference request. Using a digital signature ensures that the request is being received from an appropriate client device 110 and that the content of the inference request is not modified after the request is generated.

The first MPC system can identify, by performing a secure MPC process using a trained machine learning model in collaboration with one or more second MPC systems within the MPC cluster 130, a set of k nearest neighbors to the user profile (1202). The MPC cluster 130 can identify the set of nearest neighbors in a similar manner as described with reference to FIG. 11, using the value of k included in the inference request.

The first MPC system 130 can select, from the set of nearest neighbors, one or more nearest neighbors having a performance measure that satisfies the performance threshold (1204). This can vary based on the performance measure included in the query and based on how the k-NN model is trained.

If the k-NN model is trained using user groups rather than user profiles of individual users, the first MPC system can identify, in the set of nearest neighbors, each user group having a performance measure that satisfies the performance threshold. That is, the first MPC system can compare the performance measure of each of the k user groups to the threshold performance measure to determine whether the performance measure meets or exceeds the threshold performance measure.

If the k-NN model is trained using user profiles rather than user groups, the first MPC system can identify the user groups that include at least one of the k user profiles as a member. For example, consider the value of k to be three, with users A, B, and C being the nearest neighbors to the user profile of the inference request. If user A is a member of groups 1 and 2, user B is a member of group 2, and user C is a member of group 3, 4, and 5, the user groups in this example would be 1, 2, 3, 4, and 5 as each of these groups include at least one member of the k nearest neighbors.

For each group, the first MPC system calculates an aggregate performance measure for the user profiles in the group. If the threshold performance measure is a user interaction rate, the first MPC system can calculate a user interaction rate for the digital component(s) for the user profiles, e.g., by dividing the number of user interactions for the users in the group by the total number of times the digital component(s) were displayed to the users in the group. If the threshold performance measure is a conversion rate, the first MPC system can calculate the conversion rate for the digital component(s) for users in the group, e.g., by dividing the number of conversions for the users corresponding in the group by the total number of times the digital component(s) were displayed to the users in the group. After calculating the performance measure, the first MPC system can compare the calculated performance measure to the threshold performance measure. The first MPC system can then determine which groups have a performance measure that meets or exceeds the threshold performance measure. Each second MPC system can perform the same process to identify the user groups that satisfy the threshold performance measure.

The first MPC system can transmit data representing the one or more nearest neighbors to the application 112 (1206). For example, the first MPC system can transmit data representing each user group having a performance measure that meets or exceeds the threshold performance measure.

Similarly, each second MPC system can transmit data representing each user group having a performance measure that meets or exceeds the threshold performance measure.

The user profile may be generated by the application 112. The user profile can include data indicative of interactions between a user of the application 112 and digital content rendered on the application 112. The interactions can include conversions and lack of conversions.

The machine learning model can be a nearest neighbors model. The nearest neighbors of the nearest neighbors model are represented by respective centroids associated with corresponding user groups. The first MPC system can allocate a weight to each user of the corresponding user groups to compute a respective centroid. The weight can be based on interactions by the user. A centroid for each user group can be a center, represented by an average, of user profiles for users that are members of the user group.

The machine learning model can be one or more of a centroid model or a nearest neighbors model. For example, a k-NN can be used for classification of users into user groups or lists, and a centroid model can be used to preprocess data for the user group approaches.

The performance measure of each nearest neighbor can include at least one of a user interaction rate with one or more digital components corresponding to the nearest neighbor or a conversion rate for the one or more digital components corresponding to the nearest neighbor.

The machine learning model can include a k-nearest neighbors model. In some implementations, each neighbor in the k-nearest neighbors model can represent a user profile of a user. In certain implementations, each neighbor in the k-nearest neighbors model can represent a user group for a plurality of users.

FIG. 13 is a block diagram of an example computer system 1300 that can be used to perform operations described above. The system 1300 includes a processor 1310, a memory 1320, a storage device 1330, and an input/output device 1340. Each of the components 1310, 1320, 1330, and 1340 can be interconnected, for example, using a system bus 1350. The processor 1310 is capable of processing instructions for execution within the system 1300. In some implementations, the processor 1310 is a single-threaded processor. In another implementation, the processor 1310 is a multi-threaded processor. The processor 1310 is capable of processing instructions stored in the memory 1320 or on the storage device 1330.

The memory 1320 stores information within the system 1300. In one implementation, the memory 1320 is a computer-readable medium. In some implementations, the memory 1320 is a volatile memory unit. In another implementation, the memory 1320 is a non-volatile memory unit.

The storage device 1330 is capable of providing mass storage for the system 1300. In some implementations, the storage device 1330 is a computer-readable medium. In various different implementations, the storage device 1330 can include, for example, a hard disk device, an optical disk device, a storage device that is shared over a network by multiple computing devices (e.g., a cloud storage device), or some other large capacity storage device.

The input/output device 1340 provides input/output operations for the system 1300. In some implementations, the input/output device 1340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 1360, e.g., keyboard, printer and display devices. Other implementations, however, can also be used, such as mobile computing devices, mobile communication devices, set-top box television client devices, etc.

Although an example processing system has been described in FIG. 13, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to the application (e.g. browser) on a user's client device in response to requests received from the application.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any innovations or of what may be claimed, but rather as descriptions of features specific to particular implementations of particular innovations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:

detecting user interactions and events for multiple digital components based on data received from client devices of users;

determining performance measures for the multiple digital components based on the detected user interactions and events;

receiving, by a first multi-party computation (MPC) system of an MPC cluster and from an application on a client device, an inference request comprising a first share of a given user profile for a user of the application and a performance threshold;

executing, by the first MPC system, a trained machine learning model using a secure MPC process in collaboration with one or more second MPC systems, wherein the first MPC system and the one or more second MPC systems perform machine learning computations using secret shares of data according to a secure MPC protocol;

obtaining, by the first MPC system and as an output of the trained machine learning model, data identifying a first share of a set of nearest neighbors to the user profile;

selecting, from the set of nearest neighbors, one or more nearest neighbors having a performance measure that satisfies the performance threshold, wherein the performance measure of each nearest neighbor comprises at least one of (i) a user interaction rate that indicates a rate at which users interact with one or more digital components when the one or more digital components are presented to the users or (ii) a conversion rate that indicates a rate at which the users perform a specified action after the one or more digital components are presented to the users; and transmitting, by the first MPC system, data derived from the one or more nearest neighbors to the application, wherein the data derived from the one or more nearest neighbors to the application comprises a first share of a label identifying one or more user interest groups corresponding to each of the one or more digital components.

2. The method of claim 1, wherein the user profile is generated by the application, wherein the user profile comprises data indicative of interactions between a user of the application and digital content rendered on the application, wherein the interactions comprise conversions and lack of conversions.

3. The method of claim 1, wherein the machine learning model is a nearest neighbors model, wherein nearest neighbors of the nearest neighbors model are represented by respective centroids associated with corresponding user groups.

4. The method of claim 3, wherein the first MPC system allocates a weight to each user of the corresponding user groups to compute a respective centroid, wherein the weight is based on at least one of interactions by the user or user information related to the performance measure.

5. The method of claim 4, wherein a centroid for each user group is a center, represented by an average, of user profiles for users that are members of the user group.

6. The method of claim 1, wherein the machine learning model is one or more of a centroid model or a nearest neighbors model.

7. The method of claim 1, wherein the machine learning model comprises a k-nearest neighbors model and each neighbor in the k-nearest neighbors model represents a user profile of a user.

8. The method of claim 1, wherein the machine learning model comprises a k-nearest neighbors model and each neighbor in the k-nearest neighbors model represents a user group for a plurality of users.

9. The method of claim 1, wherein the performance threshold is a threshold value, wherein each conversion rate for the one or more digital components is a number of conversions divided by a number of times the one or more digital components were displayed to users in a user group, wherein the inference request is a request to infer whether the user is to be added to a user group.

10. The method of claim 1, wherein each digital component of the one or more digital components corresponds to a user interest group and each nearest neighbor comprises a respective performance measure for a digital components corresponding to each user interest group to which a user corresponding to the nearest neighbor is assigned.

11. The method of claim 1, wherein the client device is configured to:

identify the one or more user interest groups by combining the first share of the label with one or more second shares of the label received from the one or more second MPC systems; and add the user of the client device to each of the one or more user interest groups.

12. A system comprising:

at least one programmable processor; and a machine-readable medium storing instructions that, when executed by the at least one programmable processor, cause the at least one programmable processor to perform operations comprising:

detecting user interactions and events for multiple digital components based on data received from client devices of users;

determining performance measures for the multiple digital components based on the detected user interactions and events;

receiving, by a first multi-party computation (MPC) system of an MPC cluster and from an application on a client device, an inference request comprising a first share of a given user profile for a user of the application and a performance threshold;

executing, by the first MPC system, a trained machine learning model using a secure MPC process in collaboration with one or more second MPC systems, wherein the first MPC system and the one or more second MPC systems perform machine learning computations using secret shares of data according to a secure MPC protocol;

obtaining, by the first MPC system and as an output of the trained machine learning model, data identifying a first share of a set of nearest neighbors to the user profile;

selecting, from the set of nearest neighbors, one or more nearest neighbors having a performance measure that satisfies the performance threshold, wherein the performance measure of each nearest neighbor comprises at least one of (i) a user interaction rate that indicates a rate at which users interact with one or more digital components when the one or more digital components are presented to the users or (ii) a conversion rate that indicates a rate at which the users perform a specified action after the one or more digital components are presented to the users; and transmitting, by the first MPC system, data derived from the one or more nearest neighbors to the application, wherein the data derived from the one or more nearest neighbors to the application comprises a first share of a label identifying one or more user interest groups corresponding to each of the one or more digital components.

13. The system of claim 12, wherein the user profile is generated by the application, wherein the user profile comprises data indicative of interactions between a user of the application and digital content rendered on the application, wherein the interactions comprise conversions and lack of conversions.

14. The system of claim 12, wherein the machine learning model is a nearest neighbors model, wherein nearest neighbors of the nearest neighbors model are represented by respective centroids associated with corresponding user groups.

15. The system of claim 14, wherein the first MPC system allocates a weight to each user of the corresponding user groups to compute a respective centroid, wherein the weight is based on at least one of interactions by the user or user information related to the performance measure.

16. The system of claim 15, wherein a centroid for each user group is a center, represented by an average, of user profiles for users that are members of the user group.

17. The system of claim 12, wherein the machine learning model is one or more of a centroid model or a nearest neighbors model.

18. The system of claim 12, wherein the machine learning model comprises a k-nearest neighbors model and each neighbor in the k-nearest neighbors model represents a user profile of a user.

19. The system of claim 12, wherein the machine learning model comprises a k-nearest neighbors model and each neighbor in the k-nearest neighbors model represents a user group for a plurality of users.

20. One or more non-transitory media storing instructions that, when executed by at least one programmable processor, cause the at least one programmable processor to perform operations comprising:

detecting user interactions and events for multiple digital components based on data received from client devices of users;

determining performance measures for the multiple digital components based on the detected user interactions and events;

receiving, by a first multi-party computation (MPC) system of an MPC cluster and from an application on a client device, an inference request comprising a first share of a given user profile for a user of the application and a performance threshold;

executing, by the first MPC system, a trained machine learning model using a secure MPC process in collaboration with one or more second MPC systems, wherein the first MPC system and the one or more second MPC systems perform machine learning computations using secret shares of data according to a secure MPC protocol;

obtaining, by the first MPC system and as an output of the trained machine learning model, data identifying a first share of, a set of nearest neighbors to the user profile;

selecting, from the set of nearest neighbors, one or more nearest neighbors having a performance measure that satisfies the performance threshold, wherein the performance measure of each nearest neighbor comprises at least one of (i) a user interaction rate that indicates a rate at which users interact with one or more digital components when the one or more digital components are presented to the users or (ii) a conversion rate that indicates a rate at which the users perform a specified action after the one or more digital components are presented to the users; and transmitting, by the first MPC system, data derived from the one or more nearest neighbors to the application, wherein the data derived from the one or more nearest neighbors to the application comprises a first share of a label identifying one or more user interest groups corresponding to each of the one or more digital components.

\* \* \* \* \*